(12) United States Patent
Seok et al.

(10) Patent No.: US 12,245,292 B2
(45) Date of Patent: *Mar. 4, 2025

(54) METHOD FOR TRANSMITTING UPLINK CHANNEL IN WIRELESS COMMUNICATION SYSTEM AND APPARATUS THEREFOR

(71) Applicant: WILUS INSTITUTE OF STANDARDS AND TECHNOLOGY INC., Gyeonggi-do (KR)

(72) Inventors: Geunyoung Seok, Gyeonggi-do (KR); Kyungjun Choi, Gyeonggi-do (KR); Minseok Noh, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,034

(22) Filed: Nov. 4, 2023

(65) Prior Publication Data

US 2024/0073965 A1 Feb. 29, 2024

Related U.S. Application Data

(63) Continuation of application No. 18/133,357, filed on Apr. 11, 2023, now Pat. No. 11,832,310, which is a (Continued)

(30) Foreign Application Priority Data

Oct. 11, 2020 (KR) .................. 10-2020-0130713
Jan. 14, 2021 (KR) .................. 10-2021-0005245
(Continued)

(51) Int. Cl.
*H04W 74/08* (2024.01)
*H04B 1/713* (2011.01)
(Continued)

(52) U.S. Cl.
CPC ........ *H04W 74/0833* (2013.01); *H04B 1/713* (2013.01); *H04W 74/006* (2013.01); *H04B 2201/698* (2013.01)

(58) Field of Classification Search
CPC ... H04L 5/0044; H04L 1/1854; H04L 1/1861; H04L 5/0082; H04L 1/1887; H04L 1/08; (Continued)

(56) References Cited

U.S. PATENT DOCUMENTS

2010/0158078 A1 6/2010 Ro et al.
2014/0029533 A1 1/2014 Han et al.
(Continued)

FOREIGN PATENT DOCUMENTS

CN 115606310 1/2023
EP 3799505 A1 3/2021
(Continued)

OTHER PUBLICATIONS

Office Action dated Mar. 6, 2024 for Indian Patent Application No. 202327031589.
(Continued)

*Primary Examiner* — Brian D Nguyen
(74) *Attorney, Agent, or Firm* — WOMBLE BOND DICKINSON (US) LLP

(57) ABSTRACT

Provided is a method for performing transmission of an uplink channel in a wireless communication system, the method being performed by a terminal and comprising the steps of: receiving a system information block 1 (SIB1) from a base station; transmitting a preamble for a random access procedure to the base station; receiving a random access
(Continued)

response (RAR) to the preamble from the base station; and transmitting a PUSCH to the base station on the basis of the random access response.

24 Claims, 29 Drawing Sheets

Related U.S. Application Data continuation of application No. PCT/KR2021/014059, filed on Oct. 12, 2021.

(30) Foreign Application Priority Data

| Jan. 18, 2021 | (KR) | ................ 10-2021-0006857 |
| Feb. 3, 2021 | (KR) | ................ 10-2021-0015747 |
| Apr. 20, 2021 | (KR) | ................ 10-2021-0051126 |
| May 11, 2021 | (KR) | ................ 10-2021-0060589 |
| Aug. 13, 2021 | (KR) | ................ 10-2021-0107683 |

(51) Int. Cl.
  *H04W 74/00* (2009.01)
  *H04W 74/0833* (2024.01)

(58) Field of Classification Search
  CPC . H04L 27/2602; H04L 1/1819; H04L 5/0012; H04L 1/1864; H04L 5/0092; H04L 27/26025; H04L 1/0009; H04L 5/001; H04L 1/0003; H04L 5/0048; H04L 1/0072; H04L 1/0026; H04W 74/006; H04W 74/0833; H04W 72/1268; H04W 72/232; H04W 74/002; H04B 1/713; H04B 2201/698
  See application file for complete search history.

(56) References Cited

U.S. PATENT DOCUMENTS

| 2016/0330633 | A1 | 11/2016 | You et al. |
| 2017/0273113 | A1 | 9/2017 | Tirronen et al. |
| 2018/0317263 | A1 | 11/2018 | Ishii |
| 2019/0238177 | A1 | 8/2019 | Liu et al. |
| 2019/0280734 | A1 | 9/2019 | Park et al. |
| 2019/0342921 | A1 | 11/2019 | Loehr et al. |
| 2020/0267764 | A1 | 8/2020 | Rastegardoost et al. |
| 2021/0251016 | A1 | 8/2021 | Xiong et al. |
| 2021/0314982 | A1 | 10/2021 | Panteleev et al. |
| 2021/0352712 | A1 | 11/2021 | Ly et al. |
| 2022/0345271 | A1 | 10/2022 | Wu et al. |
| 2022/0393717 | A1 | 12/2022 | Li et al. |
| 2023/0180024 | A1* | 6/2023 | Yu ............... H04W 72/0446 370/329 |
| 2023/0188261 | A1 | 6/2023 | Awadin et al. |
| 2023/0189259 | A1* | 6/2023 | Li ..................... H04L 5/0012 370/329 |
| 2023/0247680 | A1 | 8/2023 | Seok et al. |
| 2023/0262753 | A1* | 8/2023 | Axn?s ............ H04W 74/008 370/329 |
| 2023/0291451 | A1* | 9/2023 | Su ........................ H04L 1/08 |
| 2023/0291515 | A1* | 9/2023 | Dai ................... H04L 5/0044 |
| 2023/0379966 | A1* | 11/2023 | Nogami .......... H04W 74/0808 |

FOREIGN PATENT DOCUMENTS

| JP | 2017-513260 A | 5/2017 |
| JP | 2020-061649 A | 4/2020 |
| JP | 2020-182115 A | 11/2020 |
| KR | 10-2020-0027048 | 3/2020 |
| KR | 10-2020-0109354 | 9/2020 |
| WO | 2015/116732 A1 | 8/2015 |
| WO | 2019/170390 A1 | 9/2019 |
| WO | 2019/224876 A1 | 11/2019 |
| WO | 2022/028374 | 2/2022 |
| WO | 2022/029652 | 2/2022 |
| WO | 2022/075828 | 4/2022 |

OTHER PUBLICATIONS

Office Action dated Apr. 8, 2024 for Japanese Patent Application No. 2023-521779 and its English translation provided by Applicant's foreign counsel.
ZTE: "Support for transmission in preconfigured UL resources for MTC", 3GPP Draft; R1-1904343 PUR for MTC-Clean, 3rd Generation Partnership Project (3GPP), Mobile Competence Centre; 650, Route Des Lucioles; F-06921 Sophia-Antipolis Cedex ; France vol. RAN WGl, No. Xi'an, China; Apr. 8, 2019-Apr. 12, 2019 Apr. 7, 2019 (Apr. 7, 2019), XP051699634, Retrieved from the Internet: URL:http://www.3gpp.org/ftp/ Meetings%5F3GP P%5FSYNC/ RAN1/Docs/RI%2DI904343%2Ezip [retrieved on Apr. 7, 2019] sections 1, 2.1.3, 2.2.1, 2.5.
Ericsson: "Remaining issues of UL data transmission procedure", 3GPP Draft; R1-1807258 Remaining Details of UL Transmission Procedure, 3rd Generation Partnership Project (3GPP), Mobile Competence Centre; 650, Route Des Lucioles; F-06921 Sophia-Antipolis Cedex vol. RAN WGl, No. Busan, Korea; May 21, 2018-May 25, 2018 May 20, 2018 (May 20, 2018), XP051442454, Retrieved from the Internet: URL:http://www.3gpp.org/ftp/Meetings% 5F3GP P%5FSYNC/RAN1/Docs/[retrieved on May 20, 2018] tables 8.2-1 section 2.1.
Nokia et al: "On PUSCH enhancements for NR URLLC",3GPP DRAFT;R1-1900929_NR_URLLC_PUSCH_REPETITION_ENH, 3rd Generation Partnership Project (3GPP), Mobile Competence Centre; 650, Route Des Lucioles; F-06921 Sophia-Antipolis Cedex ; France vol. RAN WGl, No. Taipei, Taiwan; Jan. 21, 2019-Jan. 25, 2019 Jan. 12, 2019 (Jan. 12, 2019), XP051576464, Retrieved from the Internet: URL:http://www.3gpp.org/ftp/tsg%5Fran/WG1%5FRL1/ TSGR1%5FAH/NR%5FAH%5F1901/Docs/R1%2D 1900929% 2Ezip[retrieved on Jan. 12, 2019] figure 2 sections 1, 2.1
International Search Report for PCT/KR2021/014059 mailed on Feb. 9, 2022 and its English translation from WIPO (now published as WO 2022/075828).
Written Opinion of the International Searching Authority for PCT/KR2021/014059 mailed on Feb. 9, 2022 and its English translation by Google Translate (now published as WO 2022/075828).
Samsung: "Corrections on Ultra Reliable Low Latency Communications Enhancements", 3GPP TSG-RAN WG1 Meeting #102e, e-Meeting, R1-2007471, Sep. 4, 2020, pp. 1-21.
Notice of Allowance dated Jul. 19, 2023 for U.S. Appl. No. 18/133,357 (now published as US 2023/0247680).
Office Action dated Jun. 6, 2024 for U.S. Appl. No. 18/387,035.
Extended European Search Report dated Jul. 19, 2024 for European Patent Application No. 21878078.1.
CMCC: "Discussion on Procedure for 2-step RACH", 3GPP TSG RAN WG1 #97, R1-1906512, Reno, USA, May 13, 2019, pp. 1-7.
Samsung: "Corrections on PRACH procedure", 3GPP TSG RAN WG1 Meeting #92, R1-1801951, Athens, Greece, Feb. 16, 2018, pp. 1-12.
Office Action dated Sep. 17, 2024 for Japanese Patent Application No. 2023-521779 and its English translation provided by Applicant's foreign counsel.
Samsung: "Type A PUSCH repetitions for Msg3", 3GPP TSG RAN WG1 #105-e, R1-2105329, e-Meeting, May 12, 2021, pp. 1-7.
Huawei, HiSilicon: "Consideration on RACH procedure in coverage enhancement", 3GPP TSG RAN WG2 Meeting #91, R2-153357, Beijing, China, Aug. 15, 2015, pp. 1-5.
Notice of Allowance dated Oct. 23, 2024 for U.S. Appl. No. 18/387,035.
Partial Supplementary European Search Report dated Apr. 29, 2024 for European Patent Application No. 218778.1.
Ericsson: "Procedure for Two-step RACH", 3GPP Draft; R1-1909123 Procedure for Two-Step RACH, 3rd Generation Partnership Project (3GPP), Mobile Competence Centre; 650 Route Des Lucioles; F-06921 Sophia-Antipolis Cedex; France vol. RAN WG1, No.

(56) References Cited

OTHER PUBLICATIONS

Prague, CZ; Aug. 26, 2019-Aug. 30, 2019 Aug. 17, 2019 (Aug. 17, 2019), Xp051765726, Retrieved from the Internet: URL:http://www.3gpp.org/ftp/tsg_ran/WG1_RL1/TSGR1_98/Docs/R1-1909123.zip [retrieved on Aug. 17, 2019] * Figures 1, 3, 4, 7 ** sections 1, 6.1-6.3.

ZTE: "Support for transmission in preconfigured UL resources for MTC", 3GPP Draft; R1-1904343 PUR for MTC-Clean, 3rd Generation Partnership Project (3GPP), Mobile Competence Centre; 650, Route Des Lucioles; F-06921 Sophia-Antipolis Cedex ; France vol. RAN WGI, No. Xi'an, China; Apr. 8, 2019-Apr. 12, 2019 Apr. 7, 2019 (Apr. 7, 2019), XP051699634, Retrieved from the Internet: URL:http://www.3gpp.org/ftp/ Meetings%5F3GP P%5FSYNC/RAN1/Docs/RI%2DI904343%2Ezip [retrieved on Apr. 7, 2019] sections 1, 2.1.3, 2.2.1.

Ericsson: "Remaining issues of UL data transmission procedure", 3GPP Draft; R1-1807258 Remaining Details of UL Transmission Procedure, 3rd Generation Partnership Project (3GPP), Mobile Competence Centre; 650, Route Des Lucioles; F-06921 Sophia-Antipolis Cedex vol. RAN WGI, No. Busan, Korea; May 21, 2018-May 25, 2018 May 20, 2018 (May 20, 2018), XP051442454, Retrieved from the Internet: URL:http://www.3gpp.org/ftp/Meetings%5F3GP P%5FSYNC/RAN1/Docs/[retrieved on May 20, 2018] tables 8.2-1 section.

Nokia et al: "On PUSCH enhancements for NR URLLC",3GPP DRAFT;R1-1900929_NR_URLLC_PUSCH_REPETITION_ENH, 3rd Generation Partnership Project (3GPP), Mobile Competence Centre; 650, Route Des Lucioles; F-06921 Sophia-Antipolis Cedex ; France vol. RAN WGI, No. Taipei, Taiwan; Jan. 21, 2019-Jan. 25, 2019 Jan. 12, 2019 (Jan. 12, 2019), XP051576464, Retrieved from the Internet: URL:http://www.3gpp.org/ftp/tsg%5Fran/WG1%5FRL1/TSGR1%5FAH/NR%5FAH%5F1901/Docs.

* cited by examiner (a) PUSCH scheduling in time (K2)

(b) PUSCH scheduling in time (SLIV)

(a) PUSCH scheduling in frequency (type 0)

(b) PUSCH scheduling in frequency (type 1)

(a) PUSCH repetition type A (b) PUSCH repetition type B (a) Msg3 PUSCH without repetition (b) Msg3 PUSCH with repetition (# of repetitions = 2)

(c) Msg3 PUSCH with repetition (# of repetitions = 4)

(a) Msg3 PUSCH without repetition (b) Msg3 PUSCH with repetition (# of repetitions = 2)

(c) Msg3 PUSCH with repetition (# of repetitions = 4)

(a) Msg3 PUSCH without repetition (b) Msg3 PUSCH with repetition (# of repetitions = 2)

(c) Msg3 PUSCH with repetition (# of repetitions = 4)

(a) Msg3 PUSCH without repetition (b) Msg3 PUSCH with repetition (# of repetitions = 2)

(c) Msg3 PUSCH with repetition (# of repetitions = 4)

(a) Msg3 PUSCH without repetition (b) Msg3 PUSCH with repetition (# of repetitions = 2)

(c) Msg3 PUSCH with repetition (# of repetitions = 4)

(a) Msg3 PUSCH without repetition (b) Msg3 PUSCH with repetition (# of repetitions = 2)

(c) Msg3 PUSCH with repetition (# of repetitions = 4)

METHOD FOR TRANSMITTING UPLINK CHANNEL IN WIRELESS COMMUNICATION SYSTEM AND APPARATUS THEREFOR

CROSS-REFERENCE TO RELATED APPLICATIONS

This application is a continuation of U.S. patent application Ser. No. 18/133,357, filed on Apr. 11, 2023, now issued as U.S. Pat. No. 11,832,310, which is a continuation of PCT International Application No. PCT/KR2021/014059, which was filed on Oct. 12, 2021, and which claims priority under 35 U.S.C 119 (a) to Korean Patent Application No. 10-2020-0130713 filed with the Korean Intellectual Property Office on Oct. 11, 2020, Korean Patent Application No. 10-2021-0005245 filed with the Korean Intellectual Property Office on Jan. 14, 2021, Korean Patent Application No. 10-2021-0006857 filed with the Korean Intellectual Property Office on Jan. 18, 2021, Korean Patent Application No. 10-2021-0015747 filed with the Korean Intellectual Property Office on Feb. 3, 2021, Korean Patent Application No. 10-2021-0051126 filed with the Korean Intellectual Property Office on Apr. 20, 2021, Korean Patent Application No. 10-2021-0060589 filed with the Korean Intellectual Property Office on May 11, 2020, and Korean Patent Application No. 10-2021-0107683 filed with the Korean Intellectual Property Office on Aug. 13, 2021. The disclosures of the above patent applications are incorporated herein by reference in their entirety.

TECHNICAL FIELD

The present specification relates to a wireless communication system and, more particularly, to a method for transmitting an uplink channel and a device therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture. For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

An aspect of this specification is to provide a method for transmitting an uplink channel in a wireless communication system, and an apparatus therefor.

Solution to Problem

This specification provides a method of transmitting an uplink channel in a wireless communication system, and an apparatus therefor.

Specifically, a method of transmitting an uplink channel in a wireless communication system includes: receiving, by a terminal, system information block 1 (SIB1) from a base station; transmitting a preamble for a random access procedure to the base station; receiving a random access response (RAR) for the preamble from the base station, the random access response including information scheduling a physical uplink shared channel (PUSCH) that the terminal transmits to the base station; and transmitting the PUSCH to the base station, based on the random access response, wherein the SIB1 includes information on a repetitive transmission count candidate set including values of one or more repetitive transmission counts for repetitive transmission of the PUSCH, the random access response includes information indicating one value among the values of the one or more repetitive transmission counts included in the repetitive transmission count candidate set, and the transmission of the PUSCH is repeated as many times as the one value.

The method further includes: receiving, by the terminal from the base station, downlink control information (DCI) including information for scheduling a retransmission PUSCH; and repeatedly transmitting the retransmission PUSCH to the base station, based on the DCI, wherein the information for scheduling the retransmission PUSCH includes information on a repetition count of the retransmission PUSCH, the information on the repetition count of the retransmission PUSCH is included in a HARQ process number field of the DCI, the retransmission PUSCH is identical to the PUSCH, and the DCI is transmitted by the base station when the base station has failed to receive the PUSCH transmitted by the terminal.

In a wireless communication system, a terminal for transmitting an uplink channel includes: a transceiver; and a processor configured to control the transceiver, wherein the processor is configured to receive system information block 1 (SIB1) from a base station, transmit a preamble for a random access procedure to the base station, receive a random access response (RAR) for the preamble from the base station, the random access response including information scheduling a physical uplink shared channel (PUSCH) that the terminal transmits to the base station, and transmit the PUSCH to the base station, based on the random access response, wherein the SIB1 includes information on a repetitive transmission count candidate set including values of one or more repetitive transmission counts for repetitive transmission of the PUSCH, the random access response includes information indicating one value among the values of the one or more repetitive transmission counts included in the repetitive transmission count candidate set, and the transmission of the PUSCH is repeated as many times as the one value.

The processor is configured to receive, from the base station, downlink control information (DCI) including information for scheduling a retransmission PUSCH, and repeatedly transmit the retransmission PUSCH to the base station, based on the DCI, wherein the information for scheduling the retransmission PUSCH includes information on a repetition count of the retransmission PUSCH, the information on the repetition count of the retransmission PUSCH is included in a HARQ process number field of the DCI, the retransmission PUSCH is identical to the PUSCH, and the DCI is transmitted by the base station when the base station has failed to receive the PUSCH transmitted by the terminal.

The random access response corresponds to a physical downlink shared channel (PDSCH) including an uplink (UL) grant.

The information indicating the one value is included in at least one of a time domain resource assignment (TDRA) field, a modulation coding scheme (MCS) field, and a transmission power control (TPC) field of the random access response.

When the information indicating the one value is included in the MCS field, the one value is indicated by one or more most significant bits (MSBs) among bits of the MCS field.

When the information indicating the one value is included in the TPC field, the one value is indicated by one or more least significant bits (LSBs) among bits of the TPC field.

The SIM includes at least one of information related to the preamble and a RACH occasion, and the PUSCH is transmitted in a resource determined based on the at least one of the information related to the preamble and the RACH occasion.

The DCI is scrambled by a TC-RNTI, and a format of the DCI is DCI format 0_0.

Each of the values of the one or more repetitive transmission counts is a power of 2.

The values of the one or more repetitive transmission counts are 1, 2, 4, and 8, respectively.

The random access response includes a frequency hopping flag indicating whether the PUSCH performs frequency hopping, and the PUSCH performs intra-slot frequency hopping or inter-slot frequency hopping, based on the one value and the frequency hopping flag.

In a case where the one value is 1, when a value of the frequency hopping flag indicates that the PUSCH performs frequency hopping, the PUSCH performs intra-slot frequency hopping, and when the value of the frequency hopping flag indicates that the PUSCH does not perform frequency hopping, the PUSCH does not perform frequency hopping.

In a case where the one value is greater than 1, when a value of the frequency hopping flag indicates that the PUSCH performs frequency hopping, the PUSCH performs inter-slot frequency hopping, and when the value of the frequency hopping flag indicates that the PUSCH does not perform frequency hopping, the PUSCH does not perform frequency hopping.

The random access response further includes information on a resource in which a first repetitive transmission of the PUSCH is performed, the information on the resource in which the first repetitive transmission of the PUSCH is performed is a slot offset value between a resource in which the random access response is received and the resource in which the first repetitive transmission of the PUSCH is performed, the SIB1 further includes information related to a time division duplex (TDD) configuration, the information related to the TDD configuration is information on a type of symbols configuring a slot, the type of the symbols is one of a downlink symbol configured to be available for downlink transmission, an uplink symbol configured to be available for uplink transmission, and a flexible symbol not determined to be the downlink symbol or the uplink symbol, the PUSCH is repeatedly transmitted in a unit of slots, and the resource in which the first repetitive transmission of the PUSCH is performed is a resource spaced as much as the slot offset value apart from the resource in which the random access response is received.

The resource in which the first repetitive transmission of the PUSCH is performed is a flexible slot, repetitive transmission after the first repetitive transmission of the PUSCH is performed on an uplink slot, the flexible slot is configured by including at least one flexible symbol, and an entirety of the uplink slot is configured by the uplink symbol.

A method of receiving an uplink channel in a wireless communication system is performed by a base station and includes: transmitting system information block 1 (SIB1) to a terminal; receiving a preamble for a random access procedure from the terminal; transmitting a random access response (RAR) for the preamble to the terminal, the random access response including information scheduling a physical uplink shared channel (PUSCH) that the terminal transmits to the base station; and receiving the PUSCH based on the random access response from the terminal, wherein the SIB1 includes information on a repetitive transmission count candidate set including values of one or more repetitive transmission counts for repetitive transmission of the PUSCH, the random access response includes information indicating one value among the values of the one or more repetitive transmission counts included in the repetitive transmission count candidate set, and the transmission of the PUSCH is repeated as many times as the one value.

Advantageous Effects of Invention

An aspect of this specification is to provide a method of repeatedly transmitting a Msg3 PUSCH of a random access procedure.

An aspect of this specification is to provide a method for inter-slot frequency hopping of a Msg3 PUSCH that is repeatedly transmitted.

An aspect of this specification is to provide a method of determining resources in which a Msg3 PUSCH is repeatedly transmitted.

Effects which can be acquired by this specification are not limited to the effects described above, and other effects that have not been mentioned may be clearly understood by a person who has common knowledge in the technical field to which the present disclosure belongs, from the following description.

BEST MODE FOR CARRYING OUT THE INVENTION

Figure 1:
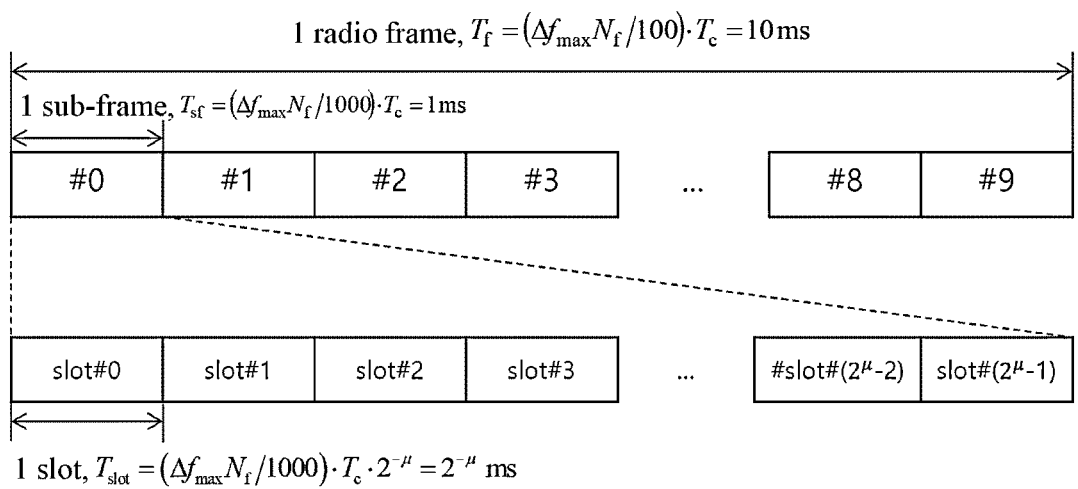
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu$=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
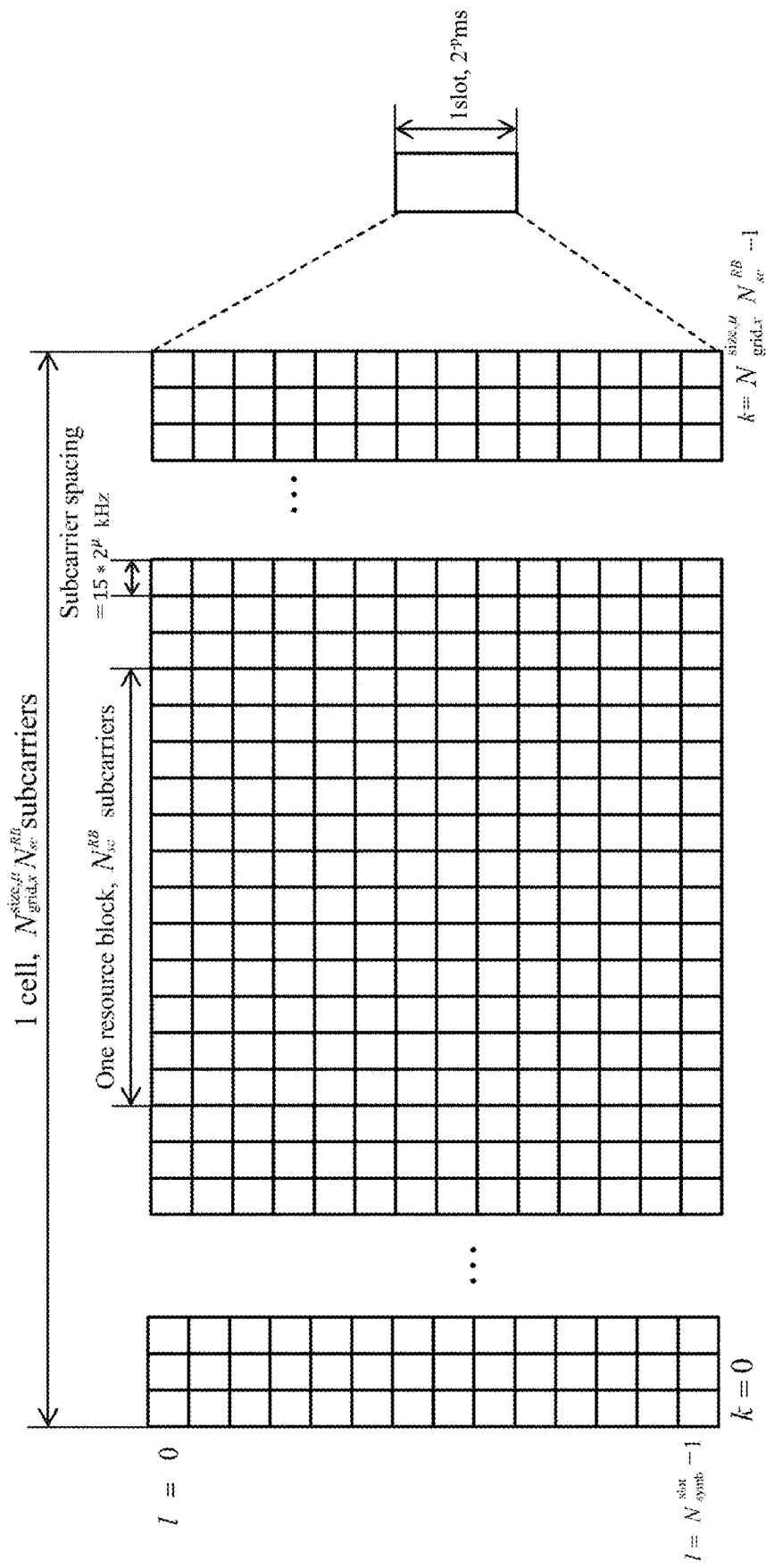
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to as simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}$=12. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D| X | X | U | U | U | U | U | U | U | U | U | U |
| 42 | D | D | X | X | X | U | U | U | U | U | U | U | U | U |
| 43 | D | D | D | D | D | D | D | D | X | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | D | D | D | D | D | X | X | X | U |
| 47 | D | D | X | U | U | U | U | D | D | X | U | U | U | U |
| 48 | D | D | U | U | U | U | U | D | X | U | U | U | U | U |
| 49 | D | D | D | D | X | U | D | D | D | D | X | U | U | U |
| 50 | D | D | X | U | U | U | U | D | D | X | U | U | U | U |
| 51 | D | X | X | U | U | U | U | D | X | U | U | U | U | U |
| 52 | D | X | X | X | X | X | U | D | X | X | X | X | X | U |
| 53 | D | D | X | X | X | X | U | D | D | X | X | X | X | U |
| 54 | D | X | X | X | X | X | D | D | D | D | D | D | D | D |
| 55 | D | D | X | X | X | U | U | U | D | D | D | D | D | D |
| 56 ~ 255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
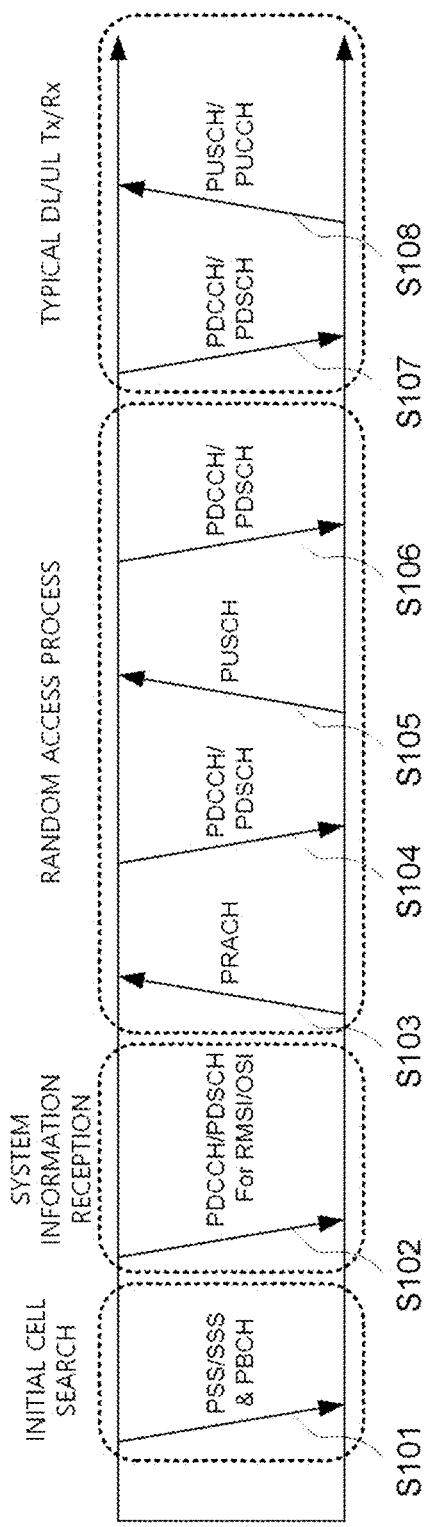
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID.

Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE may transmit a preamble through a physical random access channel (PRACH) (S103), and receive a random access response (RAR) message for the preamble from the base station through the PDCCH and the corresponding PDSCH (S104). In this case, the preamble in steps S103 and S104 may be described as message 1 (Msg1), and the random access response may be described as a response message or message 2 (Msg2). When a valid random access response is received by the UE, the UE transmits data including the identifier of the UE and the like to the base station through a physical uplink shared channel (PUSCH) indicated by the UL grant transmitted through the PDCCH from the base station (S105). In this case, the data including the own identifier of step S105 and the PUSCH including the data may be described as message 3 (Msg3). Also, the PUSCH including the data may be described as Message 3 PUSCH (Msg3 PUSCH). Next, the UE waits for reception of the PDCCH as an indication of the base station for collision resolution. When the UE successfully receives the PDCCH through its own identifier and receives the corresponding PDSCH (S106), the random access process ends. In this case, the PDCCH and PDSCH of step S106 may be described as message 4 (Msg 4). During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
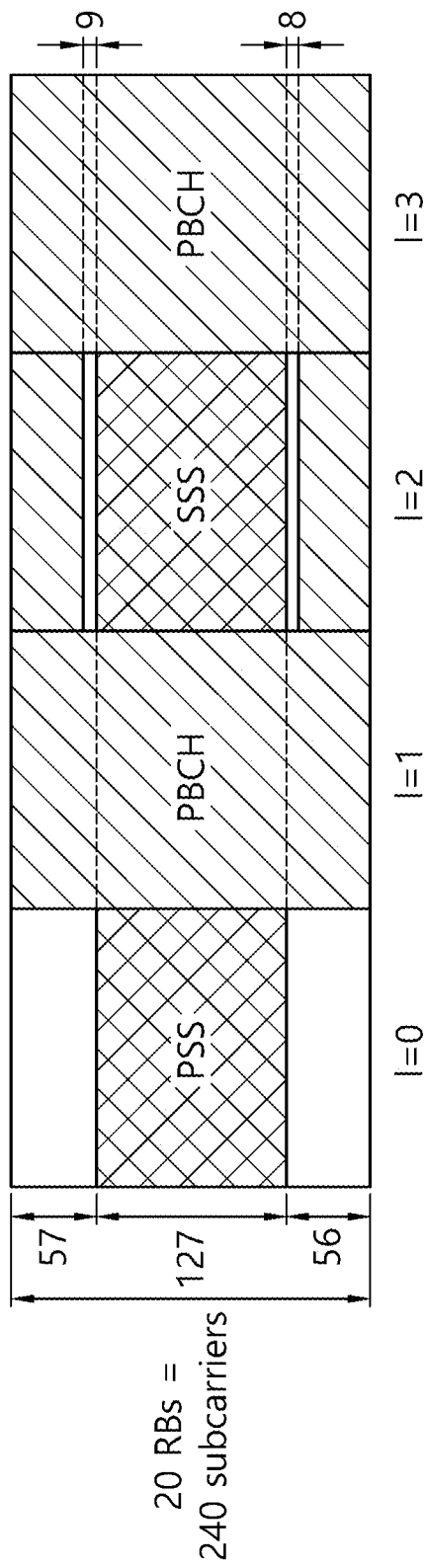
FIGS. 4*a* and 4*b* illustrate an SS/PBCH block for initial cell access in a 3GPP NR system.
Figure 4B:
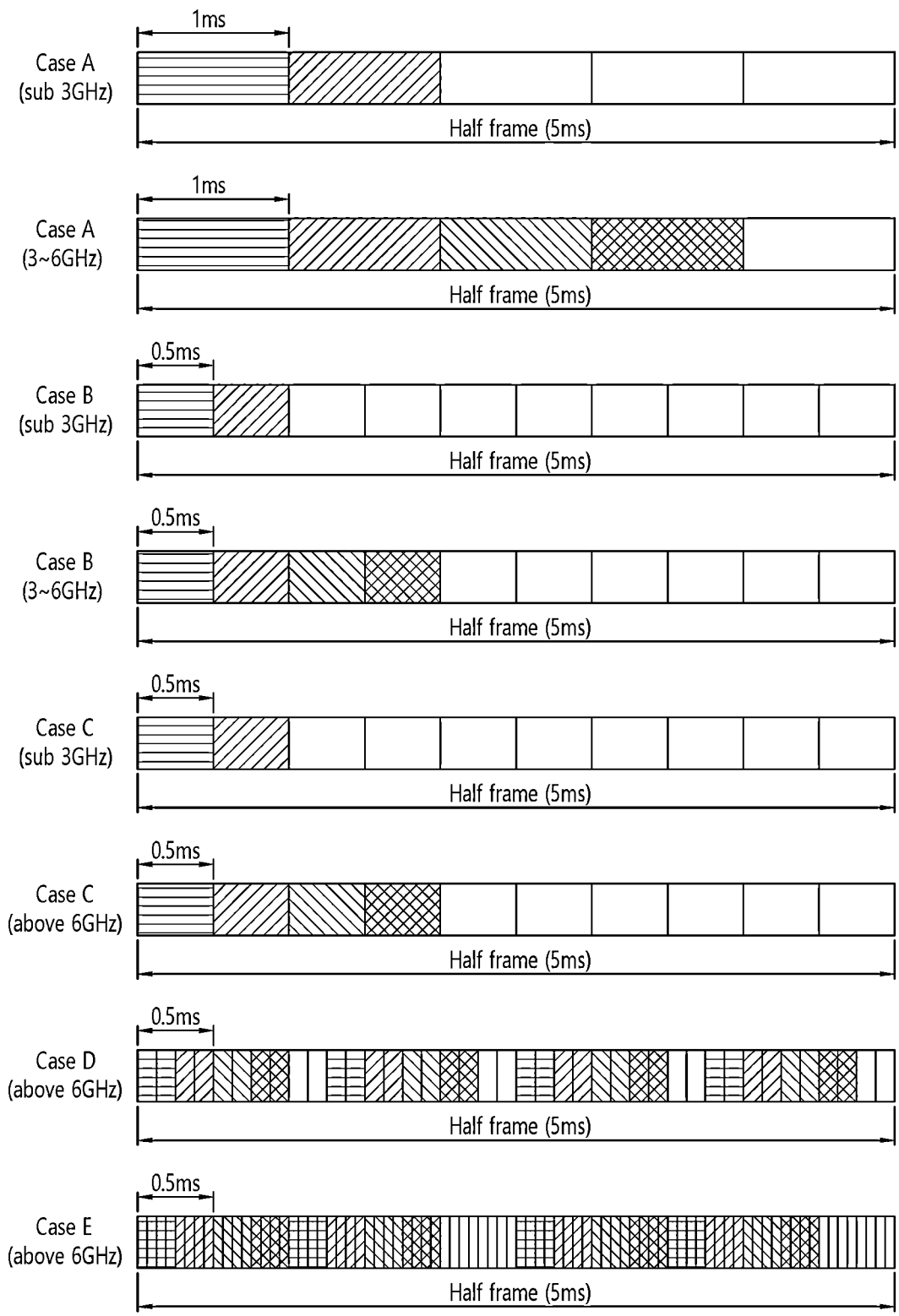

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NceHID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence dsss(n) of the PSS is as follows.

$$d_{PSS}(n)=1-2x(m)$$

$$m=(n+43N_{ID}^{(2)})\bmod 127$$

$$0 \le n \le 127$$

Here, $x(i+7)=(x(i+4)+x(i))\bmod 2$ and is given as,
[x(6) x(5) x(4) x(3) x(2) x(1) x(0)]=[1 1 1 0 1 1 0]
Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

Here, $\begin{array}{l} x_0(i + 7) = (x_0(i + 4) + x_0(i)) \bmod 2 \\ x_1(i + 7) = (x_1(i + 1) + x_1(i)) \bmod 2 \end{array}$ and is given as, $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1]$ A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
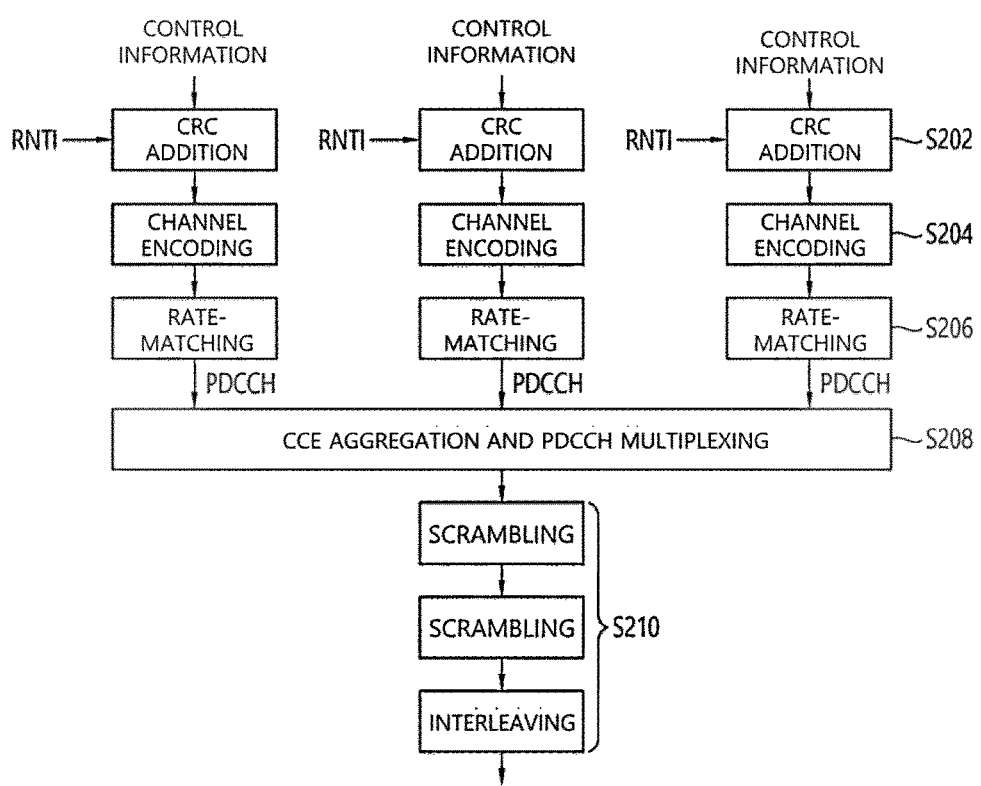
FIGS. 5*a* and 5*b* illustrate a procedure for transmitting control information and a control channel in a 3GPP NR system.
Figure 5B:
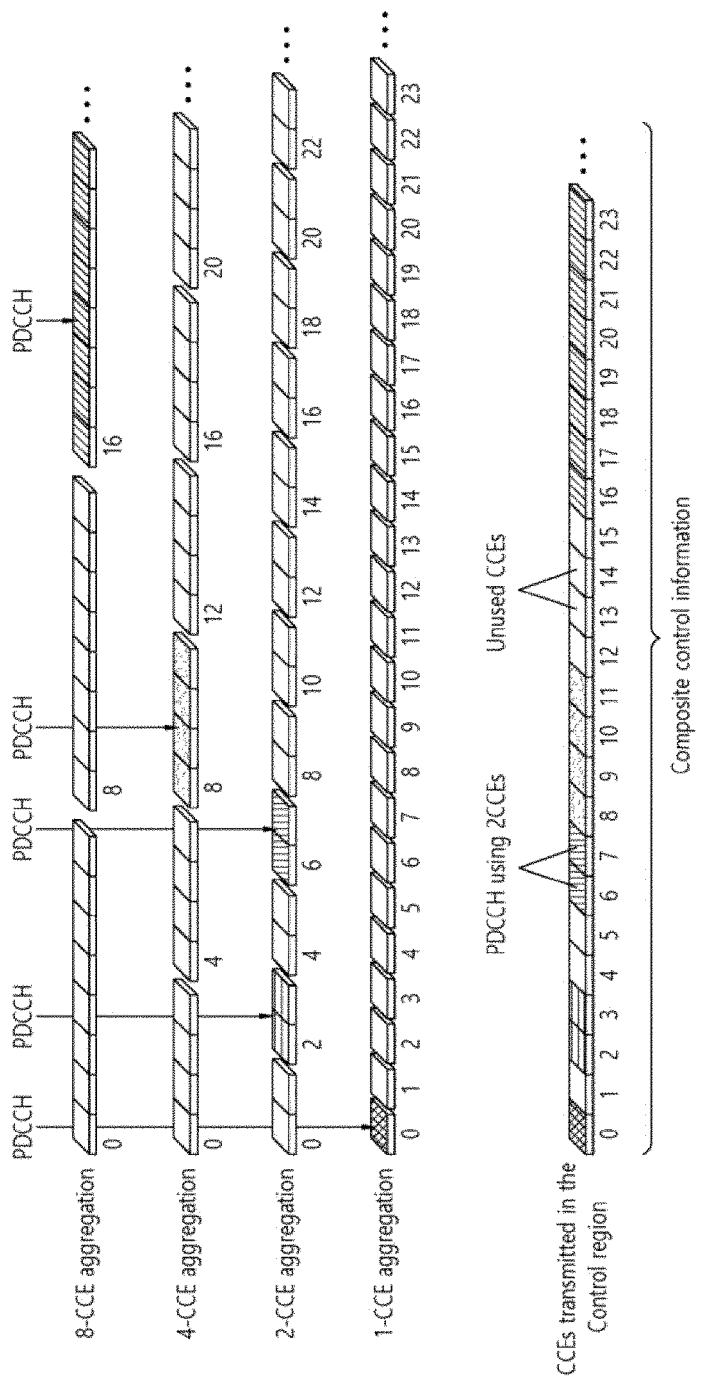

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
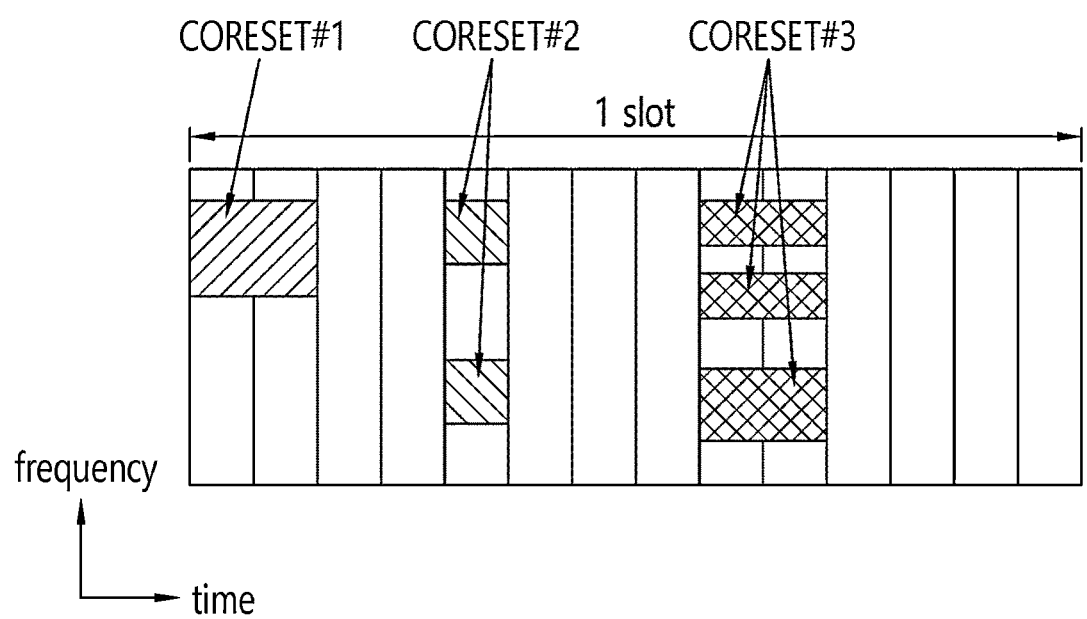
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
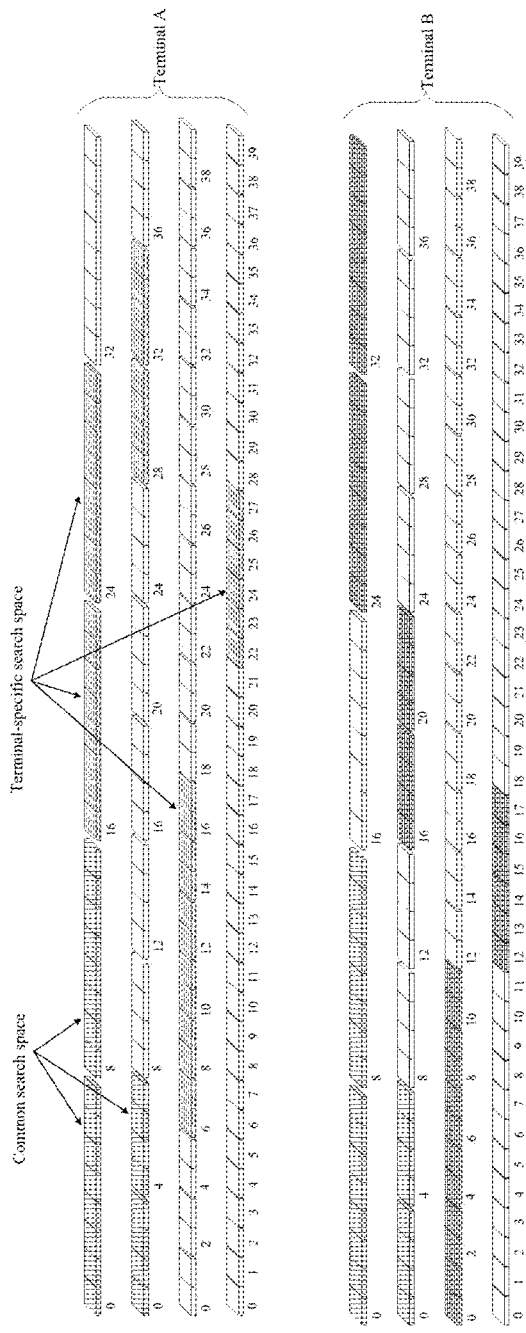
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARD). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols $d(0), \ldots, d(M_{symbol}-1)$. Here, $M_{symbol}$ may be $M_{bit}/2$. Through this, the UE may obtain a frequency diversity gain. More specifically, Mbit bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol $d(0)$ to $d(M_{symb}-1)$. Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
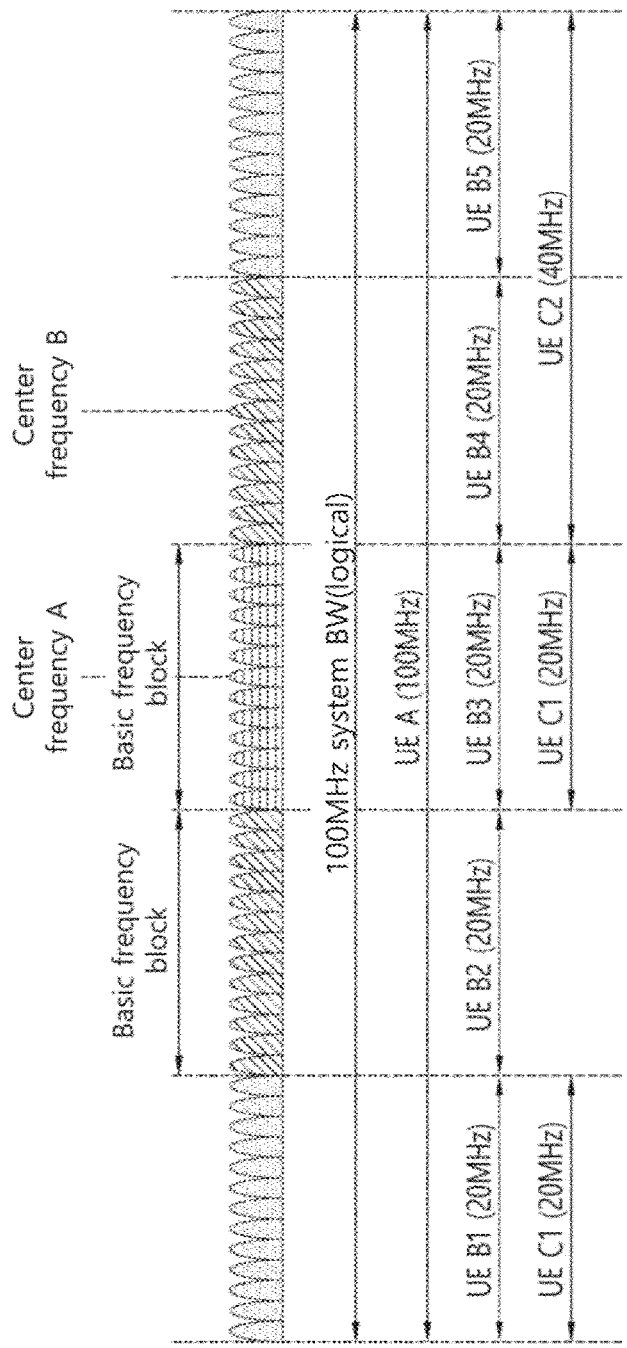
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
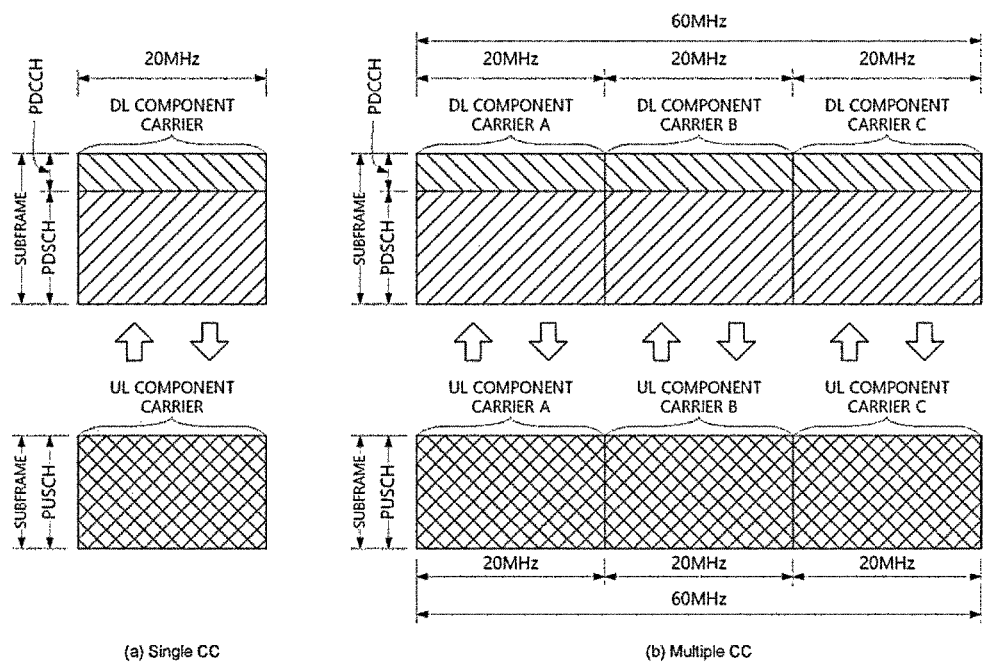
FIG. 9 is a diagram for explaining signal carrier communication and multiple carrier communication.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PSCell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
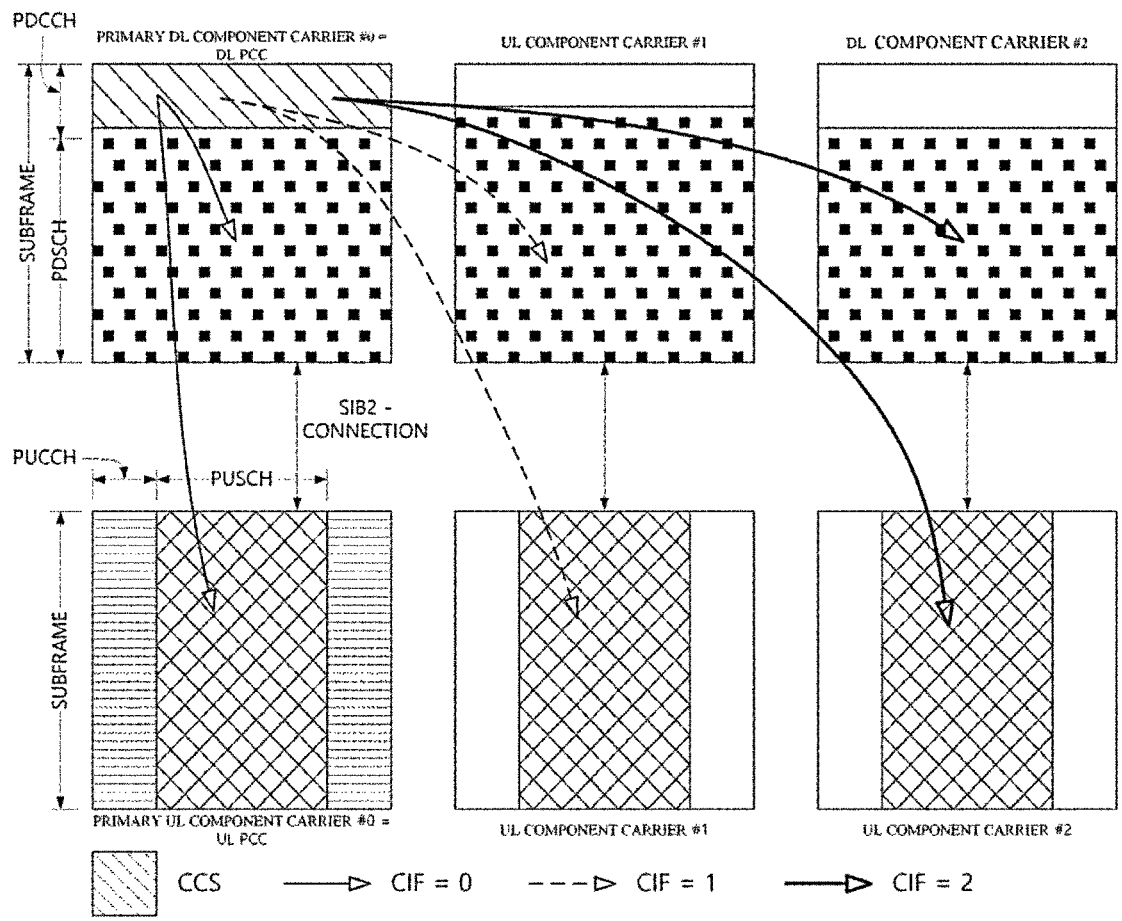
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
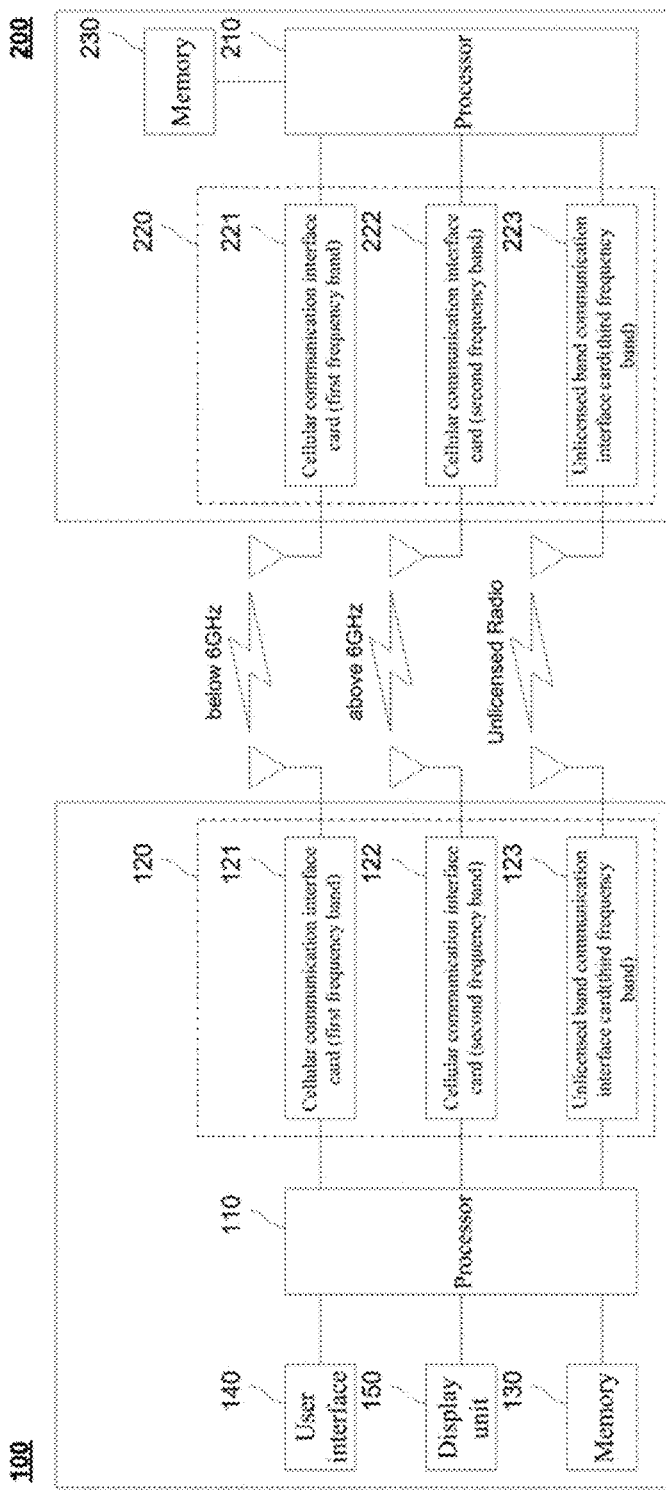
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12:
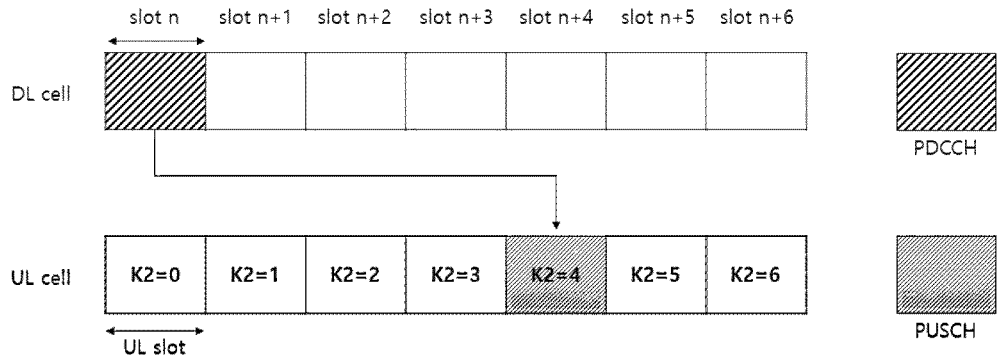
FIG. 12 illustrates a method of scheduling a physical uplink shared channel in a time domain according to an embodiment of the present disclosure.
Figure 12:
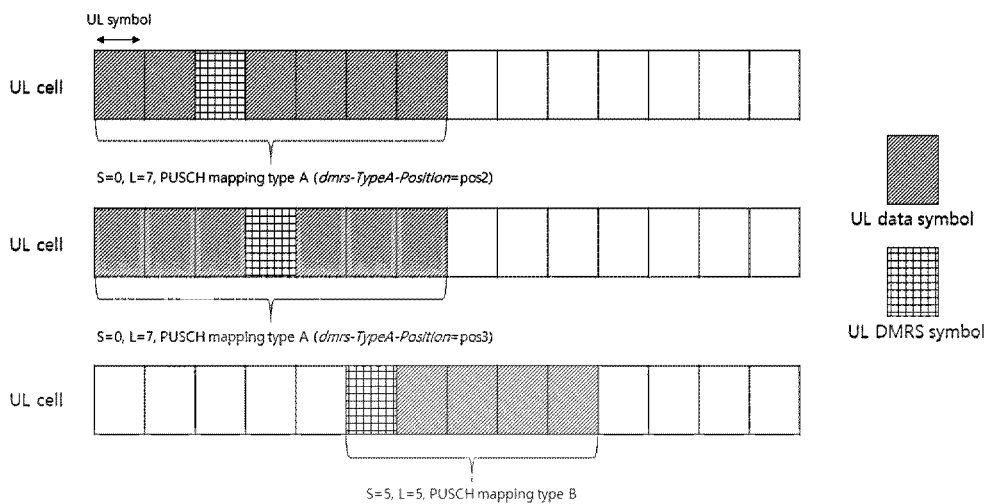

FIG. 12 illustrates a method of scheduling a physical uplink shared channel in a time domain according to an embodiment of the present disclosure.

A terminal may transmit uplink data to a base station through a PUSCH. The base station may schedule (PUSCH scheduling), for the terminal, to transmit uplink data through the PUSCH. i) In a dynamic grant (DG) method, the base station may perform PUSCH scheduling via DCI included in a PDCCH. Alternatively, ii) in a configured grant (CG) method, the terminal may transmit uplink data to the base station through a PUSCH according to a resource and a transmission method preconfigured for the terminal by the base station.

In this case, DCI included in a PDCCH may include PUSCH scheduling information. For example, the DCI may include time domain information (time-domain resource assignment (TDRA)) and frequency domain information (frequency-domain resource assignment (FDRA)). The terminal may receive DCI transmitted in a control resource set and a search space, and may perform operations (e.g., uplink data transmission through the PUSCH) indicated via the DCI. In this case, a DCI format for PUSCH scheduling may be DCI formats 0_0, 0_1, and 0_2. DCI of DCI formats 0_0, 0_1, and 0_2 may include a TDRA field including time domain information of the PUSCH. In this case, the time domain information may include K2, which is an offset value between a slot in which the PDCCH is transmitted from the base station and a slot in which the terminal transmits the PUSCH. In addition, the DCI may include a start and length indication value (SLIV) which is a joint-coded value of a starting symbol index (S) of the PUSCH and a symbol length (L, number) of the PUSCH in a slot indicated by K2. If the terminal receives the DCI in slot n, a slot in which the PUSCH is scheduled may be a floor $(n*2^{\mu PUSCH}/n*2^{\mu PDCCH})+K2$ slot. μPUSCH and μPDCCH may refer to a subcarrier spacing (SCS) of a cell in which the PUSCH is scheduled and a cell in which the terminal receives the PDCCH, respectively. floor(x) is a function that returns a largest integer among integers equal to or smaller than x. In the present specification, slot n may refer to a slot indexed with index n.

Referring to FIG. 12(a), a subcarrier spacing of a cell in which the terminal receives a PDCCH and a cell in which a PUSCH is scheduled may be the same. In this case, if the terminal receives the PDCCH in slot n and is indicated that K2 is 4, a slot in which the PUSCH is scheduled may be slot n+K2, that is, slot n+4.

As for a PUSCH scheduling type, there may be two mapping types of PUSCH mapping type A and PUSCH mapping type B. Depending on a PUSCH mapping type, the range of possible values for a starting symbol index and an SLIV of the PUSCH may vary. In PUSCH mapping type A, only resource allocation including a DMRS symbol is possible, and the DMRS symbol may be located in a third or fourth symbol of a slot according to a value indicated by a higher layer. That is, in the case of PUSCH mapping type A, an index (S) of a starting symbol of the PUSCH may be 0, and a length (L) of the PUSCH may have one of values from 4 to 14 (12 for an extended CP) according to a DMRS symbol position. In PUSCH mapping type B, a first symbol of the PUSCH may be a DMRS symbol. Accordingly, S may have a value from 0 to 13 (11 for an extended CP), and L may have one of values from 1 to 14 (12 for an extended CP). In addition, since one PUSCH cannot cross a slot boundary, the sum of S and L should be smaller than or equal to 14 (12 for an extended CP).

Referring to FIG. 12(b), the base station may schedule PUSCH mapping type A in which a third symbol is a DMRS symbol, an index (S) of a starting symbol is 0, and a length (L) is 7, may schedule PUSCH mapping type A in which a fourth symbol is a DMRS symbol, an index (S) of a starting symbol is 0, and a length (L) is 7, and may schedule PUSCH mapping type B in which a first symbol is a DMRS symbol, an index (S) of a starting symbol is 5, and a length (L) is 5. In this case, frequency domain information of the PUSCH indicated in the FDRA field of DCI format 0_0, 0_1, or 0_2 may be divided into two types according to frequency resource allocation types.

Figure 13:
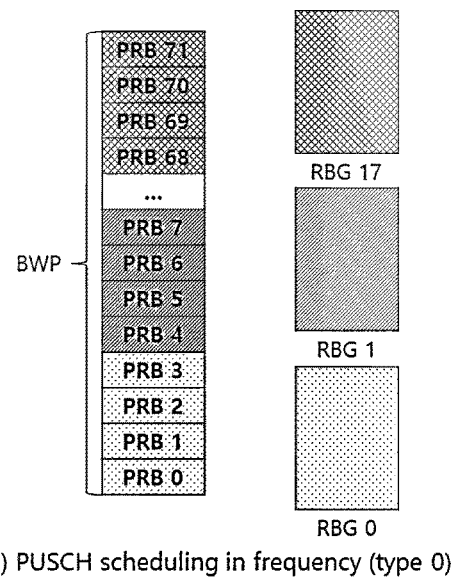
FIG. 13 illustrates a method of scheduling a physical uplink shared channel in a frequency domain according to an embodiment of the present disclosure.
Figure 13:
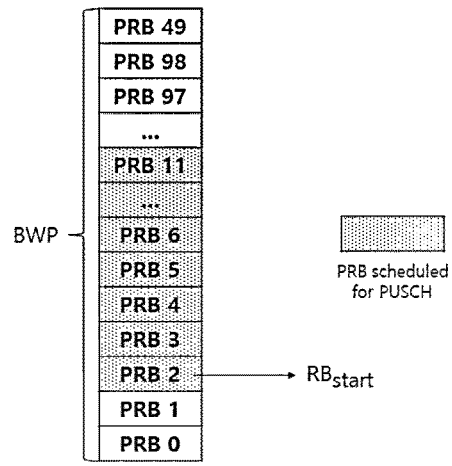

FIG. 13 illustrates a method of scheduling a physical uplink shared channel in a frequency domain according to an embodiment of the present disclosure.

Hereinafter, a frequency resource allocation type will be described with reference to FIG. 13.

i) Frequency resource allocation type 0 which is a first type may be a type in which an RBG is configured by bundling a certain number of PRBs according to the number of RBs included in a BWP configured (set) for a terminal, and whether to use the RBG is indicated via a bitmap in units of RBGs. That is, the terminal may determine whether to use a corresponding RBG via a bitmap transmitted from a base station. The number of PRBs included in one RBG may be set (configured) from a higher layer, and as the larger the number of RBs included in a BWP are set (configured) for the terminal, the more PRBs may be set (configured). Referring to FIG. 13(a), a BWP size set (configured) for the terminal may be 72 PRBs, and one RBG may include 4 PRBs. In this case, the terminal may determine four PRBs as one RBG in ascending order from PRB 0, and each RBG may be indexed from 0. That is, an RBG including PRBs 0 to PRB 3 may be indexed as RBG 0, and an RBG including PRBs 4 through PRB 7 may be indexed as RBG 1. Up to RBG 17 may be indexed in the same manner, wherein the base station may transmit 1 bit (0 or 1) per RBG, i.e., a total of 18 bits, to the terminal, and the terminal may determine, based on the received 18 bits, whether to use PRBs constituting a corresponding RBG. In this case, if a bit value is 0, the terminal may determine that a PUSCH is not scheduled for any PRB among the PRBs constituting the corresponding RBG. If the bit value is 1, the terminal may determine that a PUSCH is scheduled for all PRBs in the corresponding RBG. In this case, the bit value may be applied in reverse.

ii) Frequency resource allocation type 1 which is a second type may be a type indicating information on consecutive PRBs allocated according to a size of an active BWP or an initial BWP of the terminal. The information on consecutive PRBs may be a resource indication value (RIV) value in which a start index (S) and a length (L) of the consecutive PRBs are jointly coded. Referring to FIG. 13(b), when a BWP size is 50 PRBs, and a PUSCH is scheduled for the terminal from PRB 2 to PRB 11 among the 50 PRBs, a start index of consecutive PRBs may be 2 and a length may be 10. That is, the terminal may determine the start index and the length of consecutive PRBs in which the PUSCH is scheduled, based on an RIV value received from the base station. Specifically, the RIV may be calculated by $N^{size}_{BWP}*(L-1)+S$. $N^{size}_{BWP}$ may be the size of BWP configured for the terminal. For example, if the RIV value received by the terminal is 452, calculation of 452 is based on 452=50*(10−1)+2, and therefore the terminal may determine that the start index of consecutive PRBs in which the PUSCH is scheduled is 2 and the length is 10.

Via DCI of DCI format 0_1 or 0_2 for scheduling of the PUSCH, the terminal may be configured, from a higher layer, to use only one of the aforementioned two frequency resource allocation types or dynamically use both the two types. If the terminal is configured to dynamically use the two types, the terminal may determine a type to be used, via 1 bit of a most significant bit (MSB) of an FDRA field of the DCI.

There may be an uplink shared channel transmission method based on a configured grant for URLLC transmission, etc. The uplink shared channel transmission method based on a configured grant may be described as grant-free transmission. The uplink shared channel transmission method based on a configured grant may be a method in which, if the base station configures, for the terminal, available resources for uplink transmission via a higher layer (i.e., RRC signaling), the terminal may transmit an uplink shared channel by using the configured resources. The uplink shared channel transmission method based on a configured grant may be classified into two types depending on whether DCI indicates activation and release. i) Type 1 of the uplink shared channel transmission method based on a configured grant may be a method of configuring a transmission method and resources in advance via a higher layer. ii) Type 2 of the uplink shared channel transmission method based on a configured grant may be a method of configuring configured grant-based transmission via a higher layer, and configuring, via DCI, a method and resources for actual transmission.

The uplink transmission method based on a configured grant may support URLLC transmission. Accordingly, uplink transmission may be repeatedly performed on multiple slots to ensure high reliability. In this case, a redundancy version (RV) sequence may be one of {0, 0, 0, 0}, {0, 2, 3, 1}, and {0, 3, 0, 3}, and an RV corresponding to a (mod(n−1, 4)+1)th value may be used in an nth repeated transmission. That is, an RV corresponding to a value obtained by adding 1 to a remainder of dividing n−1 by 4 may be used. In addition, the terminal configured to repeatedly transmit an uplink channel may start repeated transmission only in a slot having an RV value of 0. However, if an RV sequence is {0, 0, 0, 0} and an uplink channel is configured to be repeatedly transmitted in 8 slots, the terminal may not start repeated transmission in an 8th slot. The terminal may terminate repeated transmission when a UL grant having the same HARQ process ID is received or when the number of repeated transmissions configured via a higher layer is reached or a periodicity is exceeded. The UL grant may refer to DCI for PUSCH scheduling.

As described above, in order to improve PUSCH transmission/reception reliability between a base station and a terminal in a wireless communication system, the base station may configure for the terminal to repeatedly transmit a PUSCH.

Figure 14:
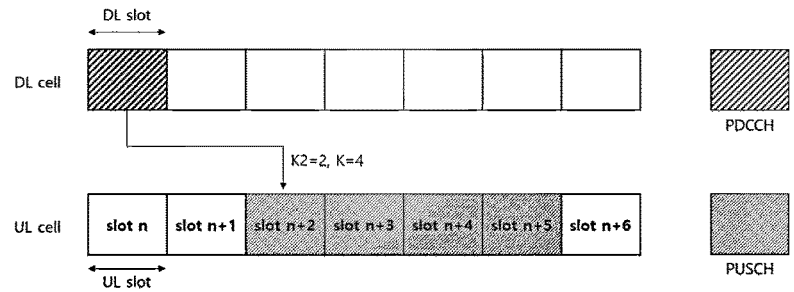
FIG. 14 illustrates repeated transmission of a physical uplink shared channel according to an embodiment of the present disclosure.
Figure 14:
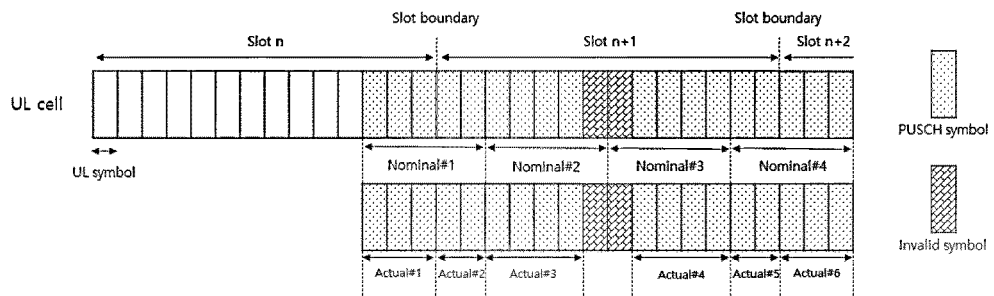

FIG. 14 illustrates repeated transmission of a physical uplink shared channel according to an embodiment of the present disclosure.

Repeated PUSCH transmission performed by a terminal may be of two types. i) First, repeated PUSCH transmission type A will be described. When a terminal receives DCI of DCI format 0_1 or 0_2 included in a PDCCH for PUSCH scheduling from a base station, the terminal may repeatedly transmit a PUSCH on K consecutive slots. A K value may be configured from a higher layer or may be a value included in a TDRA field of the DCI so as to be configured for the terminal. For example, referring to FIG. 14A, the terminal may receive the PDCCH for PUSCH scheduling in slot n, and a K2 value may be configured from DCI included in the received PDCCH. In this case, if the K2 value is 2 and the K value is 4, the terminal may start repeated PUSCH transmission in slot n+K2, and may repeatedly transmit a PUSCH until slot n+K2+K−1. That is, the terminal starts repeated PUSCH transmission in slot n+2 and repeatedly transmits a PUSCH until slot n+5. In this case, time and frequency domain resources in which the PUSCH is transmitted in each slot may be the same as those indicated in the DCI. That is, the PUSCH may be transmitted in the same symbol and PRB(s) within a slot. ii) Next, repeated PUSCH transmission type B will be described. Repeated PUSCH transmission type B may be a type used for the terminal to perform low-latency repeated PUSCH transmission in order to satisfy URLLC requirements, etc. The terminal may be configured with a symbol (S) in which repeated PUSCH transmission starts and a length (L) of the repeated PUSCH transmission, via the TDRA field of the DCI transmitted by the base station. In this case, the starting symbol (S) and the length (L) may be for a temporarily obtained nominal PUSCH rather than an actual PUSCH actually transmitted by the terminal. A separate symbol may not exist between nominal PUSCHs configured to be repeatedly transmitted. That is, nominal PUSCHs may be consecutive in the time domain. The terminal may determine an actual PUSCH from the nominal PUSCHs. One nominal PUSCH may be determined to be one or multiple actual PUSCHs. The base station may configure, for the terminal, symbols unavailable for repeated PUSCH transmission type B. Symbols unavailable for repeated PUSCH transmission type B may be described as invalid symbols. The terminal may exclude invalid symbols from among resources configured to transmit nominal PUSCHs. As described above, nominal PUSCHs are configured to be repeatedly transmitted on consecutive symbols, but if invalid symbols are excluded, resources for nominal PUSCH transmission become inconsecutive. An actual PUSCH may be configured to be transmitted on consecutive symbols configured for one nominal PUSCH transmission except for invalid symbols. In this case, if consecutive symbols cross a slot boundary, an actual PUSCH actually transmitted based on the slot boundary may be divided. Invalid symbols may include downlink symbols configured for the terminal by the base station. Referring to FIG. 14B, the terminal may be scheduled with PUSCH transmission having a length of 5 symbols starting from a 12th symbol of a first slot (slot n), and may be configured with 4 times of type B repeated transmission. In this case, resources scheduled for a first nominal PUSCH (nominal #1) may include symbol (n,11), symbol (n,12), symbol (n,13), symbol (n+1,0), and symbol (n+1,1). Resources scheduled for a second nominal PUSCH (nominal #2) may include symbol (n+1,2), symbol (n+1,3), symbol (n+1,4), symbol (n+1,5), and symbol (n+1,6). Resources scheduled for a third nominal PUSCH (nominal #3) may include symbol (n+1,7), symbol (n+1,8), symbol (n+1,9), symbol (n+1,10), and symbol (n+1,11). Resources scheduled for a fourth nominal PUSCH (nominal #4) may include symbol (n+1,12), symbol (n+1,13), symbol (n+2,0), symbol (n+2,1), and symbol (n+2,2). In this case, symbol (n,k) represents symbol k of slot n. That is, k may be a value starting from 0 to 13 for a normal CP, and may be a value from 0 to 11 for an extended CP. Invalid symbols may be configured to be symbols 6 and 7 of slot n+1. In this case, in order to determine an actual PUSCH, a last symbol of the second nominal PUSCH (nominal #2) may be excluded, and a first symbol of the third nominal PUSCH (nominal #3) may be excluded. The first nominal PUSCH (nominal #1) may be divided into two actually transmitted actual PUSCHs (actual #1 and actual #2) by a slot boundary. Each of the second nominal PUSCH (nominal #2) and the third nominal PUSCH (nominal #3) may be distinguished into one actual PUSCH (actual #3 and actual #4) by combining consecutive symbols except for an invalid symbol. Finally, the fourth nominal PUSCH (nominal #4) is divided into two actually transmitted (actual) PUSCHs (actual #5 and actual #6) by a slot boundary. The terminal finally transmits actually transmitted (actual) PUSCHs. One actual PUSCH should include at least one DMRS symbol. Accordingly, when repeated PUSCH transmission type B is configure, if a total length of the actual PUSCH is one symbol, the actual PUSCH may be omitted without being transmitted. This is because the actual PUSCH with one symbol may not include information other than a DMRS.

In order to obtain diversity gain in the frequency domain, frequency hopping may be configured for uplink channel transmission.

For repeated PUSCH transmission type A, one of intra-slot frequency hopping, in which frequency hopping is performed within a slot, and inter-slot frequency hopping, in which frequency hopping is performed in each slot, may be configured for the terminal. If intra-slot frequency hopping is configured for the terminal, the terminal may divide the PUSCH in half in the time domain in a slot for transmitting the PUSCH and transmit one half of the PUSCH in a scheduled PRB, and may transmit the other half in a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

For repeated PUSCH transmission type B, one of inter-repetition frequency hopping, in which frequency hopping is performed at a nominal PUSCH boundary, and inter-slot frequency hopping, in which frequency hopping is performed in every slot, may be configured for the terminal. If inter-repetition frequency hopping is configured for the terminal, the terminal may transmit actual PUSCH(s) corresponding to an odd-numbered nominal PUSCH on a scheduled PRB, and the terminal may transmit actual PUSCH(s) corresponding to an even-numbered nominal PUSCH on a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

When the terminal performs repeated PUSCH transmission, if a symbol scheduled for PUSCH transmission in a specific slot overlaps with a semi-statically configured DL symbol or a symbol configured for reception of an SS/PBCH block, the terminal may not transmit an overlapping PUSCH on a slot including the overlapping symbol. In addition, the overlapping PUSCH may be delayed and may not be transmitted even on a subsequent slot.

If the terminal receives DCI of DCI format 1_0, 1_1, or 1_2 for PUCCH scheduling, the terminal needs to transmit a PUCCH to the base station. In this case, the PUCCH may include uplink control information (UCI), and UCI may include at least one of HARQ-ACK, a scheduling request (SR), and channel state information (CSI). HARQ-ACK may be HARQ-ACK indicating whether the terminal has successfully received two types of channels. A first type may be HARQ-ACK for a PDSCH when the terminal is scheduled with the PDSCH via DCI of DCI format 1_0, 1_1, or 1_2. A second type may be HARQ-ACK for DCI when the DCI of DCI format 1_0, 1_1, or 1_2 is DCI indicating release of a semi-persistently scheduled (SPS) PDSCH. For PUCCH transmission including HARQ-ACK, a "PDSCH-to-HARQ_feedback timing indicator" field of DCI may indicate K1 which is information (value) for a slot in which the scheduled PUCCH is transmitted. Here, K1 may be a non-negative integer value. DCI of DCI format 1_0 may indicate one of {0, 1, 2, 3, 4, 5, 6, 7} as a K1 value. The K1 value that can be indicated in DCI of DCI format 1_1 or 1_2 may be set (configured) from a higher layer.

A method of determining a slot in which a PUCCH including a first type HARQ-ACK is transmitted will be described. An uplink slot overlapping with a last symbol in which a PDSCH corresponding to HARQ-ACK is transmitted may exist. In this case, if an index of the overlapping uplink slot is m, the terminal may transmit a PUCCH including HARQ-ACK on slot m+K1. The index of the uplink slot may be a value determined based on a sub carrier spacing of a BWP in which the PUCCH is transmitted. If the terminal is configured with downlink slot aggregation, a last symbol in which a PDSCH is transmitted may refer to a last scheduled symbol within a last slot among slots in which the PDSCH is transmitted.

Figure 15:
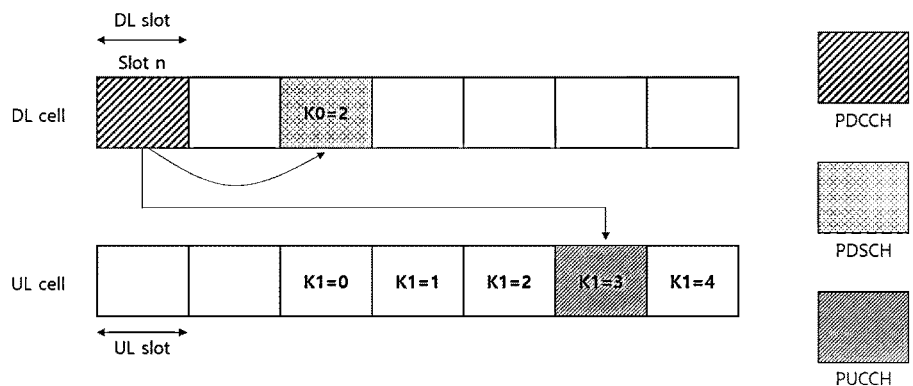
FIG. 15 illustrates a method of scheduling a physical uplink control channel according to an embodiment of the present disclosure.

FIG. 15 illustrates a method of scheduling a physical uplink control channel according to an embodiment of the present disclosure.

Referring to FIG. 15, a subcarrier spacing of a DL BWP in which a PDCCH is received, a subcarrier spacing of a DL BWP scheduled for a PDSCH, and a subcarrier spacing of a UL BWP in which a PUCCH is transmitted may be the same. A terminal may receive a PDCCH for scheduling of a PUCCH and a PDSCH from a base station in slot n. In this case, a K0 value and a K1 value may be configured (indicated) to be 2 and 3 respectively, by DCI included in the PDCCH received in slot. For example, if a last symbol in which the PDSCH is transmitted is symbol n+K0 (i.e., symbol n+2), the terminal may transmit HARQ-ACK for the PDSCH on slot n+2+K1 (i.e., slot n+5). In this case, HARQ-ACK for the PDSCH may be included in the PUCCH.

Figure 16:
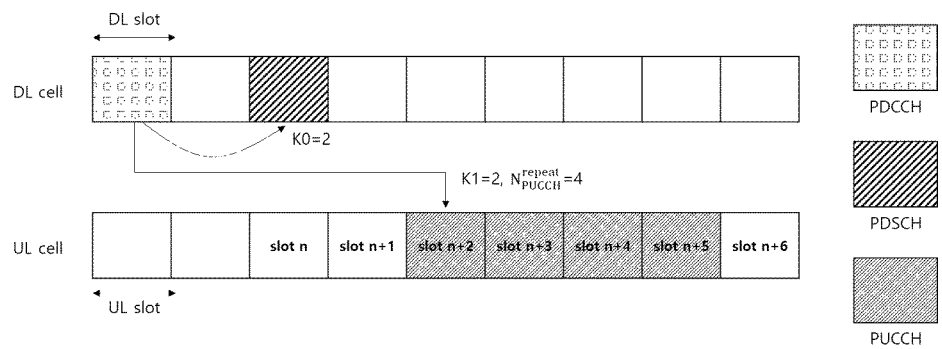
FIG. 16 illustrates repeated transmission of a physical uplink control channel according to an embodiment of the present disclosure.

FIG. 16 illustrates repeated transmission of a physical uplink control channel according to an embodiment of the present disclosure.

In order to secure wide coverage in the NR system, a terminal may repeatedly transmit a long PUCCH on 2, 4, or 8 slots. In this case, a format of the long PUCCH may be PUCCH format 1, 3, or 4. If the terminal repeatedly transmits the PUCCH, the same UCI may be repeatedly transmitted in every slot. Referring to FIG. 16, when PDSCH reception is terminated in slot n, and a K1 value is 2, the terminal may transmit the PUCCH on slot n+K1 (i.e., slot n+2). When a base station configures the number of repeated PUCCH transmission to be 4 ($N^{repeat}_{PUCCH}=4$), the terminal may repeatedly transmit the PUCCH from slot n+2 to slot n+5. In this case, symbol configurations of repeatedly transmitted PUCCHs may be the same. That is, repetitively transmitted PUCCHs may start from the same symbol in each slot and may include the same number of symbols.

Even for PUCCH transmission, frequency hopping may be applied to obtain diversity gain in the frequency domain. If intra-slot frequency hopping is applied, the terminal may divide the time domain of a slot for transmitting the PUCCH in half and transmit a half of the PUCCH on a first PRB and may transmit the other half of the PUCCH on a second PRB. The first PRB and the second PRB may be configured via a higher layer for configuration of PUCCH resources. If inter-slot frequency hopping is applied, the terminal may transmit the PUCCH on a first PRB of a slot having an even-numbered slot index and may transmit the PUCCH on a second PRB of a slot having an odd-numbered slot index. In addition, when the terminal performs repeated PUCCH transmission, if a symbol of a specific slot scheduled for PUCCH transmission overlaps with a semi-statically configured DL symbol or a symbol configured for reception of an SS/PBCH block, the terminal may not transmit the PUCCH on a slot including the overlapping symbol. The terminal may delay transmission of an untransmitted PUCCH so as to transmit the same on a subsequent slot. In this case, if a symbol of a slot for delayed PUCCH transmission does not overlap with a semi-statically configured DL symbol or a symbol configured for reception of an SS/PBCH block, the terminal may transmit the PUCCH.

Hereinafter, the present disclosure proposes a method of solving a coverage problem related to PUSCH transmission performed by a terminal during a random access process between the terminal and a base station.

As described above with reference to FIG. 3, in a random access process, a terminal may transmit a Msg3 PUSCH by using an uplink grant (UL grant) included in a random access response (RAR or Msg2). The UL grant is information for scheduling the Msg3 PUSCH, and may include a frequency hopping flag indicating frequency hopping information, time domain resource assignment (TDRA) information, frequency domain resource assignment (FDRA) information, modulation and coding scheme (MCS) information, transmission power control (TPC) command information for PUSCH transmission, CSI request information, and ChannelAccess-CPext information. The Msg3 PUSCH transmitted using the uplink grant included in Msg2 may be an initial transmission PUSCH. When the base station fails to receive a Msg3 PUSCH from the terminal, the base station may instruct the terminal to retransmit the Msg3 PUSCH. Retransmission of the Msg3 PUSCH may be indicated (scheduled) by a PDCCH, and the retransmission may be indicated by DCI that is DCI format 0_0 scrambled by a temporary C-RNTI (TC-RNTI) included in the PDCCH. The terminal may obtain a TC-RNTI through the pre-received random access response (Msg2). If the terminal successfully has detected DCI indicating retransmission, the terminal may retransmit the Msg3 PUSCH, based on information included in the DCI. The information included in the DCI may be a frequency hopping flag, TDRA information, FDRA information, MCS information, TPC information, ChannelAccess-CPext information, new data indicator (NDI) information, redundancy version (RV) information, HARQ process number (HPN) information, padding bit information, and UL/SUL indicator information. The Msg3 PUSCH indicated by DCI that is DCI format 0_0 may be a retransmission PUSCH.

In other words, the Msg3 PUSCH described in the present disclosure may be an initial transmission PUSCH or a retransmission PUSCH. Specifically, the PUSCH indicated by an uplink grant of a random access response (Msg2) may be related to initial transmission, and the PUSCH indicated by DCI that is DCI format 0_0 scrambled by a TC-RNTI may be related to retransmission.

Conventional transmission of an initial transmission PUSCH and a retransmission PUSCH was only possible in one slot. The one slot may be indicated by a TDRA field of an uplink grant or a TDRA field of DCI that is DCI format 0_0. In other words, repetitive transmission of a Msg3 PUSCH was impossible. Therefore, if a terminal fails to receive a PDCCH scheduling Msg4 from a base station within a configured particular time after transmitting a Msg3 PUSCH, the terminal is required to determine that a random access process has failed and start again from the beginning of the random access process. For example, if a channel environment is not good, a base station may fail to receive a Msg3 PUSCH even when a terminal has transmitted same. Therefore, the base station is unable to transmit a PDCCH scheduling Msg4 to the terminal, and the random access process is required to be started again. That is, coverage for the Msg3 PUSCH may be low. Therefore, the entire random access process may be delayed. Accordingly, hereinafter, the present disclosure describes a method of solving a coverage problem of a Msg3 PUSCH through repetitive transmission of the Msg3 PUSCH.

A base station may configure, for a terminal, whether repetitive transmission of a Msg3 PUSCH is possible in a random access process. For example, the base station may configure, for a terminal, whether repetitive transmission of a Msg3 PUSCH is possible, through system information block 1 (SIB1) transmitted from the base station in an initial cell access (initial access) process. That is, the terminal may identify, through SIB1, whether repetitive transmission of a Msg3 PUSCH is possible or impossible. Whether a Msg3 PUSCH is repeatedly transmitted may be configured through a different SIB as well as SIB1. That is, whether repetitive transmission of a Msg3 PUSCH is possible may be configured through SIBx (x=1, 2, 3 . . . ). In addition, whether a Msg3 PUSCH is repeatedly transmitted may be indicated through a different channel. For example, the base station may configure, through a PBCH, whether repetitive transmission of a Msg3 PUSCH is possible. Specifically, whether a Msg3 PUSCH is repeatedly transmitted may be configured through some bits of a PBCH, or whether repetitive transmission of a Msg3 PUSCH is possible may be inferred from a CRC or a DMRS sequence of a PBCH.

Whether repetitive transmission of a Msg3 PUSCH is possible may be explicitly indicated or may be inferred from different information included in SIB1. For example, if SIB1 includes parameters for repetitive transmission of a Msg3 PUSCH, the terminal may determine that repetitive transmission of the Msg3 PUSCH is possible, without a separate configuration (indication) for whether repetitive transmission of the Msg3 PUSCH is possible. On the contrary, if SIB1 does not include parameters for repetitive transmission of a Msg3 PUSCH, the terminal may determine that repetitive transmission of the Msg3 PUSCH is not possible, without a separate configuration (indication) for whether repetitive transmission of the Msg3 PUSCH is possible. The parameters for repetitive transmission of a Msg3 PUSCH may indicate a PRACH resource in which repetitive transmission of the Msg3 PUSCH is performed, and the number of times that repetitive transmission of the Msg3 PUSCH is performed. For example, if a PRACH resource is configured for the terminal by means of SIB1, the terminal may repeatedly transmit a Msg3 PUSCH through the configured PRACH resource. In addition, if a repetitive transmission count of a Msg3 PUSCH is configured for the terminal by means of SIB1, the terminal may transmit the Msg3 PUSCH by the configured repetitive transmission count. The base station may configure a single value or multiple values for the terminal as the number of times that repetitive transmission of a Msg3 PUSCH is possible. For example, the base station may configure, for the terminal, one of 1, 2, 4, and 8 or a set (e.g., {1, 2, 4, 8}) including multiple values. That is, the base station may configure, for the terminal, one value as the repetitive transmission count of a Msg3 PUSCH, or multiple values available as the repetitive transmission count. In a case where the base station configures multiple values, the base station may indicate, to the terminal, one value among the multiple values through additional signaling (configuration). In a case where a Msg3 PUSCH transmitted by a terminal is repeatedly transmitted, the Msg3 PUSCH may be repeatedly transmitted in a unit of slots. For example, in a case where the repetitive transmission count of a Msg3 PUSCH is 4, the Msg3 PUSCH may be repeatedly transmitted on four slots. That is, this implies that a Msg3 PUSCH transmitted on one slot may be repeated four times.

In a case where a Msg3 PUSCH is configured through SIB1 to be repeatedly transmissible, methods of determining, by a terminal, whether to actually perform repetitive transmission of a Msg3 PUSCH will be described. In addition, the meaning of interpretation by a terminal described in this specification may be the same as that of configuration by a base station for the terminal. In addition, the meaning of configuring described in this specification may be the same as that of indicating.

Method of Determining, by Terminal, Whether to Repeatedly Transmit Msg3 PUSCH

In a case where a base station configures, for a terminal, that repetitive transmission of a Msg3 PUSCH is enabled in a cell, the terminal may recognize that the terminal always and repeatedly transmits the Msg3 PUSCH, even without additional signaling (configuration) from the base station, which indicates actual repetitive transmission of the Msg3 PUSCH.

The terminal may determine whether to repeatedly transmit a Msg3 PUSCH, through explicit information received from the base station. The explicit information enabling the terminal to determine to repeatedly transmit a Msg3 PUSCH may be as follows.

i-a) Information configured from a higher layer: The terminal may determine whether to repeatedly transmit a Msg3 PUSCH, by interpreting information configured from a higher layer. For example, the base station may configure, for the terminal, whether repetitive transmission of a Msg3 PUSCH is enabled in a corresponding cell, through SIM in an initial cell access process. Furthermore, in a case where the base station configures repetitive transmission of a Msg3 PUSCH to be enabled, the base station may configure the terminal to always and repeatedly transmit the Msg3 PUSCH.

i-b) Information in a downlink channel scheduling Msg3 PUSCH: The terminal may determine whether to repeatedly transmit a Msg3 PUSCH, by interpreting information in a downlink channel scheduling a Msg3 PUSCH. The downlink channel may include an uplink grant of a random access response, DCI that is DCI format 1_0 scheduling a random access response, or DCI that is DCI format 0_0 scheduling the Msg3 PUSCH. Specifically, the terminal may determine whether to repeatedly transmit a Msg3 PUSCH, by interpreting field information in an uplink grant of a random access response, which schedules initial transmission of the Msg3 PUSCH. The terminal may determine to repeatedly transmit a Msg3 PUSCH, by interpreting field information in DCI that is DCI format 0_0 scrambled by a TC-RNTI, which schedules retransmission of the Msg3 PUSCH. The terminal may determine whether to repeatedly transmit a Msg3 PUSCH, by interpreting field information in DCI that is DCI format 1_0, which schedules a random access response. One bit in information (i.e., uplink grant, DCI being DCI format 1_0, and DCI being DCI format 0_0) included in each downlink channel may be used to indicate whether to repeatedly transmit a Msg3 PUSCH, and the terminal may determine whether to repeatedly transmit the Msg3 PUSCH, based on whether to repeatedly transmit the PUSCH, which is indicated by the one bit.

ii) The terminal may determine whether to repeatedly transmit a Msg3 PUSCH, through implicit information transmitted by the base station. The implicit information enabling the terminal to determine whether to repeatedly transmit a Msg3 PUSCH may be as follows.

The terminal may determine whether to repeatedly transmit a Msg3 PUSCH, by re-interpreting information in a downlink channel scheduling a Msg3 PUSCH. For example, ii-a) the terminal may determine whether to repeatedly transmit a Msg3 PUSCH, by re-interpreting field information in an uplink grant scheduling initial transmission of the Msg3 PUSCH. ii-b) The terminal may determine whether to repeatedly transmit a Msg3 PUSCH, by re-interpreting field information in DCI that is DCI format 0_0 scrambled by a TC-RNTI, which schedules retransmission of the Msg3 PUSCH. The field in ii-a) and ii-b) may be one of TDRA, FDRA, MCS, and TPC fields. A method of interpreting the field may be as follows.

The terminal may determine whether to re-interpret a TDRA field, based on the number of symbols scheduled by the field. For example, in a case where the number of symbols scheduled by a TDRA field is a particular number or greater, the terminal may determine whether to repeatedly transmit a Msg3 PUSCH, by re-interpreting field information in an uplink grant of a random access response. A base station allocates a large number of symbols to a terminal having a lack of coverage. Therefore, if the number of allocated symbols is a pre-configured particular number or greater, the terminal may repeatedly transmit a Msg3 PUSCH to solve the coverage problem. That is, if the number of allocated symbols is smaller than the pre-configured particular number, the terminal may not perform repetitive transmission of a Msg PUSCH. As another example, in a case where the number of symbols scheduled by a TDRA field is a particular number or smaller, the terminal may determine whether to repeatedly transmit a Msg3 PUSCH, by re-interpreting field information in an uplink grant of a random access response. This is because lack of coverage may be caused in a case where a base station allocates a small number of symbols to a terminal. That is, if the base station allocates symbols, the number of which is a particular number or greater, the terminal may not perform repetitive transmission of a Msg3 PUSCH. The particular number may be configured from a higher layer. The higher layer may indicate SIB1 or other SIBs.

The terminal may determine whether to repeatedly transmit a Msg3 PUSCH by re-interpreting an FDRA field, based on the number of PRBs scheduled by the FDRA field. For example, in a case where the number of PRBs indicated by an FDRA field is a particular number or greater, the terminal may determine whether to repeatedly transmit a Msg3 PUSCH, by re-interpreting field information in an uplink grant of a random access response. A base station allocates a large number of PRBs to a terminal having a lack of coverage. Therefore, if the number of allocated PRBs is a pre-configured particular number or greater, the terminal may repeatedly transmit a Msg3 PUSCH to solve the coverage problem. That is, if the number of allocated PRBs is smaller than the pre-configured particular number, the terminal may not perform repetitive transmission of a Msg PUSCH. As another example, in a case where the number of PRBs indicated by an FDRA field is a particular number or smaller, the terminal may determine whether to repeatedly transmit a Msg3 PUSCH, by re-interpreting field information in an uplink grant of a random access response. This is because a coverage problem may be caused in a case where a base station allocates a small number of PRBs to a terminal. That is, if the base station allocates, to the terminal, PRBs, the number of which is a particular number or greater, the terminal may not perform repetitive transmission of a Msg3 PUSCH. The particular number may be configured from a higher layer. The higher layer may indicate SIB1 or other SIBs.

The terminal may determine whether to transmit a Msg3 PUSCH by re-interpreting an MCS field according to a modulation scheme or a coding rate indicated by the field. For example, in a case where a modulation scheme indicated by an MCS field is low (e.g., QPSK) or a coding rate is low, the terminal may determine whether to repeatedly transmit a Msg3 PUSCH, by re-interpreting field information in an uplink grant of a random access response. A base station configures a low modulation scheme or a low coding rate to a terminal having lack of coverage. Therefore, if a modulation scheme or a coding rate is low, the terminal may perform repetitive transmission of a Msg3 PUSCH.

Table 4 and Table 5 show a modulation scheme and a coding rate which may be configured to a terminal. A modulation order in Table 4 and Table 5 means a modulation scheme, and if the modulation order is q, the modulation scheme may mean pi/2-BPSK (q=1) or QPSK (q=2), if same is 2, the modulation scheme may mean QPSK, if same is 4, the modulation scheme may mean 16 QAM, if same is 6, the modulation scheme may mean 64 QAM, and if same is 8, the modulation scheme may mean 256 QAM.

TABLE 4

| MCS Index $I_{MCS}$ | Modulation Order $Q_m$ | Target code Rate R × 1024 | Spectral efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5

| MCS Index $I_{MCS}$ | Modulation Order $Q_m$ | Target code Rate R × 1024 | Spectral efficiency |
| --- | --- | --- | --- |
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |

TABLE 5-continued

| MCS Index $I_{MCS}$ | Modulation Order $Q_m$ | Target code Rate R × 1024 | Spectral efficiency |
|---|---|---|---|
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

If transform precoding for PUSCH transmission of a terminal is configured to be disabled, Table 4 may be applied, and if same is configured to be enabled, Table 5 may be applied. In a case where initial transmission of a Msg3 PUSCH is scheduled to a terminal (i.e., transmission of a Msg3 PUSCH is configured by an uplink grant of a random access response), a base station may configure the first 16 MCS indexes (0-15) in Table 4 and/or Table 5. For example, referring to Table 4, a base station may configure QPSK, 16 QAM, and 64 QAM for a terminal as a modulation scheme, and referring to Table 5, the base station may configure pi/2-BPSK, QPSK, 16 QAM, and 64 QAM for the terminal as a modulation scheme. In relation to the modulation scheme, a low modulation scheme may be pi/2-BPSK or QPSK. That is, when pi/2-BPSK or QPSK is configured for a terminal, the terminal may repeatedly transmit a Msg3 PUSCH.

A terminal may determine whether to repeatedly transmit a Msg3 PUSCH by re-interpreting a TPC field, based on a TPC command indicated by the field. For example, in a case where a TPC command indicated by a TPC field indicates a particular value or greater, the terminal may determine whether to repeatedly transmit a Msg3 PUSCH, by re-interpreting field information in an uplink grant of a random access response. A base station may indicate a TPC command having a high value (a particular value or greater) to perform transmission using high power to a terminal having lack of coverage. Therefore, if the terminal receives a TPC command having a particular value or higher, the terminal may repeatedly transmit a Msg3 PUSCH. That is, if the base station configures, to the terminal, a TPC command smaller than a particular value, the terminal may not perform repetitive transmission of a Msg3 PUSCH.

A terminal may determine whether to repeatedly transmit a Msg3 PUSCH by re-interpreting a particular field, based on a TB size. A terminal may determine a TB size of a Msg3 PUSCH, based on a FDRA field, a TDRA field, and an MCS field, and may determine whether to repeatedly transmit the Msg3 PUSCH according to the TB size. For example, if the TB size is a particular value or smaller, the terminal may determine whether to repeatedly transmit a Msg3 PUSCH, by re-interpreting field information in an uplink grant of a random access response. A base station allocates a TB having a small size (e.g., a particular value or smaller) to a terminal having lack of coverage. Therefore, if a TB having a particular value or smaller is allocated to the terminal, the terminal may repeatedly transmit a Msg3 PUSCH. That is, if a TB having a particular value or greater is allocated, the terminal may not perform repetitive transmission of a Msg3 PUSCH.

Hereinafter, methods of determining, by a terminal, a repetitive transmission count of a Msg3 PUSCH will be described.

Method of Determining Repetitive Transmission Count of Msg3 PUSCH

A terminal may determine a repetitive transmission count of a Msg3 PUSCH according to a repetitive transmission count configured by a base station. The terminal may repeatedly transmit the Msg3 PUSCH according to the configured repetitive transmission count. The base station may configure multiple repetitive transmission count candidates for the terminal before indicating the repetitive transmission count. The repetitive transmission count candidates may be predetermined values, may be configured by broadcasting information, or may be configured in a higher layer. For example, the repetitive transmission count candidates may be configured such as {N1, N2, N3, N4 ... }. The repetitive transmission count candidates {N1, N2, N3, N4 ... } are natural numbers equal to or greater than 1, and may be powers of 2. For example, the multiple repetitive transmission count candidates may be {1, 2, 4, 8}. The terminal may repeat transmission of a Msg3 PUSCH as many times as one value among 1, 2, 4, and 8 indicated by the base station.

A repetitive transmission count of a Msg3 PUSCH may be configured for the terminal from a higher layer. For example, if an integer value of n is configured for the terminal from a higher layer as a repetitive transmission count of a Msg3 PUSCH, the terminal may repeat transmission of the Msg3 PUSCH n times.

The base station may configure, for the terminal, a repetitive transmission count of a Msg3 PUSCH by using a field of DCI that is DCI format 0_0 scheduling the Msg3 PUSCH or DCI that is DCI format 1_0 scheduling a random access response (Msg2). For example, the terminal may interpret, as bits indicating a repetitive transmission count of an Msg3 PUSCH, a particular number of bits in DCI that is DCI format 1_0 scrambled by an RA-RNTI and scheduling a random access response, and may perform repetitive transmission of the Msg3 PUSCH. As another example, the terminal may interpret, as bits indicating a repetitive transmission count of an Msg3 PUSCH, a particular number of bits in DCI that is DCI format 0_0 scrambled by a TC-RNTI and scheduling retransmission of the Msg3 PUSCH, and may perform repetitive transmission of the Msg3 PUSCH.

A repetitive transmission count indicated from i) a higher layer or by ii) DCI that is DCI format 0_0 or 1_0 may be one value among multiple repetitive transmission count candidates. Thereafter, the terminal may repeat transmission of a Msg3 PUSCH as many times as one indicated value.

A field including a particular number of bits in DCI that is DCI format 0_0 scrambled by a TC-RNTI according to ii) described above may be new data indicator (NDI), HARQ process number (HPN), CSI request, FDRA, and TPC fields. The NDI, HPN, and CSI request fields may not be used for transmission of a Msg3 PUSCH. Therefore, a terminal may interpret a value of the NDI, HPN, and CSI request fields as a field value for repetitive transmission of a Msg3 PUSCH.

A base station may schedule a small number of PRBs in the frequency domain or a PUSCH using as high transmission power as possible to a terminal having lack of coverage. Therefore, a terminal may interpret a value of a particular number of bits in a FDRA field as a field value for repetitive transmission of a Msg3 PUSCH, or may interpret a part of indexes indicating a low dB value of a TPC field as a field value for repetitive transmission of a Msg3 PUSCH.

Hereinafter, a method of interpreting, by a terminal, a particular number of bits in DCI that is DCI format 0_0 scrambled by a TC-RNTI, for repetitive transmission of a Msg3 PUSCH will be described. In the following description, repetitive transmission count candidates of a Msg PUSCH configured for a terminal may be {N1, N2, N3, N4}.

The terminal may interpret a bit value of one field among fields of DCI that is DCI format 0_0 scrambled by a TC RNTI as a repetitive transmission count of a Msg3 PUSCH. That is, the terminal may interpret, as a field value for repetitive transmission of a Msg3 PUSCH, X bits of one field among NDI, HPN, CSI request, FDRA, and TPC fields. For example, the terminal may interpret, as a field value for repetitive transmission of a Msg3 PUSCH, X (e.g., 2) bits of a HPN field. A base station may indicate one of four repetitive transmission counts (N1, N2, N3, and N4) by using two bits. For example, {00}=N1, {01}=N2, {10}=N3, and {11}=N4 may be configured.

The terminal may interpret a combination of bit values of two different fields among fields of DCI that is DCI format 0_0 scrambled by a TC_RNTI as a repetitive transmission count of a Msg3 PUSCH. That is, the terminal may interpret, as a field value for repetitive transmission of a Msg3 PUSCH, X bits of one field among NDI, HPN, CSI request, FDRA, and TPC fields, and Y bits of one field, which is not the field including the X bits, among the NDI, HPN, CSI request, FDRA, and TPC fields. For example, the terminal may interpret, as a field value for repetitive transmission of a Msg3 PUSCH, a combination of X (e.g., 1) bits of an NDI field and Y (e.g., 1) bits of an HPN field, the combination being two bits. The base station may indicate one of four repetitive transmission count candidates by using two bits. For example, {NDI, HPN} may be used to configure {0, 0}=N1, {0, 1}=N2, {1, 0}=N3, and {1, 1}=N4. Alternatively, {HPN, NDI} may be used to configure {0, 0}=N1, {0, 1}=N2, {1, 0}=N3, and {1, 1}=N4. As another example, the terminal may interpret, as a field value for repetitive transmission of a Msg3 PUSCH, a combination of X (e.g., 1) bits of an NDI field and Y (e.g., 1) bits of a CSI request field, the combination being two bits. If repetitive transmission count candidates of a Msg3 PUSCH configured for the terminal is {N1, N2, N3, N4}, the base station may indicate one of the four repetitive transmission count candidates by using two bits. For example, {NDI, CSI request} may be used to configure {0, 0}=N1, {0, 1}=N2, {1, 0}=N3, and {1, 1}=N4. Alternatively, {CSI request, NDI} may be used to configure {0, 0}=N1, {0, 1}=N2, {1, 0}=N3, and {1, 1}=N4.

The terminal may interpret bit values of two different fields among fields of DCI that is DCI format 0_0 scrambled by a TC_RNTI as field values for repetitive transmission of a Msg3 PUSCH. Specifically, the terminal may interpret X bits of one field of DCI and Y bits of a field different from the field including the X bits, as field values for repetitive transmission of a Msg3 PUSCH. For example, the X bits may indicate whether the terminal is to interpret the Y bits as a field value for repetitive transmission of the Msg3 PUSCH, and the Y bits may indicate a repetitive transmission count of the Msg3 PUSCH. For example, one bit of an NDI field may indicate whether the terminal is to interpret Y bits of a FDRA field as a field value for repetitive transmission of a Msg3 PUSCH. If the value of the one bit of the NDI field is "0", the Y bits of the FDRA field may not be interpreted as the field value for repetitive transmission of the Msg3 PUSCH, and if the value of the one bit of the NDI field is "1", the Y bits of the FDRA field may be interpreted as the field value for repetitive transmission of the Msg3 PUSCH. The Y bits may indicate one of repetitive transmission count candidates of the Msg3 PUSCH pre-configured for the terminal. For example, if the value of one bit of the NDI field is "1", Y (e.g., 2) bits of the FDRA field may indicate one of four repetitive transmission count candidates. Specifically, {FDRA} may be used to configure {00}=N1, {01}=N2, {10}=N3, and {11}=N4. As another example, one bit of a CSI request field may indicate whether the terminal is to interpret Y bits of an HPN field as a field value for repetitive transmission of a Msg3 PUSCH. If the value of the one bit of the CSI request field is "0", the Y bits of the HPN field may not be interpreted as the field value for repetitive transmission of the Msg3 PUSCH, and if the value of the one bit of the CSI request field is "1", the Y bits of the HPN field may be interpreted as the field value for repetitive transmission of the Msg3 PUSCH. If the value of one bit of the CSI request field is "1", Y (e.g., 2) bits of the HPN field may indicate one of four repetitive transmission counts. Specifically, {HPN} may be used to configure {00}=N1, {01}=N2, {10}=N3, and {11}=N4.

iii) A repetitive transmission count of an Msg3 PUSCH may be indicated to a terminal through a particular field of an uplink grant of a random access response, which schedules initial transmission of the Msg3 PUSCH. The terminal may repeatedly transmit the Msg3 PUSCH according to the indicated repetitive transmission count. The terminal may interpret, as a field value for repetitive transmission of a Msg3 PUSCH, a bit value of a particular field of an uplink grant. A particular bit of the uplink grant may indicate one of multiple repetitive transmission counts of the Msg3 PUSCH. The particular field of the uplink grant may be CSI request, FDRA, TPC, or MCS fields. The CSI request field may not be used for transmission of a Msg3 PUSCH. Therefore, a terminal may interpret a value of the CSI request field as a field value for repetitive transmission of a Msg3 PUSCH. For example, a base station may schedule a smaller number of PRBs in the frequency domain to a terminal having lack of coverage. Therefore, the terminal may interpret a bit value of an FDRA field as a field value for repetitive transmission of a Msg3 PUSCH. As another example, the base station may schedule a terminal having lack of coverage to transmit a PUSCH using as high transmission power as possible. Therefore, the terminal may interpret a part of indexes indicating a low dB value of a TPC field as a field value for repetitive transmission of a Msg3 PUSCH. The TPC field may have a 3-bit size, and a TPC value indicated by each code point is as shown in Table 6. As another example, a terminal having lack of coverage may be scheduled to transmit a PUSCH at a modulation scheme (e.g., QPSK) and/or a coding rate that is as low as possible. Therefore, a terminal may interpret a part of low indexes among the first 16 indexes (0-15) in Table 4 and Table 5, included in an MCS field, as a field for repetitive transmission of a Msg3 PUSCH.

TABLE 6

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

Hereinafter, a method of interpreting a particular number of bits in an uplink grant of a random access response will be additionally described. Repetitive transmission count candidates of a Msg PUSCH configured for a terminal may be {N1, N2, N3, N4}.

A bit value of one field among fields of an uplink grant may be configured to indicate a repetitive transmission count of a Msg3 PUSCH. That is, a terminal may interpret, as a field value for repetitive transmission of a Msg3 PUSCH, a value of X bits of a particular field among CSI request, FDRA, TPC, and MCS fields.

For example, a base station may configure X (e.g., 2) bits of an FDRA field as a field for repetitive transmission of a Msg3 PUSCH, and the base station may indicate one of four (N1, N2, N3, and N4) repetitive transmission counts by using the X (e.g., 2) bits. If a bit value of the FDRA field is "00", the terminal may determine N1 and if same is "01", the terminal may determine N2. If the FDRA field is "10", the terminal may determine N3, and if the FDRA field is "11", the terminal may determine "N4". X bits of the FDRA field may be determined by X=ceil(log 2(M)) when the number of repetitive transmission count candidates configured in a higher layer is M. The function ceil(x) in this specification is a function of giving the smallest integer among the integers equal to or greater than x. The X bits may be X bits starting from the most significant bit (MSB) other than bit(s) indicating frequency hopping in the FDRA field. Specifically, if the number of RBs included in an initial uplink (UL) BWP is smaller than 50, the X bits may be X bits starting from the second bit in the FDRA field, and if the number of RBs is equal to or greater than 50, the X bits may be X bits starting from the third bit in the FDRA field.

For example, the base station may configure X (e.g., 2) bits of a TPC field as bits of a field for repetitive transmission of a Msg3 PUSCH, and the base station may indicate one of four repetitive transmission counts by using the two bits of the TPC field. If a bit value of the TPC field is "00", the terminal may determine N1, if same is "01", the terminal may determine N2, if same is "10", the terminal may determine N3, and if same is "11", the terminal may determine "N4". X bits of the TPC field may be determined by X=ceil(log 2(M)) when the number of repetitive transmission count candidates configured in a higher layer is M. The X bits may be the most significant X bits (MSB) or the least significant X bits (LSB) in the TPC field having a 3-bit size.

For example, the base station may configure X (e.g., 2) bits of an MSC field as bits of a field for repetitive transmission of a Msg3 PUSCH, and the base station may indicate one of four repetitive transmission counts by using the two bits of the MSC field. If a bit value of the MSC field is "00", the terminal may determine N1, if same is "01", the terminal may determine N2, if same is "10", the terminal may determine N3, and if same is "11", the terminal may determine "N4". X bits of the MCS field may be determined by X=ceil(log 2(M)) when the number of repetitive transmission count candidates configured in a higher layer is M. The X bits may be the most significant X bits (MSB) or the least significant X bits (LSB) in the MCS field having a 4-bit size.

The terminal may interpret a repetitive transmission count of a Msg3 PUSCH by combining bit values of two different fields among fields of an uplink grant of a random access response. If the number of bits required for configuring a repetitive transmission count of a Msg3 PUSCH is Z, the terminal may interpret, as a repetitive transmission count of a Msg3 PUSCH, Z bits obtained by combining bits of two different fields. The terminal may interpret, as bits for repetitive transmission of a Msg3 PUSCH, X bits of a first field among CSI request, FDRA, TPC, and MCS fields and Y bits of a second field. The first field and the second field are different fields, and X plus Y is equal to Z (X+Y=Z). In addition, X is smaller than Z (X<Z), Y is smaller than Z (Y<Z), and Z is at least two bits. If X=Z bits of the first field may be interpreted by the terminal as a repetitive transmission count of a Msg3 PUSCH, a repetitive transmission count of a Msg3 PUSCH may be indicated using the X bits of the first field.

If the number of repetitive transmission count candidates of a Msg3 PUSCH is M (e.g., 4)({N1, N2, N3, N4}), Z bits are required to indicate a repetitive transmission count to the terminal. Here, Z may be Z=ceil(log 2(M)) bits. If M is 4, Z is equal to 2. For example, X (e.g., 1) bits of the first field (e.g., a CSI request field) and Y (e.g., 1) bits of the second field (e.g., an FDRA field or an MCS field) may be interpreted as bits for repetitive transmission of a Msg3 PUSCH, and the base station may indicate one of four repetitive transmission counts by using the two bits. If {the value of one bit in the first field, the value of one bit in the second field} is {0,0}, the repetitive transmission count may be configured to N1, if same is {0,1}, N2 may be configured, if same is {1,0}, N3 may be configured, and if same is {1,1}, N4 may be configured.

In addition to the above embodiments, a field for repetitive transmission of a Msg3 PUSCH in an uplink grant of a random access response or DCI that is DCI format 0_0 scrambled by a TC-RNTI may be at least one of TDRA, FDRA, MCS, and TPC fields. The terminal may re-interpret a bit value of one or multiple fields to perform repetitive transmission of a Msg3 PUSCH. Hereinafter, a detailed method of interpreting a bit value of a field will be additionally described. Repetitive transmission count candidates of a Msg PUSCH configured for a terminal may be {N1, N2, N3, N4}.

The terminal may repeatedly transmit a Msg3 PUSCH, based on the number of symbols scheduled (allocated) by a TDRA field. For example, if the number of symbols allocated for transmission of a Msg3 PUSCH is 1 to (M1−1), the terminal may determine N1 as the repetitive transmission count, if same is M1 to (M2−1), may determine N2 as the repetitive transmission count, if same is M2 to (M3−1), may determine N3 as the repetitive transmission count, and if same is M3 to (M4−1), may determine N4 as the repetitive transmission count. Here, M1<M2<M3<M4 and N1>N2>N3>N4 may be satisfied. This is because lack of coverage may be deepened in a case where a base station allocates a small number of symbols to a terminal. That is, when a small number of symbols are allocated, a terminal may repeat transmission of a Msg3 PUSCH more times. As another example, N1<N2<N3<N4 may be satisfied. This is because a base station may allocate a large number of symbols to a terminal having lack of coverage. That is, when a base station allocates many symbols, a terminal may repeat transmission of a Msg3 PUSCH more times. The number of allocated symbols may be configured from a higher layer and, specifically, may be configured through SIB1 or other SIBs.

The terminal may repeatedly transmit a Msg3 PUSCH, based on the number of PRBs scheduled by a FDRA field. For example, if the number of PRBs allocated for PUSCH transmission is 1 to (M1−1), the terminal may determine N1 as the repetitive transmission count, if same is M1 to (M2−1), may determine N2 as the repetitive transmission count, if same is M2 to (M3−1), may determine N3 as the repetitive transmission count, and if same is M3 to (M4−1), may determine N4 as the repetitive transmission count. M1<M2<M3<M4 and N1>N2>N3>N4 may be satisfied. This is because lack of coverage may be deepened in a case where a base station has allocated a small number of PRBs to a terminal. That is, when a small number of PRBs are allocated, a terminal may repeat transmission of a Msg3 PUSCH more times. As another example, N1<N2<N3<N4 may be satisfied. This is because a base station may allocate a large number of PRBs to a terminal having lack of coverage. That is, when a base station allocates many PRBs, a terminal may repeat transmission of a Msg3 PUSCH more times. The number of allocated PRBs may be configured from a higher layer and, specifically, may be configured through SIB1 or other SIBs.

The terminal may repeatedly transmit a Msg3 PUSCH, based on a modulation scheme or a coding rate indicated by an MCS field. For example, if the index in an MCS table indicated by the MCS field is 0 to (M1−1), the terminal may determine N1 as the repetitive transmission count, if same is M1 to (M2−1), may determine N2 as the repetitive transmission count, if same is M2 to (M3−1), may determine N3 as the repetitive transmission count, and if same is M3 to (M4−1), may determine N4 as the repetitive transmission count. M1<M2<M3<M4 and N1>N2>N3>N4 may be satisfied. This is because a base station may configure a low modulation scheme or a low coding rate to a terminal having lack of coverage. That is, the lower the modulation scheme or the coding rate is configured to be, the more times a terminal may repeat transmission of a Msg3 PUSCH.

The terminal may repeatedly transmit a Msg3 PUSCH, based on a TPC command indicated by a TPC field. For example, if the TPC command index indicated by the TPC field is 0 to (M1−1), the terminal may determine N1 as the repetitive transmission count, if same is M1 to (M2−1), may determine N2 as the repetitive transmission count, if same is M2 to (M3−1), may determine N3 as the repetitive transmission count, and if same is M3 to (M4−1), may determine N4 as the repetitive transmission count. M1<M2<M3<M4 and N1>N2>N3>N4 may be satisfied. This is because a base station may configure a TPC command having a high value to perform transmission using high power to a terminal having lack of coverage. That is, the higher the TPC command value is configured to be, the more times a terminal may repeat transmission of a Msg3 PUSCH.

The terminal may repeatedly transmit a Msg3 PUSCH, based on a TB size. For example, the terminal may determine the size of a TB in which a Msg3 PUSCH is transmitted, based on FDRA, TDRA, and/or MCS fields. If the determined TB size is 0 to (M1−1), the terminal may determine N1 as the repetitive transmission count, if same is M1 to (M2−1), may determine N2 as the repetitive transmission count, if same is M2 to (M3−1), may determine N3 as the repetitive transmission count, and if same is M3 to (M4−1), may determine N4 as the repetitive transmission count. M1<M2<M3<M4 and N1>N2>N3>N4 may be satisfied. This is because a base station may configure a small TB size to a terminal having lack of coverage. That is, the smaller the TB size is configured to be, the more times a terminal may repeat transmission of a Msg3 PUSCH.

iv) A TDRA table including a repetitive transmission count of a Msg3 PUSCH may be configured for a terminal by a base station. Each entry in the TDRA table may include time domain resource information of a Msg3 PUSCH and information on a repetitive transmission count. In addition, each entry may include the same repetitive transmission count or different repetitive transmission counts. The terminal may determine a repetitive transmission count of a Msg3 PUSCH with reference to the TDRA table. For example, in a case where the terminal is configured to repeatedly transmit a Msg3 PUSCH, the terminal may repeatedly transmit the Msg3 PUSCH with reference to the TDRA table. On the other hand, in a case where the terminal is configured not to repeatedly transmit a Msg3 PUSCH, the terminal may transmit the Msg3 PUSCH with reference to a conventional TDRA table. The conventional TDRA table may indicate a table not including a repetitive transmission count of a Msg3 PUSCH.

One or more repetitive transmission counts described in this specification may be a value used in common for initial transmission and retransmission of a Msg3 PUSCH, or a value used independently therefor. In a case where a base station indicates retransmission of a Msg3 PUSCH, a terminal may determine a repetitive transmission count for retransmission of the Msg3 PUSCH, based on a repetitive transmission count indicated for initial transmission of the Msg3 PUSCH.

The terminal may determine a repetitive transmission count for retransmission of the Msg3 PUSCH, based on a bit of a particular field of DCI transmitted by the base station, or determine a repetitive transmission count for retransmission of the Msg3 PUSCH through a TDRA table. The DCI may be DCI format 0_0 in which a CRC is scrambled by a TC-RNTI.

a) The value of a bit may indicate that a repetitive transmission count for retransmission of a Msg3 PUSCH is the same as a repetitive transmission count for initial transmission of the Msg3 PUSCH. For example, if the value of some bits is 0 or the value of all the bits is 0, the terminal may determine that a repetitive transmission count for retransmission of a Msg3 PUSCH is the same as a repetitive transmission count for initial transmission of the Msg3 PUSCH.

b) A repetitive transmission count for retransmission of a Msg3 PUSCH may be determined based on a repetitive transmission count for initial transmission of the Msg3 PUSCH.

b-i) One of bit values of DCI may indicate that repetitive transmission counts for retransmission and initial transmission of a Msg3 PUSCH are the same.

b-ii) One of bit values of DCI may indicate that a repetitive transmission count for retransmission of a Msg3 PUSCH is greater than a repetitive transmission count for initial transmission of the Msg3 PUSCH. Specifically, one of bit values of DCI may indicate that a repetitive transmission count for retransmission of a Msg3 PUSCH is two times greater than a repetitive transmission count for initial transmission of the Msg3 PUSCH. In a case where a repetitive transmission count for initial transmission of a Msg3 PUSCH has already reached a maximum repetitive transmission count (or a determined repetitive transmission count for retransmission of the Msg3 PUSCH exceeds the maximum repetitive transmission count), the terminal may retransmit the Msg3 PUSCH according to the maximum repetitive transmission count.

b-iii) One of bit values of DCI may indicate that a repetitive transmission count for retransmission of a Msg3 PUSCH is smaller than a repetitive transmission count for initial transmission of the Msg3 PUSCH. Specifically, one of bit values of DCI may indicate that a repetitive transmission count for retransmission of a Msg3 PUSCH is ½ of a repetitive transmission count for initial transmission of the Msg3 PUSCH. In a case where an initial repetitive transmission count of a Msg3 PUSCH has already reached a minimum repetitive transmission count (e.g., the repetitive transmission count is 1) (or a determined repetitive transmission count for retransmission of the Msg3 PUSCH is smaller than the minimum repetitive transmission count (e.g., the repetitive transmission count is 1), the terminal may retransmit the Msg3 PUSCH according to the minimum repetitive transmission count.

The bit of the particular field of the DCI described above may be replaced with some entries in a TDRA table. For example, a repetitive transmission count for retransmission of a Msg3 PUSCH indicated by some entries in a TDRA table may be identical to, greater than (e.g., two times greater than), or smaller than (e.g., is ½ times smaller than) a repetitive transmission count for initial transmission of the Msg3 PUSCH.

Method of Stopping Repetitive Transmissions of Msg3 PUSCH

In a case where a terminal is configured, by a base station, to repeat transmission of a Msg3 PUSCH K times, the terminal may repeat transmission of the Msg3 PUSCH K times. The repeatedly transmitted Msg3 PUSCHs are the same. Therefore, if the base station has successfully received some of the K Msg3 PUSCHs, repetitive transmission of the Msg3 PUSCH may not be required. Therefore, hereinafter, a method of stopping repetitive transmission of a Msg3 PUSCH will be described.

i) The terminal may determine whether to repeatedly transmit a Msg3 PUSCH, based on whether a PDCCH scheduling Msg4 is received. The terminal may detect a PDCCH scheduling Msg4 transmitted from the base station after transmitting the first Msg3 PUSCH. If the terminal has received the PDCCH scheduling Msg4, the terminal may recognize that the base station has successfully received the Msg3 PUSCH. Therefore, if a PDCCH scheduling Msg4 is received, the terminal may not perform repetitive transmission of a Msg3 PUSCH thereafter and stop same. The PDCCH scheduling Msg4 may include DCI that is DCI format 1_0 scrambled by a TC-RNTI.

ii) The terminal may determine whether to repeatedly transmit a Msg3 PUSCH, based on whether a PDCCH scheduling retransmission of the Msg3 PUSCH is received. The terminal may detect a PDCCH scheduling retransmission of the Msg3 PUSCH transmitted from the base station after transmitting the first Msg3 PUSCH. If the terminal has received a PDCCH scheduling Msg3, the terminal may receive scheduling information of a new Msg3 PUSCH. Therefore, the terminal may stop repetitive transmission of the Msg3 PUSCH being currently transmitted. The PDCCH scheduling the Msg3 PUSCH may include DCI that is DCI format 0_0 scrambled by a TC-RNTI.

iii) The terminal may determine whether to repeatedly transmit a Msg3 PUSCH, based on whether an uplink grant of a random access response (Msg2), which schedules initial transmission of the Msg3 PUSCH, is received. The terminal may receive a PDCCH scheduling an uplink grant of Msg2 and the uplink grant of Msg2 after transmitting the first Msg3 PUSCH. If the terminal has received an uplink grant of Msg2 or a PDCCH scheduling the uplink grant of Msg2, scheduling information of a new Msg3 PUSCH may be configured for the terminal. Therefore, the terminal may stop repetitive transmission of the Msg3 PUSCH being currently transmitted. The PDCCH scheduling an uplink grant of Msg2 may include DCI that is DCI format 1_0 scrambled by an RA-RNTI.

iv) The terminal may perform repetitive transmission of a Msg3 PUSCH within a particular time window, and when the particular time window is terminated, may stop the repetitive transmission of the Msg3 PUSCH. The repetitive transmission of the Msg3 PUSCH may not be performed in a particular situation (e.g., the situation where repetitive transmission of a Msg3 PUSCH is stopped as described in i) to iii)), and may be deferred to subsequent slots. Therefore, the repetitive transmission of the Msg3 PUSCH may be deferred after a particular time. In order to prevent deferring, the terminal may perform repetitive transmission of a Msg3 PUSCH only for a particular time (slots) from the first transmission of the Msg3 PUSCH. That is, the terminal may perform repetitive transmission of a Msg3 PUSCH within a particular time (slots), but when the particular time (slots) is ended, may not perform the repetitive transmission of the Msg3 PUSCH any longer.

As described above, the terminal may re-interpret a CSI request field, an FDRA field, and TPC and MCS fields to determine a repetitive transmission count of a Msg3 PUSCH. Hereinafter, a method of determining, by a terminal, whether to re-interpret the CSI request field, the FDRA field, and the TPC field in order to determine a repetitive transmission count of a Msg3 PUSCH will be described.

Method of Determining Whether to Re-Interpret Field for Repetitive Transmission Count of Msg3 PUSCH i) In a case where a separate PRACH resource (e.g., PRACH preamble or RACH occasion) for repetitive transmission of a Msg3 PUSCH is configured for a terminal by a base station, and the terminal transmits a PRACH to the base station on the separate PRACH resource, the terminal may re-interpret a CSI request field, an FDRA field, and a TPC field, based on the above method. On the contrary, a terminal having transmitted a PRACH on a resource other than the separate PRACH resource may always re-interpret a CSI request field, an FDRA field, and a TPC field for the original purpose. The separate PRACH resource may be configured for the terminal by the base station while being included in SIB1. That is, the terminal may repeatedly transmit a Msg3 PUSCH on a resource determined based on at least one of a PRACH preamble and a RACH occasion. For example, the base station may identify which resource on which the PRACH is transmitted by the terminal. If the PRACH has been transmitted by the terminal on the separate PRACH resource, the base station may indicate a repetitive transmission count of a Msg3 PUSCH by using at least one or two fields among a CSI request field, an FDRA field, and a TPC field. When the base station indicates the repetitive transmission count, a repetitive transmission count of 1 may be indicated. That is, a Msg3 PUSCH not being repeatedly transmitted may be configured. The value of one of pre-configured multiple repetitive transmission count candidates (e.g., N1, N2, N3, and N4) may be configured to be "1". In addition, N1 is 1 that is pre-arranged (not separately configured), and the base station may only configure the values of N2, N3, and N4.

The base station may indicate whether a Msg3 PUSCH is repeatedly transmitted, through a particular field (e.g., a CSI request field). As described above, even though the terminal transmits a PRACH on a resource separately configured by the base station, the base station may indicate not to perform repetitive transmission of a Msg3 PUSCH through a particular field. In a case where the base station has indicated to perform repetitive transmission of a Msg3 PUSCH through a particular field (e.g., a CSI request field), a repetitive transmission count may be indicated using at least one or two fields between the FDRA field and the TPC field. In this case, the base station is not required to indicate 1 as a repetitive transmission count of a Msg3 PUSCH. This is because the base station is able to indicate not to perform repetitive transmission of a Msg3 PUSCH through the particular field. Therefore, the values of the repetitive transmission count candidates (N1, N2, N3, and N4) may not include 1. That is, the repetitive transmission count candidate may be configured to have a value greater than 1.

ii) A terminal may determine whether to re-interpret a CSI request field, an FDRA field, and a TPC field for the purpose of repetitive transmission of a Msg3 PUSCH, based on a particular field. The particular field may be one field in an uplink grant of a random access response. For example, the particular field may be a CSI request field, and whether to perform reinterpretation may be determined based on the value of one bit in the CSI request field. If the value of the CSI request field is 0, the terminal may interpret a FDRA field and a TPC field for the original purpose (that is not the purpose of identifying whether to repeatedly transmit a Msg3 PUSCH). If the value of the CSI request field is 1, the terminal may re-interpret the FDRA field and the TPC field. The CSI field is used to determine whether to perform reinterpretation, and thus is excluded from the above fields re-interpreted for repetitive transmission of a Msg3 PUSCH.

Method of Determining Transmission Power Command Value

A terminal is required to determine a TPC command value of a Msg3 PUSCH. The terminal may determine, as a transmission power command (TPC) value, an increase of 8 dB that is highest in Table 6 in a case where a Msg3 PUSCH is repeatedly transmitted. In a case where the terminal repeatedly transmits a Msg3 PUSCH, a base station may configure a particular value for the terminal as a TPC value.

The terminal may determine a transmission power command value, based on a remaining bit(s) remaining after excluding X bits for repetitive transmission of a Msg3 PUSCH. The number of the remaining bit(s) is 3−X, and thus the remaining bit(s) may be one bit or two bits.

Hereinafter, a detailed method of determining a TPC command value, based on the remaining bit(s) will be described.

i) If the remaining bit(s) is one bit, the terminal may insert "11" into two bits that are MSBs. Therefore, the terminal may determine a TPC value, based on Table 6 and "11a" (here, a is the value of the remaining one bit). If the value (a) of the remaining one bit is 0, this denotes "110". "110" is 6, and thus may indicate an increase of 6 dB with reference to Table 6. If the value (a) of the remaining one bit is 1, this denotes "111". "111" is 7, and thus may indicate an increase of 8 dB with reference to Table 6. That is, only the two highest TPC command values (6 and 7) may be indicated to the terminal with reference to Table 6.

ii) If the remaining bits are one bit, a TPC value may be determined according to the value of the one bit. Specifically, a TPC value may be determined according to Table 7.

TABLE 7

| TPC Command | Value (in dB) |
|---|---|
| 0 | TPC_0 |
| 1 | TPC_1 |

Referring to Table 7, if the value (a) of the remaining one bit is "0", the terminal may use a TPC_0 value, and if the value of the remaining one bit is "1", the terminal may use a TPC_1 value. TPC_0 and TPC_1 may be predetermined values, or may be separately configured by the base station. The values of TPC_0 and TPC_1 may be two values among −6, −4, −2, 0, 2, 4, 6, and 8. The TPC_0 value may be one of the negative values (or values other than the positive values) among −6, −4, −2, 0, 2, 4, 6, and 8, and the TPC_1 value may be one of the positive values. In addition, in order to expand PUSCH coverage, the values of TPC_0 and TP_1 may be determined to be two positive values (or values other than the negative values) among −6, −4, −2, 0, 2, 4, 6, and 8. The difference between the TPC_0 value and the TPC_1 value may be 4 dB. Specifically, TPC_0 may be 4 dB and TPC_1 may be 8 dB, TPC_0 may be 2 dB and TPC_1 may be 6 dB, or TPC_0 may be 0 dB and TPC_1 may be 4 dB. The difference between the TPC_0 value and the TPC_1 value may be 8 dB. Specifically, TPC_0 may be 0 dB and TPC_1 may be 8 dB.

If the remaining bits are two bits, the terminal may insert "1" into an MSB one bit similarly to the method of i). Therefore, the terminal may determine a TPC value, based on Table 6 and "1ab" (here, ab is the value of the remaining two bits). That is, if the value (ab) of the remaining two bits is 00, this denotes "100". "100" is 4, and thus may indicate an increase of 2 dB. Similarly, if the value of the remaining two bits is 01, this denotes "101". "101" is 5, and thus may indicate an increase of 4 dB. If the value of the remaining two bits is 10, this denotes "110". "110" is 6, and thus may indicate an increase of 6 dB. If the value of the remaining two bits is 11, this denotes "111". "111" is 7, and thus may indicate an increase of 8 dB. Only the four highest TPC command values (4, 5, 6, and 7) in Table 6 may be indicated to the terminal.

If the remaining bits are two bits, four TPC values may be determined according to the value of the remaining two bits similarly to the method of ii). Specifically, a TPC value may be determined according to Table 8.

TABLE 8

| TPC Command | Value (in dB) |
|---|---|
| 0 | TPC_0 |
| 1 | TPC_1 |
| 2 | TPC_2 |
| 3 | TPC_3 |

If the value (ab) of the remaining two bits is "00", the terminal may use a TPC_0 value, if same is "01", the terminal may use a TPC_1 value, if same is "10", the terminal may use a TPC_2 value, and if same is "11", the terminal may use a TPC_3 value. TPC_0, TPC_1, TPC_2, and TPC_3 may be predetermined values, or may be values separately configured by the base station. The values of TPC_0, TPC_1, TPC_2, and TPC_3 may be four values among −6, −4, −2, 0, 2, 4, 6, and 8. The TPC_0 value may be one of the negative values (or values other than the positive values) among −6, −4, −2, 0, 2, 4, 6, and 8, and the TPC_1, TPC_2, and TPC_3 values may be positive values. In addition, the TPC_0 and TPC_1 values may be negative values (or values other than the positive values) among −6, −4, −2, 0, 2, 4, 6, and 8, and the TPC_2 and TPC_3 values may be positive values. In addition, in order to expand PUSCH coverage, the values of TPC_0, TPC_1, TPC_2, and TPC_3 may be four positive values (or values other than the negative values) among −6, −4, −2, 0, 2, 4, 6, and 8. In addition, the difference between the TPC_0, TPC_1, TPC_2, and TPC_3 values may be 4 dB. Specifically, TPC_0 may be −6 dB, TPC_1 may be −2 dB, TPC_2 may be 2 dB, and TPC_3 may be 6 dB. In addition, TPC_0 may be −4 dB, TPC_1 may be 0 dB, TPC_2 may be 4 dB, and TPC_3 may be 8 dB.

In the above description, a method of performing, by a base station, signaling related to repetitive transmission of a Msg3 PUSCH has been described. Pieces of information related to repetitive transmission of a Msg3 PUSCH may be configured using some bits of a particular field of DCI or an uplink grant of a random access response. The method using some bits requires adding of some bits, and thus may cause overhead. In addition, pieces of information related to repetitive transmission of a Msg3 PUSCH may be configured through a method of re-interpreting a particular field of an uplink grant or DCI, or re-interpreting a bit of the particular field. The method of re-interpreting may restrict flexible scheduling by a base station. In addition, a base station may fail to recognize information on whether a terminal supports repetitive transmission of a Msg3 PUSCH. In this case, even when a base station configures pieces of information related to repetitive transmission of a Msg3 PUSCH, a terminal may fail to perform repetitive transmission of the Msg3 PUSCH and misinterpret an uplink grant or DCI. In order to solve the above problems, hereinafter, a method of notifying of the number of repetitive transmissions or whether repetitive transmission of a Msg3 PUSCH is performed, when a terminal transmits a Msg3 PUSCH to a base station, will be described.

Figure 17:
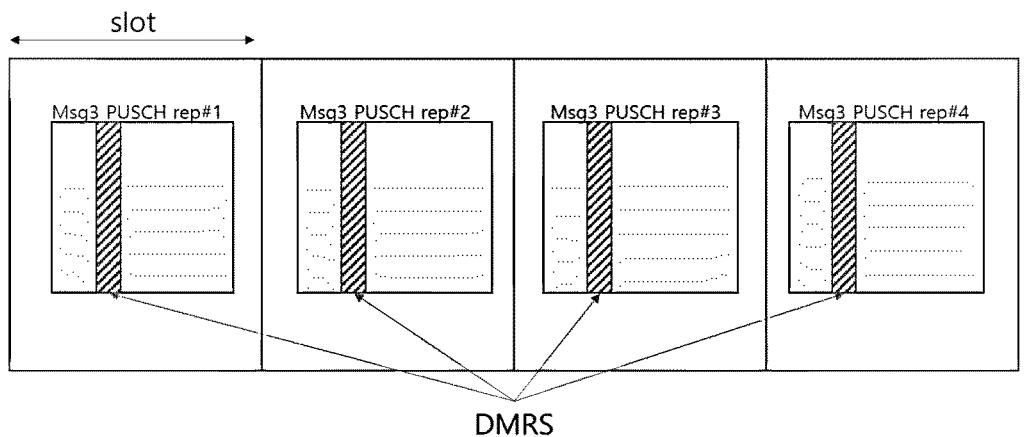
FIG. 17 is a diagram showing repetitive transmission of a Msg3 PUSCH according to an embodiment of the present disclosure.

Method of Signaling Information Related to Repetitive Transmission through Msg3 PUSCH FIG. 17 is a diagram showing repetitive transmission of a Msg3 PUSCH according to an embodiment of the present disclosure.

Referring to FIG. 17, a terminal may repeatedly transmit a Msg3 PUSCH on four slots. The Msg3 PUSCH transmitted on each slot may transmit the same TB. The same TB may be repeatedly transmitted on each slot at the same or different redundancy versions (RVs). The Msg3 PUSCH transmitted on each slot may include at least one DMRS symbol. The DMRS symbol may indicate a symbol to which a DMRS is mapped. The Msg3 PUSCH transmitted on each slot may include multiple DMRS symbols. The earliest transmitted DMRS symbol among the multiple DMRS symbols may be referred to as the first DMRS symbol, and the DMRS symbols transmitted thereafter may be referred to as additional DMRS symbols. In this specification, for convenience of explanation, the first DMRS symbol is referred to as a DMRS symbol, but may also obviously mean an additional DMRS symbol.

A base station configures information related to transmission of a Msg3 PUSCH for a terminal (e.g., configures same through an uplink grant). Therefore, the base station may be, in advance, aware of a resource (slot, symbol, PRB, etc.) in which the first Msg3 PUSCH (Msg3 PUSCH rep #1) is transmitted. In addition, the base station may be, in advance, aware of the position of a DMRS symbol included in Msg3 PUSCH rep #1. The base station may receive Msg3 PUSCH rep #1 transmitted by the terminal, based on information related to repetitive transmission. The same TB is repeatedly transmitted in each slot, and thus even when only Msg3 PUSCH rep #1 is received, the base station may decode a TB transmitted by Msg3 PUSCH rep #1. However, in a case where a channel environment is not good, even when Msg3 PUSCH rep #1 is received, the base station may fail to decode a TB transmitted by Msg3 PUSCH rep #1. The base station may receive the second Msg3 PUSCH (Msg3 PUSCH rep #2) in a slot next to the slot in which Msg3 PUSCH rep #1 is transmitted. Specifically, the base station may determine whether to receive Msg3 PUSCH rep #2 on the same symbol position and/or the same PRBs as those of Msg3 PUSCH rep #1 in a slot next to the slot in which Msg3 PUSCH rep #1 is transmitted. The base station may not be able to identify whether the terminal repeatedly transmits a Msg3 PUSCH. Therefore, in order to determine whether to receive Msg3 PUSCH rep #2, the base station may measure energy of a time-frequency resource in which Msg3 PUSCH rep #2 is expected to be transmitted, and may measure a DMRS correlation in a time-frequency resource in which a DMRS of Msg3 PUSCH rep #2 is expected to be transmitted. Through this measurement result, the base station may determine (identify) whether the terminal has transmitted Msg3 PUSCH rep #2. If the base station determines, through the measurement result, that Msg3 PUSCH rep #2 has been transmitted, the base station may combine Msg3 PUSCH #1 and Msg3 PUSCH #2 to obtain a lower code rate, and may be more likely to decode a TB transmitted by the Msg3 PUSCH. The code rate may be obtained, and thus the possibility of decoding the TB transmitted by a Msg3 PUSCH may be increased. A process in which the base station determines whether a Msg3 PUSCH is repeatedly transmitted may be repeatedly performed in a slot in which there is a possibility of transmission of the Msg3 PUSCH. However, a terminal repeatedly transmitting a Msg3 PUSCH is positioned at the edge of a cell and thus has lack of coverage. Therefore, a problem may occur in that performance for the measurement result may be deteriorated. In addition, a base station is required to identify, for each slot, whether a Msg3 PUSCH is repeatedly transmitted, and thus complexity may be increased.

Figure 18:
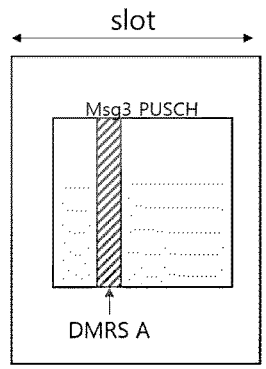
FIG. 18 is a diagram showing repetitive transmission of a Msg3 PUSCH using three DMRSs according to an embodiment of the present disclosure.
Figure 18:
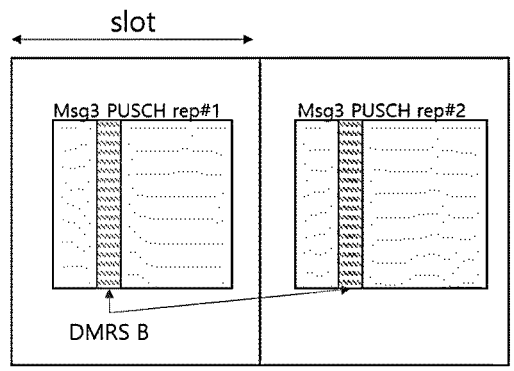
Figure 18:
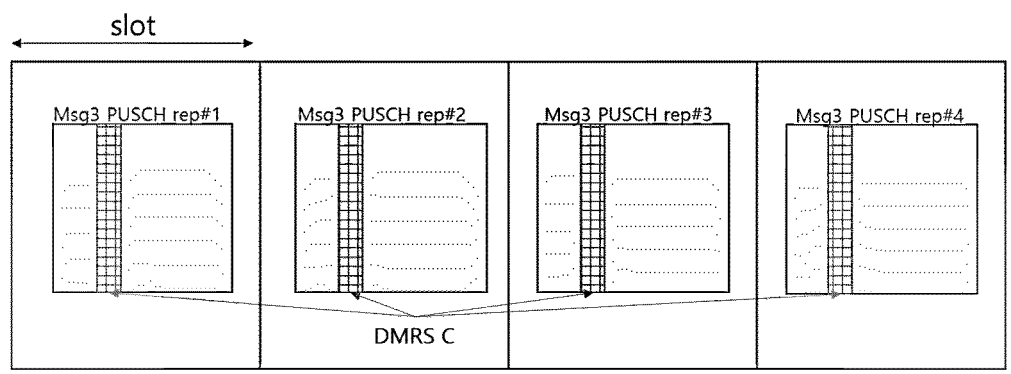

FIG. 18 is a diagram showing repetitive transmission of a Msg3 PUSCH using three DMRSs according to an embodiment of the present disclosure.

Referring to FIG. 18, there may be three methods of transmitting a Msg3 PUSCH by a terminal. (a) The terminal may transmit a Msg3 PUSCH without repetition. In other words, the terminal may transmit a Msg3 PUSCH only in one slot and not repeatedly transmit the Msg3 PUSCH in subsequent slots. (b) The terminal may repeat transmission of a Msg3 PUSCH two times. This method may be applied to a case where many repetitive transmissions of a Msg3 PUSCH are not required even when an uplink channel environment is bad. (c) The terminal may repeat transmission of a Msg3 PUSCH four times. In comparison with the method of (b), this method may be applied in a case where an uplink channel environment is worse.

In addition, referring to FIG. 18, the terminal may use a DMRS to indicate a Msg3 PUSCH transmission method (whether same is repeatedly transmitted) to a base station. Specifically, in a case where the terminal transmits a Msg3 PUSCH in the method of (a), DMRS A may be used to indicate a Msg3 PUSCH transmission method. In a case where a terminal transmits a Msg3 PUSCH in the method of (b), DMRS B in each of Msg3 PUSCH rep #1 and Msg3 PUSCH rep #2 in two slots may be used to indicate a Msg3 PUSCH transmission method. In a case where the terminal transmits a Msg3 PUSCH in the method of (c), DMRS C in each of Msg3 PUSCH rep #1, Msg3 PUSCH rep #2, Msg3 PUSCH rep #3, and Msg3 PUSCH rep #4 in four slots may be used to indicate a Msg3 PUSCH transmission method. That is, when DMRS A is received, the base station may recognize that a Msg3 PUSCH is transmitted one time, when DMRS B is received, the base station may recognize that transmission of a Msg3 PUSCH is repeated two times, and when DMRS C is received, the base station may recognize that transmission of a Msg3 PUSCH is repeated four times.

Different basic sequences (base sequences) may be applied to DMRS A, DMRS B, and DMRS C, respectively. Different basic sequences are applied to DMRS A, DMRS B, and DMRS C, respectively, and thus the base station may determine which basic sequence has been applied, by measuring the correlation between basic sequences.

DMRS A, DMRS B, and DMRS C may have the same basic sequence, but the sequences thereof may be initialized to be different sequence initial values (sequence initialization). If the sequence of DMRS A is initialized to be a first value, the sequences of DMRS B and DMRS C may be initialized to be a second value and a third value, respectively. The base station may measure a correlation under the assumption of sequence initialization to the first value, the second value, and the third value, and may determine which sequence initialization value has been used, based on a result of the correlation measurement. For example, a DMRS of a Msg3 PUSCH in which transmit precoding is activated may be as in Equation 1.

$$c_{init}=(2^{17}(N_{symb}^{slot}n_{s,f}^{\mu}+l+1)(2N_{ID}^{nSCID}+1)+2N_{ID}^{nSCID}+n_{SCID})\bmod 2^{31}$$ [Equation 1]

In Equation 1, $N_{symb}^{slot}$ may denote the number of symbols per slot, $n_{s,f}^{\mu}$ may denote the index of a slot in a frame having a subcarrier spacing setting of $\mu$, l may denote the index of an OFDM symbol in a slot, and $N_{ID}^{nSCID}$ may denote a scrambling identity according to a DMRS sequence initialization value of $n_{SCID}$ (0 or 1). Referring to Equation 1, DMRS A, DMRS B, and DMRS C may be distinguished by at least different c_init values.

DMRS A, DMRS B, and DMRS C may be transmitted through different DMRS ports, respectively. In other words, the terminal may transmit Msg3 PUSCHs through different DMRS ports. The base station may determine which DMRS has been used, based on a DMRS port of a Msg3 PUSCH transmitted by the terminal.

The base station may determine whether a DMRS on the first slot in which a Msg3 PUSCH is transmitted is DMRS A, DMRS B, or DMRS C, to identify whether the Msg3 PUSCH is repeatedly transmitted or how many times transmission is repeated. The base station may receive the Msg3 PUSCH according to a result of DMRS determination.

However, a terminal having low coverage repeatedly transmits a Msg3 PUSCH, and thus there may be a low possibility that a base station correctly determines a DMRS of the Msg3 PUSCH. Therefore, the base station may determine a method of transmitting a Msg3 PUSCH on the first slot, through one DMRS among multiple DMRSs (DMRS A, DMRS B, and DMRS C) at a low accuracy. Therefore, hereinafter, a method of indicating, by a terminal, a Msg3 PUSCH transmission method by using two DMRSs (DMRS A and DMRS B) will be described.

Figure 19:
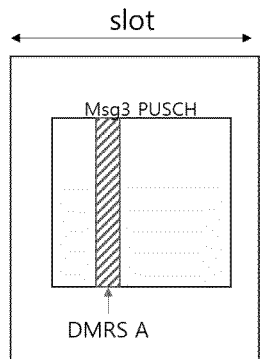
FIG. 19 to FIG. 21 illustrate a Msg3 PUSCH transmission method using two DMRSs according to an embodiment of the present disclosure.
Figure 19:
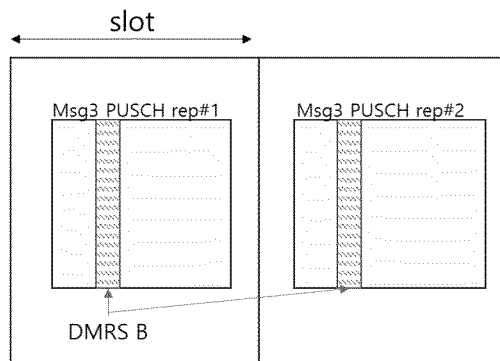
Figure 19:
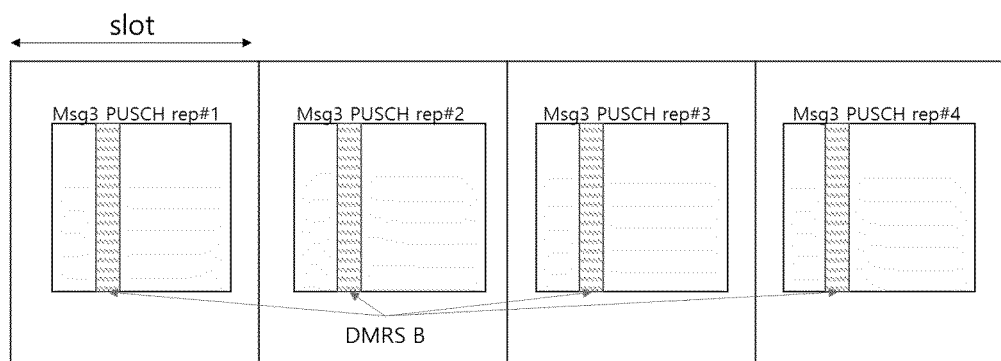
Figure 20:
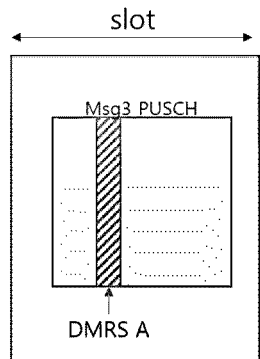
Figure 20:
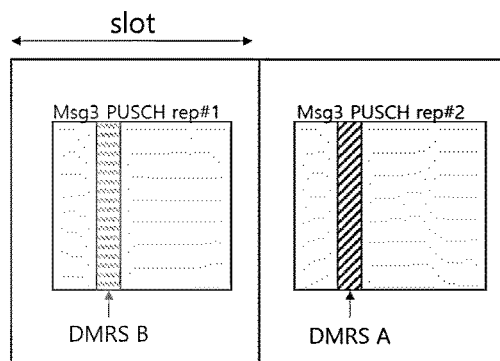
Figure 20:
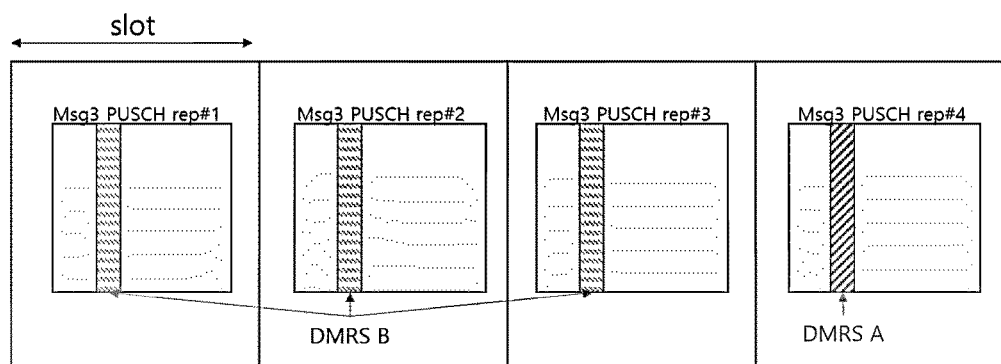
Figure 21:
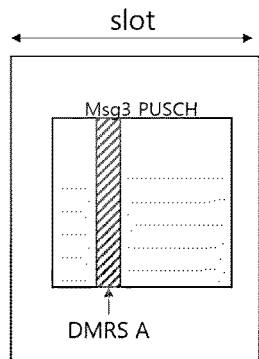
Figure 21:
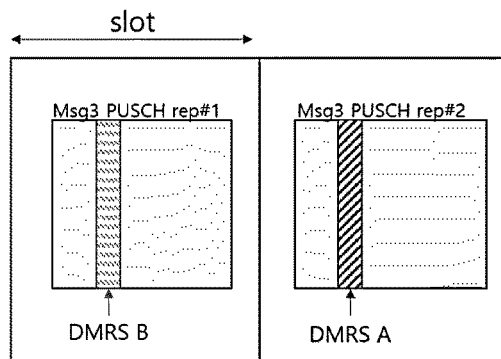
Figure 21:
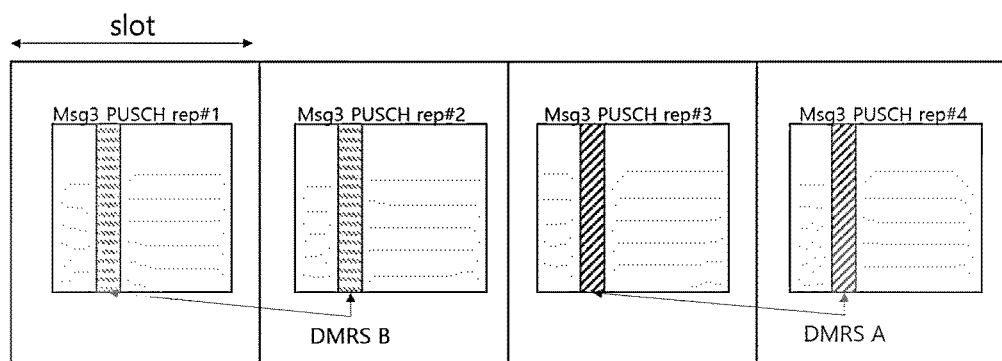
Figure 22:
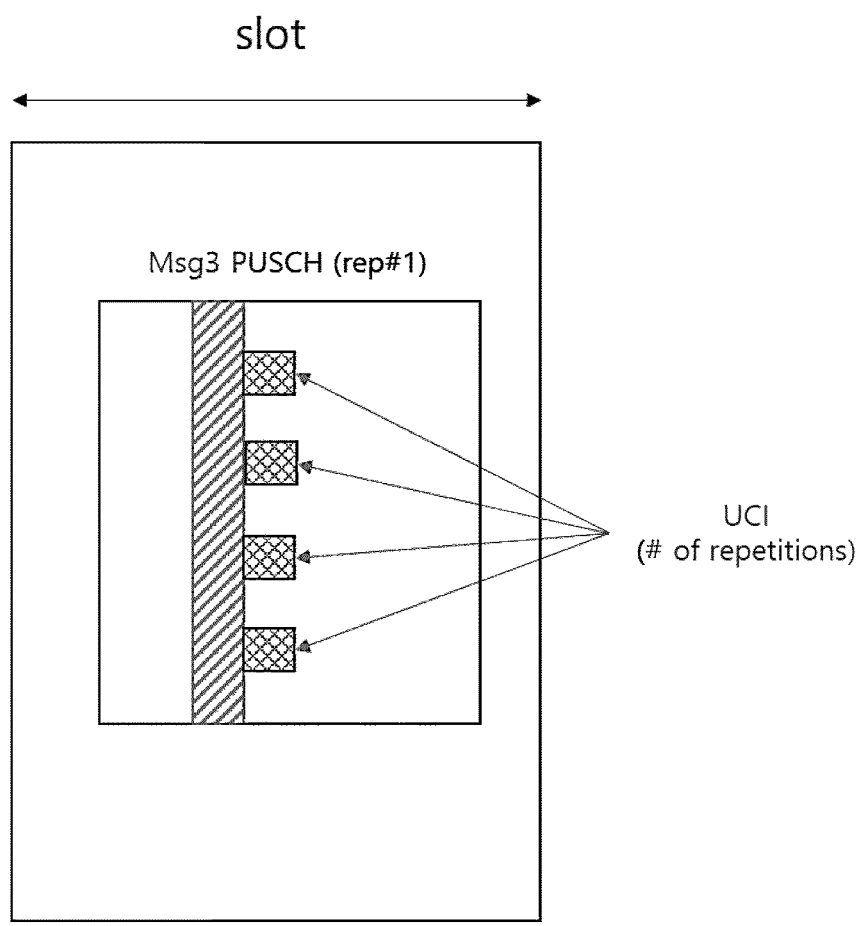
FIG. 22 to FIG. 26 illustrate a method of determining the number of modulation symbols for multiplexing uplink control information included in a Msg3 PUSCH according to an embodiment of the present disclosure.

FIG. 19 to FIG. 21 illustrate a Msg3 PUSCH transmission method using two DMRSs according to an embodiment of the present disclosure.

Referring to FIG. 19, in a case (a) where a Msg3 PUSCH is not repeatedly transmitted, DMRS A may be used to indicate a Msg3 PUSCH transmission method. In a case (b) where transmission of a Msg3 PUSCH is repeated two times or a case (c) where transmission of a Msg3 PUSCH is repeated four times, DMRS B may be used to indicate a Msg3 PUSCH transmission method. That is, a terminal may notify a base station of whether a Msg3 PUSCH is repeatedly transmitted, by using DMRS A or DMRS B. The base station may use a DMRS on the first slot in which a Msg3 PUSCH is transmitted, to determine whether the Msg3 PUSCH has been repeatedly transmitted. For example, if a received DMRS is determined to be DMRS A, the base station may determine that the Msg3 PUSCH is not repeatedly transmitted. On the contrary, if a received DMRS is determined to be DMRS B, the base station may determine that the Msg3 PUSCH is repeatedly transmitted.

DMRS A may be identical to or different from a DMRS of a terminal having no capability to repeatedly transmit a Msg3 PUSCH. If the DMRSs are the same, even when a DMRS on the first slot is determined to be DMRS A, the base station is unable to determine whether a terminal having transmitted the Msg3 PUSCH is a terminal capable of repeatedly transmitting a Msg3 PUSCH. Therefore, in a case where retransmission of a Msg3 PUSCH is indicated, it is impossible to indicate repetitive transmission for retransmission, or even when same is indicated, whether retransmission has been repeatedly transmitted is required to be additionally determined. If the DMRSs are different (i.e., the base station receives DMRS B), the base station may determine that a terminal having transmitted the Msg3 PUSCH is capable of repeatedly transmitting a Msg3 PUSCH. Therefore, the base station may indicate repetitive transmission of retransmission when indicating retransmission of a Msg3 PUSCH.

Referring to FIG. 20, if a Msg3 PUSCH is not transmitted in slots after the first slot, a terminal may transmit DMRS A on the first slot, and if a Msg3 PUSCH is repeatedly transmitted in slots after the first slot, the terminal may transmit DMRS B on the first slot. That is, in a case where a Msg3 PUSCH is not repeatedly transmitted or the Msg3 PUSCH transmitted on the first slots among repeatedly transmitted Msg3 PUSCHs is the last one, DMRS A may be used. For example, referring to FIG. 20(a), the terminal does not repeatedly transmit a Msg3 PUSCH, and thus DMRS A may be used. Referring to FIG. 20(b), a Msg3 PUSCH is repeatedly transmitted on the first slot and the second slot, and thus DMRS B may be transmitted on the first slot and DMRS A may be transmitted on the second slot. Referring to FIG. 20(c), a Msg3 PUSCH may be repeatedly transmitted on the first slot, the second slot, the third slot, and the fourth slot, and thus DMRS B may be transmitted on the first slot, the second slot, and the third slot, and DMRS A may be transmitted on the fourth slot. That is, the base station may determine whether a DMRS included in a Msg3 PUSCH is DMRS A or DMRS B for each slot, and if a DMRS determined for the first slot is DMRS A, the base station may determine that there is no Msg3 PUSCH transmitted on slots after the first slot. On the contrary, if a DMRS determined for the first slot is DMRS B, the base station may determine that a Msg3 PUSCH is repeatedly transmitted on slots after the first slot. The base station may determine a DMRS for every slot, but may not be required to determine a DMRS of a particular slot. For example, if repetitive transmission count candidates of a Msg3 PUSCH configured for a terminal are {R_1, R_2, . . . , R_r}, DMRS A may be transmitted only on the R_1-th slot, the R_2-th slot, and the R_r-th slot. Therefore, the base station may identify whether there is additional transmission of the Msg3 PUSCH, by determining only DMRSs of the R_1-th slot, the R_2-th slot, . . . , and the R_r-th slot Specifically, if repetitive transmission count candidates of a Msg3 PUSCH configured for a terminal are {1, 2, 4}, DMRS A may be transmitted only on the first slot, the second slot, and the fourth slot. Therefore, in a case where transmission of a Msg3 PUSCH is repeated four times as shown in FIG. 20(c), the base station only needs to determine DMRSs of the first slot, the second slot, and the fourth slot. That is, there is no need to determine a DMRS of the third slot in FIG. 20(c). However, in a scheme described with reference to FIG. 20, if a base station has failed to receive a Msg3 PUSCH transmitting DMRS A, the base station is unable to determine a slot in which transmission of the Msg3 PUSCH is terminated. For example, in relation to a Msg3 PUSCH being transmitted two times, if a base station has failed to receive the Msg3 PUSCH including a DMRS transmitted on the second slot, the base station is unable to determine a slot in which transmission of the Msg3 PUSCH is terminated.

Referring to FIG. 21, a terminal may transmit Msg3 PUSCHs including DMRS A in a particular number of consecutive slots. The particular number is determined according to a repetitive transmission count of a Msg3 PUSCH, and may be predetermined. The particular number may have a value corresponding to the half of a repetitive transmission count of a Msg3 PUSCH. That is, if transmission of a Msg3 PUSCH is repeated two times, the particular number may be 1, and if transmission of a Msg3 PUSCH is repeated four times, the particular number may be 2. In other words, if transmission of a Msg3 PUSCH is repeated R times, the particular number may be obtained by f(R/2). The function f(x) may give one of values obtained by rounding down, rounding off, and rounding up x. The particular number of consecutive slots may be calculated starting from the slot in which repetitive transmission of a Msg3 PUSCH is ended. Referring to FIG. 21(c), transmission of a Msg3 PUSCH may be repeated four times, and a Msg3 PUSCH including DMRS A may be transmitted on two consecutive slots (i.e., the third slot and the fourth slot) starting from the last slot. In the method employing FIG. 21, if the base station determines that a DMRS transmitted on at least one slot between the third slot and the fourth slot is determined to be DMRS A, the base station may recognize that transmission of a Msg3 PUSCH is ended in the fourth slot.

In the methods using two DMRSs described with reference to FIG. 19 to FIG. 21, different DMRSs may be transmitted in different slots, respectively. However, if a base station is required to perform joint channel estimation, transmission of the same DMRSs is needed. Therefore, a method using two DMRSs may be applied to remaining situations except for a case where joint channel estimation is performed.

Method of Signaling Information Related to Repetitive Transmission of Msg3 PUSCH through UCI Bit FIG. 22 to FIG. 26 illustrate a method of determining the number of modulation symbols for multiplexing uplink control information included in a Msg3 PUSCH according to an embodiment of the present disclosure.

The number of modulation symbols for transmission of uplink control information (UCI) per layer mapped to a Msg3 PUSCH may be calculated as in Equation 2. Equation 2 may also be used to calculate the number of modulation symbols when a HARQ-ACK multiplexed in a PUSCH is transmitted.

$$Q'_{UCI} = \min\left\{ \left\lceil \frac{(O_{UCI} + L_{UCI}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\}$$ [Equation 2]

In Equation 2, $O_{UCI}$ may denote the number of bits indicating whether repetitive transmission of a Msg3 PUSCH is performed, or a repetitive transmission count. $L_{UCI}$ may denote the number of CRC bits used for channel coding of $O_{UCI}$. $\beta^{PUSCH}_{offset}$ is an offset value for determining the number of resources for mapping UCI to a Msg3 PUSCH, and may be configured through an SIB. $C_{UL-SCH}$ denotes the number of code blocks (CBs) included in a Msg3 PUSCH. $K_r$ denotes the size of the r-th CB included in a Msg3 PUSCH. $M^{UCI}_{sc}(l)$ denotes the number of REs available for UCI transmission in the l-th symbol of a Msg3 PUSCH. $N^{PUSCH}_{symb,all}$ denotes the number of all symbols used for transmission of a Msg3 PUSCH including a DMRS. A scaling value may be configured through an SIB. $l_0$ denotes the index of the first PUSCH symbol rather than a DMRS after a DMRS symbol. For example, when a DMRS is transmitted in the l-th symbol, $M^{UCI}_{sc}(l)$ is 0, and otherwise, $M^{UCI}_{sc}(l)$ is equal to $M^{PUSCH}_{sc} - M^{PT-RS}_{sc}(l)$. $M^{PUSCH}_{sc}$ denotes the number of subcarriers scheduled for a PUSCH in the frequency domain, and $M^{PT-RS}_{sc}(l)$ denotes the number of subcarriers of the l-th PUSCH symbol including a PTRS. A terminal may multiplex UCI in a PUSCH, based on $Q'_{UCI}$ modulation symbols (the number of REs) calculated from Equation 2. The $Q'_{UCI}$ modulation symbols may be mapped to $Q'_{UCI}$ REs of a Msg3 PUSCH. A mapping scheme may be the same as a scheme of mapping a HARQ-ACK when the HARQ-ACK is multiplexed in a PUSCH. That is, the $Q'_{UCI}$ REs may be selected in a symbol immediately next to a DMRS symbol of a Msg3 PUSCH.

A terminal not supporting repetitive transmission of a Msg3 PUSCH is unable to transmit a Msg3 PUSCH including UCI multiplexing. Therefore, when a Msg3 PUSCH is received, a base station is required to determine whether UCI has been multiplexed. For example, if a UCI bit size is smaller than or equal to two bits, a terminal may puncture $Q'_{UCI}$ REs among the REs in which a Msg3 PUSCH is transmitted, and transmit UCI in the $Q'_{UCI}$ REs. Therefore, the base station may not be required to distinguish whether UCI is multiplexed. That is, mapping of a Msg3 PUSCH may not be changed by $Q'_{UCI}$ REs in which UCI is transmitted. On the other hand, for example, if a UCI bit size is greater than two bits, a Msg3 PUSCH may be rate-matched and transmitted around $Q'_{UCI}$ REs to which UCI is mapped. The base station is required to decode a Msg3 PUSCH two times because mapping of the Msg3 PUSCH may be changed according to different rate-matching in a case where UCI is multiplexed and a case where UCI is not multiplexed. Therefore, it is required to restrict the UCI bit size to be two bits or smaller so as to reduce the number of times of decoding by the base station.

If the UCI bit size is one bit, i) the UCI bit may indicate that the repetitive transmission count of a Msg3 PUSCH is 1 or R. R may be a value configured in a SIB. The number 1 is not separately configured, and if the value of the UCI bit is "0", it may always be determined that the repetitive transmission count is 1. ii) The UCI bit may indicate that the repetitive transmission count of a Msg3 PUSCH is R_1 or R_2. The values of R_1 and R_2 may be configured in a SIB. The values of R_1 and R_2 may not be 1.

If the UCI bit size is two bits, the UCI bits may indicate that i) the repetitive transmission count of a Msg3 PUSCH is 1, R_1, R_2, or R_3. The values of R_1, R_2, and R_3 may be configured in a SIB. The number 1 is not separately configured, and if the UCI bits are "00", it may always be determined that the repetitive transmission count is 1. ii) The UCI bits may indicate that the repetitive transmission count of a Msg3 PUSCH is R_1, R_2, R_3, or R_4. The values of R_1, R_2, R_3, and R_4 may be configured in a SIB.

In a case where a terminal is required to indicate more various repetitive transmission counts such as {1, 2, 4, 8, 16, 32}, the UCI bit size has to be greater than two bits. Accordingly, a method of transmitting UCI exceeding two bits will be described.

Figure 23:
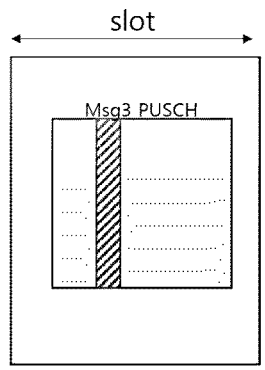
Figure 23:
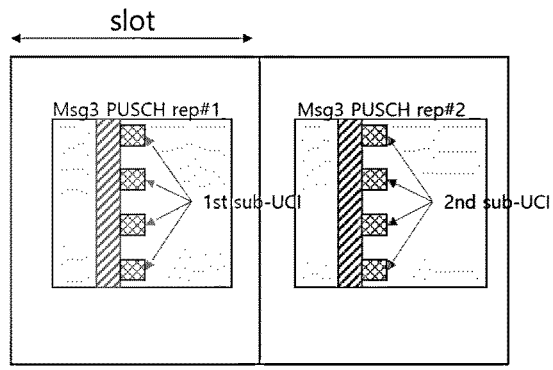
Figure 23:
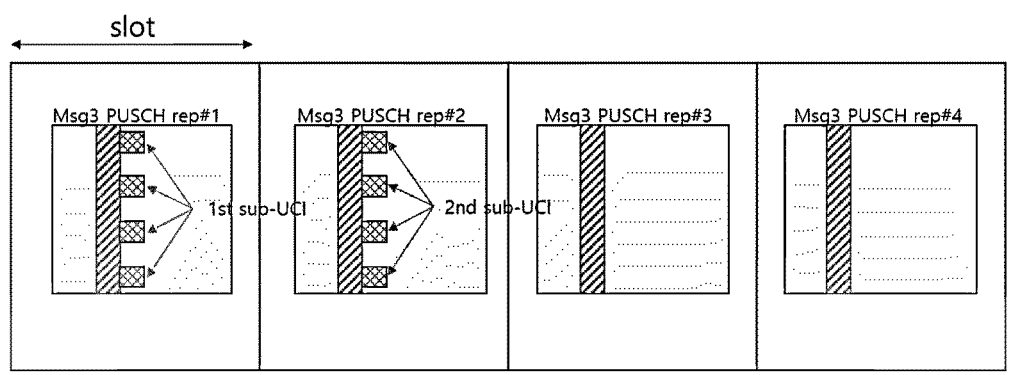
Figure 24:
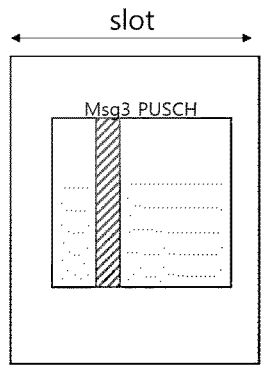
Figure 24:
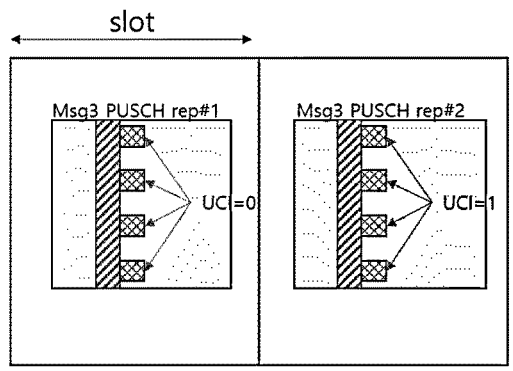
Figure 24:
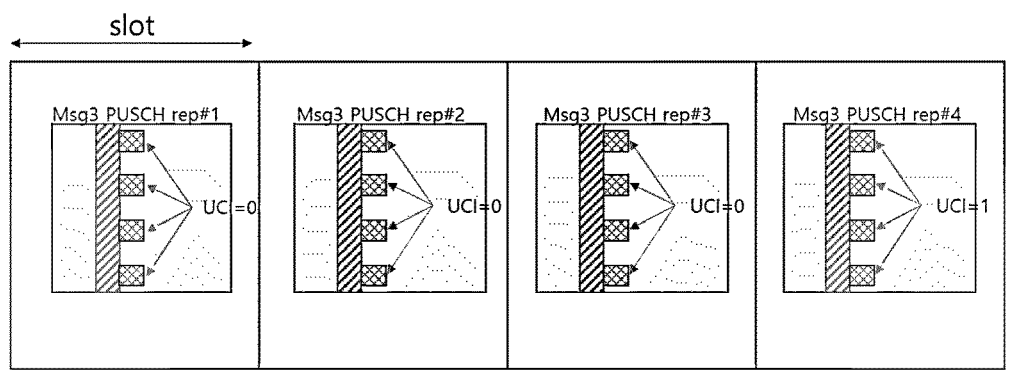
Figure 25:
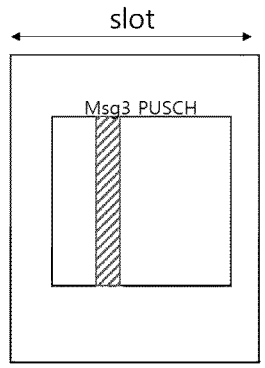
Figure 25:
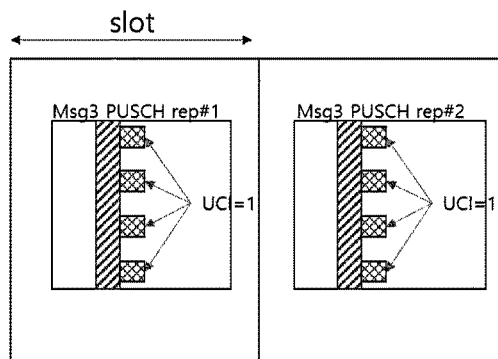
Figure 25:
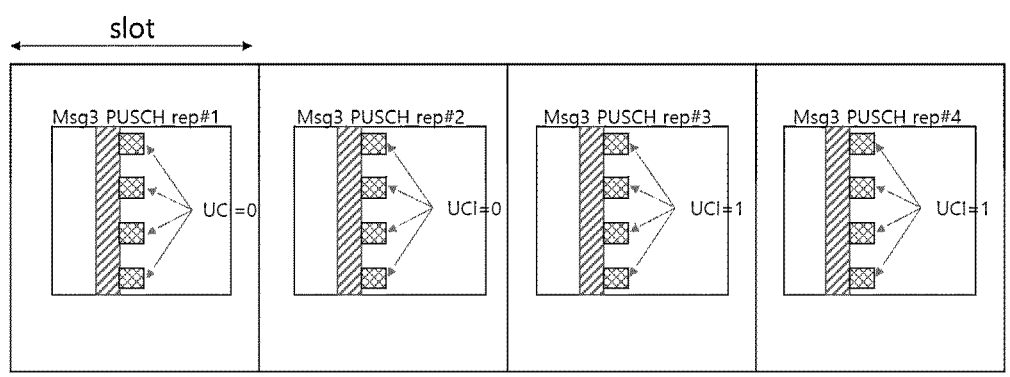
Figure 26:
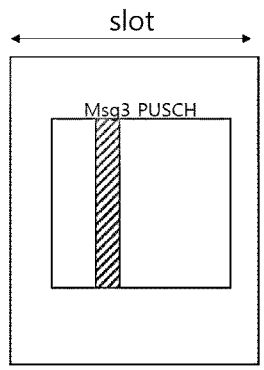
Figure 26:
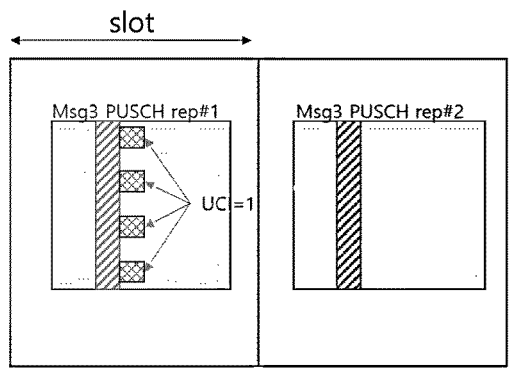
Figure 26:
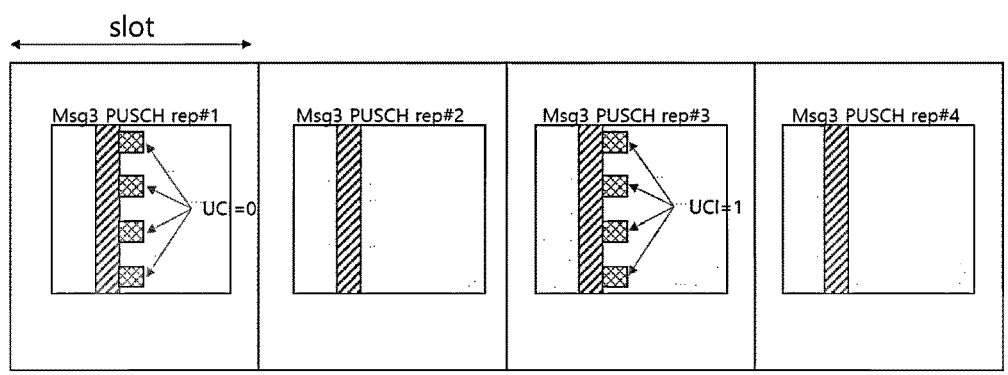

Referring to FIG. 23, a terminal may generate sub-UCI by grouping up to two UCI bits. The terminal may transmit the sub-UCI in each of the first slot and the second slot. The terminal may multiplex and transmit first sub-UCI in a Msg3 PUSCH on the first slot, and multiplex and transmit second sub-UCI in a Msg3 PUSCH on the second slot. A base station may receive the first sub-UCI and the second sub-UCI transmitted in the first slot and the second slot, respectively, to generate the entire UCI bits. The base station may determine a repetitive transmission count of a Msg3 PUSCH, based on the entire UCI bits. Referring to FIG. 24, a terminal may multiplex a UCI bit value of "0" or "1" having a 1-bit size in a Msg3 PUSCH on each slot and transmit the Msg3 PUSCH. The UCI bit value of "0" may imply that a Msg3 PUSCH is repeatedly transmitted in slots after the slot in which a Msg3 PUSCH in which the UCI bit value of "0" is multiplexed is transmitted. The UCI bit value of "1" may imply that the slot in which a Msg3 PUSCH in which the UCI bit value of "1" is multiplexed is transmitted is the last slot in which a Msg3 PUSCH is transmitted. Referring to FIG. 24(b), a terminal may multiplex the UCI bit value of "0" in a Msg3 PUSCH transmitted on the first slot. This is because a Msg3 PUSCH is repeatedly transmitted in the second slot (the slot after the first slot). The terminal may multiplex the UCI bit value of "1" in a Msg3 PUSCH transmitted on the second slot. This is because the second slot is the last slot in which a Msg3 PUSCH is repeatedly transmitted. Referring to FIG. 24(c), a terminal may multiplex the UCI bit value of "0" in a Msg3 PUSCH transmitted on each of the first slot, the second slot, and the third slot. This is because a Msg3 PUSCH is repeatedly transmitted on the second slot (the slot after the first slot), the third slot (the slot after the second slot), and the fourth slot (the slot after the third slot). The terminal may multiplex the UCI bit value of "1" in a Msg3 PUSCH transmitted on the fourth slot. This is because the fourth slot is the last slot in which a Msg3 PUSCH is repeatedly transmitted. In a method of multiplexing the UCI bit value of "0" or "1" described with reference to FIG. 24, it is impossible to determine the slot in which a repeatedly transmitted Msg3 PUSCH is ended, if a base station fails to receive a Msg3 PUSCH in which the UCI bit value of "1" is multiplexed. For example, in a case of FIG. 24(b), a repetitive transmission count of a Msg3 PUSCH is 2. If a base station fails to receive a Msg3 PUSCH transmitted on the second slot, the base station fails to identify the UCI bit value of "1", and thus is unable to determine the slot in which repetitive transmission of a Msg3 PUSCH is ended.

A terminal may multiplex the UCI bit value of "1" in a Msg3 PUSCH transmitted on a particular number of consecutive slots. The particular number is determined based on a repetitive transmission count of a Msg3 PUSCH, and may be predetermined. The particular number may be the half of a repetitive transmission count of a Msg3 PUSCH. Specifically, if transmission of a Msg3 PUSCH is repeated two times, the particular number may be 1, and if transmission of a Msg3 PUSCH is repeated four times, the particular number may be 2. In other words, if a Msg3 PUSCH is repeated R times, the particular number may be obtained by f(R/2). The function f(x) may give one of values obtained by rounding down, rounding off, and rounding up x. The particular number of consecutive slots may be selected starting from the slot in which repetitive transmission of a Msg3 PUSCH is lastly performed. The slots may be selected starting from the last slot in which repetitive transmission is performed. Referring to FIG. 25(c), transmission of a Msg3 PUSCH may be repeated four times. A terminal may multiplex the UCI bit value of "1" in a Msg3 PUSCH transmitted on each of two consecutive slots (the third and fourth slots) starting from the slot in which repetitive transmission of the Msg3 PUSCH is lastly performed, and then transmit the Msg3 PUSCHs. In comparison between FIG. 24(c) and FIG. 25(c), in FIG. 25(c), it may be noted that, if a base station identifies the UCI bit value of "1" multiplexed in a Msg3 PUSCH transmitted on at least one slot between the third slot and the fourth slot, the base station may identify that the Msg3 PUSCH is ended in the fourth slot.

According to the above method, UCI is multiplexed in each slot, and thus the number of REs used for transmission of a Msg3 PUSCH gets small. Therefore, it is necessary to multiplex UCI only in as few slots as possible. For example, a base station may determine that a Msg3 PUSCH in which the UCI bit value of "1" is not multiplexed is the same as one in which the UCI bit value of "1" is multiplexed. As another example, a terminal may multiplex UCI in a Msg3 PUSCH every particular slot and transmit the Msg3 PUSCH. For example, a terminal may make slots in which a Msg3 PUSCH is repeatedly transmitted, into bundles of N slots, and multiplex UCI in the first slot in each bundle of N slots and transmit the Msg3 PUSCH. The bundle of N slots may be referred to as a slot bundle. If a Msg3 PUSCH is repeatedly transmitted in slot bundles after the first slot bundle, a terminal may multiplex the UCI bit value of "0" in the Msg3 PUSCH transmitted on a (first) slot included in the first slot bundle. If a Msg3 PUSCH is not repeatedly transmitted in slot bundles after the first slot bundle, a terminal may multiplex the UCI bit value of "1" in the Msg3 PUSCH transmitted on a (first) slot included in the first slot bundle. That is, the first slot bundle may be the slot bundle in which the Msg3 PUSCH is lastly transmitted. Referring to FIG. 26(b), a terminal may bundle two slots to configure a slot bundle. The terminal may multiplex the UCI bit value of "1" in a Msg3 PUSCH transmitted on the first slot in the first slot bundle. This is because a Msg3 PUSCH is not repeatedly transmitted in the slot bundles after the first slot bundle. Referring to FIG. 26(c), a terminal may bundle two slots to configure a slot bundle. The terminal may multiplex the UCI bit value of "0" in a Msg3 PUSCH transmitted on the first slot in the first slot bundle. This is because a Msg3 PUSCH is repeatedly transmitted in the second slot bundle (the slot bundle after the first slot bundle). The terminal may multiplex the UCI bit value of "1" in a Msg3 PUSCH transmitted on the first slot in the second slot bundle. This is because a Msg3 PUSCH is not repeatedly transmitted in the slot bundles after the second slot bundle.

Method of Determining Slot in which Msg3 PUSCH is Repeatedly Transmitted, in TDD Situation A base station may configure a symbol direction for a TDD operation.

The base station may configure a cell-common symbol direction for a terminal. The symbol direction may be configured using SIB1 transmitted to a terminal existing in a cell. The base station may configure a cell-common symbol direction through tdd-UL-DL-ConfigurationCommon of SIB1. The cell-common symbol direction may be determined to correspond to one of a UL symbol, a DL symbol, and a flexible symbol. A cell-common UL symbol indicates a symbol used only in uplink transmission. A cell-common DL symbol indicates a symbol used only in downlink transmission. A cell-common flexible symbol is a symbol, the particular direction of which has not been determined, and indicates a symbol which may be changed to an UL symbol or a DL symbol through a separate configuration.

The base station may additionally configure, for the terminal, a symbol direction specified for each terminal. The symbol direction specified for each terminal may be configured through RRC signaling during a random access process. Specifically, a terminal-specific (UE-specific) symbol direction specified for each terminal may be configured for the terminal through tdd-UL-DL-ConfigurationDedicated. The directions of the cell-common UL symbol and the cell-common DL symbol have been determined, and thus it is impossible to modify the directions any more, and the cell-common flexible symbol may be configured to have the terminal-specific symbol direction. The terminal-specific symbol direction may be determined to correspond to one of a terminal-specific UL symbol, a terminal-specific DL symbol, and a terminal-specific flexible symbol. The terminal-specific UL symbol indicates a symbol used only in uplink transmission. The terminal-specific DL symbol indicates a symbol used only in downlink transmission. The terminal-specific flexible symbol is a symbol, the particular direction of which has not been determined, and indicates a symbol which may be changed to an UL symbol or a DL symbol through a separate configuration.

A cell-common symbol direction is configured for the terminal through SIB1 received before reception of RRC signaling, and the terminal may repeatedly transmit a Msg3 PUSCH. Therefore, the terminal is required to repeatedly transmit a Msg3 PUSCH according to the cell-common symbol direction. The terminal is unable to determine whether a cell-common flexible symbol is available for repetitive transmission of a Msg3 PUSCH. For example, the base station may configure, for a different terminal, a cell-common flexible symbol as a terminal-specific DL symbol. In this case, when the terminal repeatedly transmits a Msg3 PUSCH by using a cell-common flexible symbol, the terminal may interfere with the different terminal. Therefore, it is necessary to determine whether a cell-common flexible symbol is available for repetitive transmission of a Msg3 PUSCH, and hereinafter, a method of the determination will be described.

Figure 27:
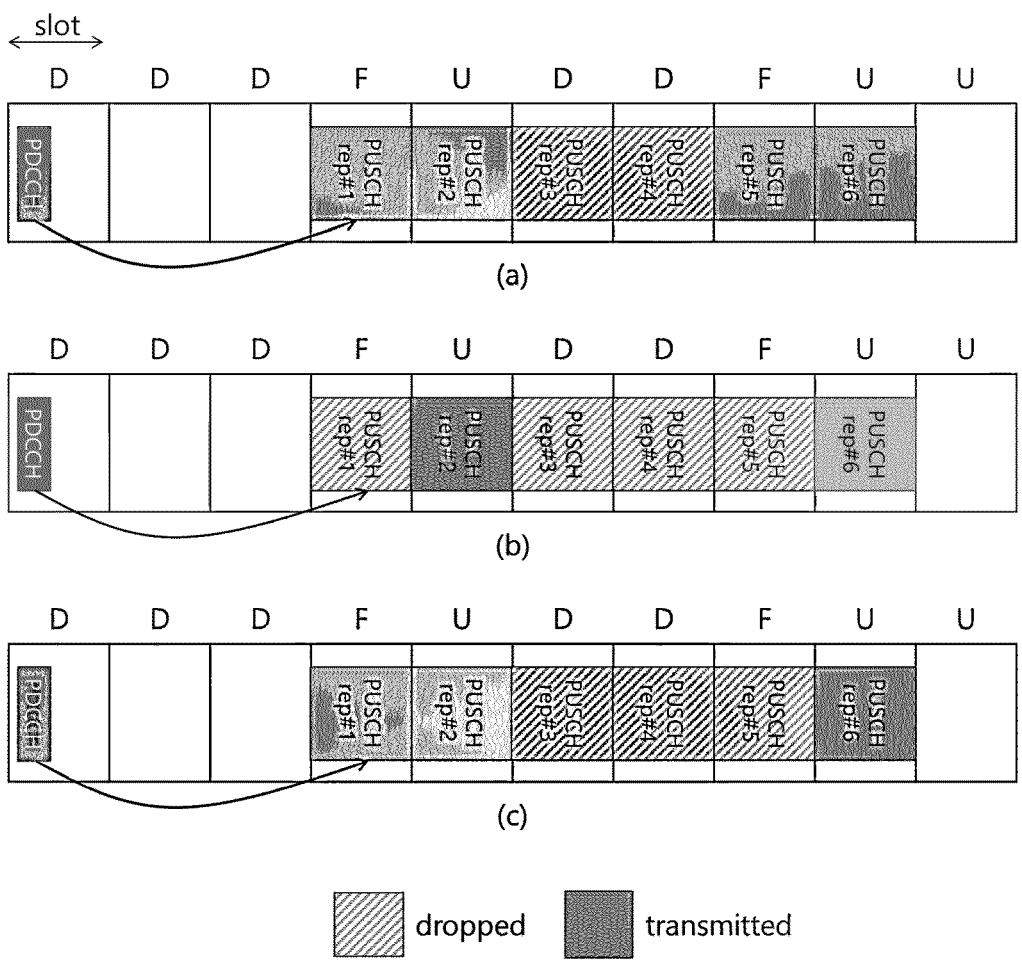
FIG. 27 and FIG. 28 illustrate resources which are available for repetitive transmission of a Msg3 PUSCH according to an embodiment of the present disclosure.
Figure 28:
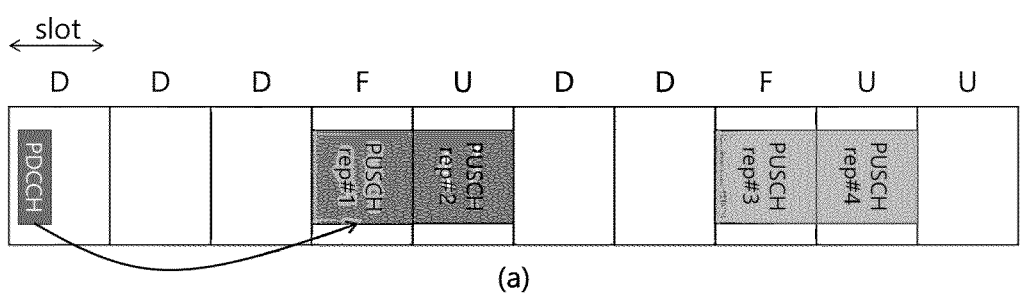
Figure 28:
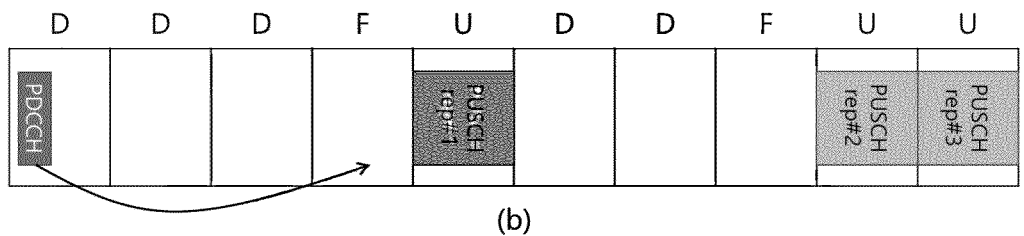
Figure 28:
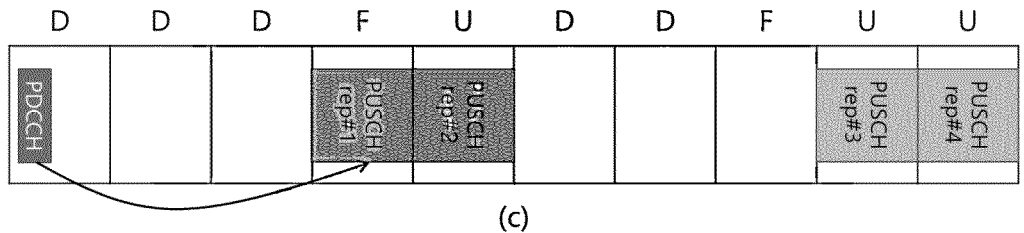

FIG. 27 and FIG. 28 illustrate resources which are available for repetitive transmission of a Msg3 PUSCH according to an embodiment of the present disclosure. A D slot in FIGS. 27 and 28 may indicate a slot including at least one symbol overlapping with a cell-common DL symbol among symbols in which a Msg3 PUSCH is scheduled to be transmitted. A U slot may indicate a slot including all symbols in which a Msg3 PUSCH is scheduled to be transmitted and which overlap with cell-common UL symbols. An F slot may indicate a slot including at least one symbol overlapping with a cell-common flexible symbol among symbols in which a Msg3 PUSCH is scheduled to be transmitted (the symbols in which the Msg3 PUSCH is scheduled to be transmitted may not overlap with cell-common DL symbols and may overlap with cell-common UL symbols).

Referring to FIG. 27, a terminal may be configured to repeatedly transmit a Msg3 PUSCH on six consecutive slots. The Msg3 PUSCH may be transmitted on a slot in which transmission of the Msg3 PUSCH is possible, and the Msg3 PUSCH may be not be transmitted and be dropped on a slot in which transmission of the Msg3 PUSCH is impossible. i) Referring to FIG. 27(a), the terminal may repeatedly transmit the Msg3 PUSCH on remaining slots except for D slots. That is, the terminal may repeatedly transmit the Msg3 PUSCH on F slots and U slots, and may not transmit and drop the Msg3 PUSCH scheduled on D slots. However, the Msg3 PUSCH may be transmitted using a cell-common flexible symbol, and thus a different terminal may be interfered with. ii) Referring to FIG. 27(b), the terminal may repeatedly transmit the Msg3 PUSCH on only U slots. That is, the terminal may not transmit and drop the Msg3 PUSCH scheduled on D slots and F slots. The terminal transmits the Msg3 PUSCH by using only UL symbols, and thus does not interfere with a different terminal. iii) Referring to FIG. 27(c), the terminal may perform the first transmission in repetitive transmission of the Msg3 PUSCH in a slot indicated by an uplink grant (i.e., a slot in which the first transmission in repetitive transmission of the Msg3 PUSCH is performed), and may repeatedly transmit the Msg3 PUSCH only on U slots after the slot. The terminal may not transmit and drop the Msg3 PUSCH scheduled on F slots and D slots after a slot indicated by an uplink grant. The slot indicated by the uplink grant may be determined based on a K2 value and a slot in which the uplink grant is received. The K2 value is configured by a base station, and may denote an offset value from the slot in which the uplink grant is received. That is, if the slot in which the uplink grant is received is the n-th slot, the slot indicated by the uplink grant may be the (n+K2)-th slot. The slot indicated by the uplink grant may be an F slot or U slot. The base station may intentionally configure a cell-common flexible symbol to be used for transmission of a Msg3 PUSCH.

Referring to FIG. 28, a terminal may be configured to repeat transmission of a Msg3 PUSCH four times, that is, repeat transmission of a Msg3 PUSCH on four slots. Therefore, the terminal is required to determine the four slots in which repetitive transmission of a Msg3 PUSCH is possible. i) Referring to FIG. 28(a), the terminal may determine, as slots in which transmission of a Msg3 PUSCH is possible, remaining slots except for D slots. That is, the terminal may repeatedly transmit the Msg3 PUSCH on F slots and U slots. However, the Msg3 PUSCH may be transmitted using a cell-common flexible symbol, and thus a different terminal may be interfered with. ii) Referring to FIG. 28(b), the terminal may repeatedly transmit the Msg3 PUSCH on only U slots. That is, the terminal is unable to repeatedly transmit the Msg3 PUSCH on F slots and U slots. Even though the Msg3 PUSCH is repeatedly transmitted in the late slot compared to the method described with reference to (method i) of FIG. 28(a), the Msg3 PUSCH is repeatedly transmitted only on U slots, and thus a different terminal may not be interfered with. iii) Referring to FIG. 28(c), the terminal may perform the first transmission in repetitive transmission of the Msg3 PUSCH in a slot indicated by an uplink grant (i.e., a slot in which the first transmission in repetitive transmission of the Msg3 PUSCH is performed), and may repeatedly transmit the Msg3 PUSCH only on U slots after the slot. The terminal may not transmit and drop the Msg3 PUSCH scheduled on F slots and D slots after a slot indicated by an uplink grant. The slot indicated by the uplink grant may be determined based on a K2 value and a slot in which the uplink grant is received. The K2 value is configured by a base station, and may denote an offset value from the slot in which the uplink grant is received. That is, if the slot in which the uplink grant is received is the n-th slot, the slot indicated by the uplink grant may be the (n+K2)-th slot. The slot indicated by the uplink grant may be an F slot or U slot. The base station may intentionally configure a cell-common flexible symbol to be used for transmission of a Msg3 PUSCH.

The base station may configure, through an uplink grant, to use one method among the methods described with reference to FIG. 27 and FIG. 28. The base station may configure a method of determining a slot in which a Msg3 PUSCH is repeatedly transmitted, by using some bits in a particular field of an uplink grant, and the terminal may repeatedly transmit the Msg3 PUSCH, based on the configured method. The Msg3 PUSCH in the methods described with reference to FIGS. 27 and FIG. 28 may imply initial transmission of the Msg3 PUSCH and retransmission of the Msg3 PUSCH.

In the above description, cell-common DL symbols may further include symbols in which Type-0 common search space (CSS) of CORESET0 is configured. Here, CORESET0 indicates a CORESET indicated by a physical broadcast channel (PBCH). Here, Type-0 common search space is a search space for monitoring DCI format 1_0 scheduling a PDSCH transmitting SIB1. The DCI format may have a CRC scrambled by an SI-RNTI. That is, the terminal considers a symbol in which reception of Type-0 CSS of CORESET0 is configured, as a symbol in which only downlink reception is possible.

Cell-common DL symbols may further include symbols in which Type-0A common search space (CSS) of CORESET0 is configured. Type-0A CSS may be a search space for monitoring DCI that is DCI format 1_0 scheduling a PDSCH including an SIB other than SIB1. The DCI may have a CRC scrambled by an SI-RNTI. Cell-common DL symbols may further include symbols in which Type-1 CSS of CORESET0 is configured. Type-1 CSS may be a search space for monitoring DCI scheduling a Msg2 PDSCH or Msg 4 PDSCH. The DCI may have a CRC scrambled by an RA-RNTI, MsgB-RNTI, or TC-RNTI. Cell-common DL symbols may further include symbols in which Type-2 CSS of CORESET0 is configured. Type-2 CSS may be a search space for monitoring DCI transmitting paging information. The DCI may have a CRC scrambled by a P-RNTI. Cell-common DL symbols may further include symbols in which Type-3 CSS of CORESET0 is configured. Type-3 CSS may be a search space for monitoring DCI having various cell-common DCI formats. The DCI may have a CRC scrambled by an INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI(s), or PS-RNTI.

Cell-common DL symbols may further include symbols in which an SS/PBCH block is configured to be received. The symbol in which an SS/PBCH block is configured to be received may be configured through SIB1 and, specifically, configured through ssb-PositionsInBurst of SIB1. That is, the terminal may determine the symbol in which an SS/PBCH block is configured to be received, as a symbol in which reception of only downlink channels is possible.

Cell-common UL symbols may further include symbols in which a PRACH is configured to be transmitted. The symbol in which a PRACH is configured to be transmitted may be a symbol corresponding to a valid RACH occasion (RO). The terminal may receive a PRACH configuration from the base station through SIB1. Specifically, the PRACH configuration may be configured through rach-ConfigCommon of initialUplinkBWP of UplinkConfigCommonSIB of ServingCellConfigCommonSIB of SIB1. The terminal may determine a valid RO through the PRACH configuration. Hereinafter, a method of determining a valid RO will be described.

a. If tdd-UL-DL-ConfigurationCommon is not configured for a terminal, an RO that does not precede an SS/PBCH block and is spaced $N_{gap}$ symbols or more apart from the last symbol of the SS/PBCH block may be determined as a valid RO.

b. If tdd-UL-DL-ConfigurationCommon is configured for a terminal, an RO, all the symbols of which overlap with cell-common UL symbols or which does not precede an SS/PBCH block and is spaced $N_{gap}$ symbols or more apart from the last symbol of the SS/PBCH block may be determined as a valid RO.

The terminal may transmit a PRACH by using a valid RO. That is, a base station may consider that a valid RO is used for uplink channel transmission. Cell-common UL symbols may include $N_{gap}$ symbols before a valid RO. A symbol in which transmission of a PRACH is scheduled may be a symbol corresponding to a valid RO. This is because the terminal does not receive a downlink channel or signal in $N_{gap}$ symbols. Therefore, the base station may consider that the $N_{gap}$ symbols are used for uplink transmission. If the sub carrier spacing of a PRACH is 1.25 kHz or 5 kHz, $N_{gap}$ may be 0, and if same is 15 kHz, 30 kHz, 60 kHz, or 120 kHz, $N_{gap}$ may be 2.

Method of Frequency Hopping for Repetitive Transmission of Uplink Channel

Hereinafter, a frequency hopping method applied when a terminal repeatedly transmits an uplink channel will be described.

A base station may configure a long PUCCH (i.e., PUCCH format 1, 3, and 4) to be repeatedly transmitted in two, four, or eight slots for PUCCH coverage of a terminal. When the terminal enters RRC_connected mode after initial cell access, a PUCCH repetitive transmission count (nrofSlots) of each PUCCH format may be configured for the terminal through terminal-specific system information. For example, in a case where PUCCH formats transmitted on a resource configured for the terminal includes all PUCCH formats 1, 3, and 4, repetitive transmission counts of the respective PUCCH formats may be configured to be different PUCCH repetitive transmission counts (nrofSlots).

If the terminal is configured to repeat transmission of a PUCCH N times, N slots in which PUCCH transmission is possible, sequentially starting from the slot in which PUCCH transmission is configured or indicated may be determined. In relation to the slot in which PUCCH transmission is possible, a symbol of the slot in which a PUCCH is scheduled to be transmitted is required not to overlap with a DL symbol configured to be semi-static or a symbol configured for reception of an SS/PBCH block. If the symbol in which a PUCCH is scheduled to be transmitted overlaps with a DL symbol configured to be semi-static or a symbol configured for reception of an SS/PBCH block, the terminal may not transmit the PUCCH in the corresponding slot, and the corresponding slot may not be included in the N slots for PUCCH transmission.

A new PUCCH repetitive transmission may be configured for the terminal by the base station before completion of PUCCH repetitive transmission performed by a PUCCH repetitive transmission count pre-configured by the base station. When the terminal enters RRC_connected mode after initial cell access, the terminal has been configured, through terminal-specific system information, to repeat transmission of a PUCCH N times. However, if a channel environment gets better thereafter, the terminal may be newly configured to repeat transmission of a PUCCH M (<N) times so as to reduce overhead of uplink control channels and reduce uplink interference. On the other hand, if the channel environment gets worse, the terminal may be newly configured to repeat transmission of a PUCCH M (>N) times so as to increase coverage for uplink control channels. Here, the repetitive transmission count (M) may include 1. That is, if the terminal receives a configuration for repetitive transmission of a new PUCCH, the terminal may neglect a configuration for repetitive transmission of a previously configured PUCCH and may repeatedly transmit the new PUCCH, based on the configuration for repetitive transmission of the new PUCCH.

The terminal may receive explicit information from the base station to determine a repetitive transmission count of a new PUCCH. The explicit information may be a PUCCH repetition count. The explicit information may be included in DCI included in a PDCCH scheduling a PDSCH corresponding to a PUCCH. The PDSCH corresponding to the PUCCH may be a PUCCH including HARQ-ACK information of the corresponding PDSCH. The explicit information may be indicated by a ceil(log 2(K)) bit size when an available repetitive transmission count of a PUCCH is K. For example, if the available repetitive transmission counts of a PUCCH are 1, 2, 4, and 8, K is equal to 4 (K=4), and thus ceil(log 2(4))=2 bits may be used for indication. An indicatable repetitive transmission count of a PUCCH may be one of {1, 2, 4, 8}. The base station may configure, as explicit information, multiple repetitive transmission counts of a PUCCH among indicatable repetitive transmission counts of the PUCCH. For example, the base station may configure, as explicit information, {2, 4} among the PUCCH repetitive transmission counts of {1, 2, 4, 8}. An indicatable repetitive transmission count of a PUCCH may be one of {1, 2, 4, 8, N}. N may be pre-configured for each PUCCH format. The base station may configure, as explicit information, multiple repetitive transmission counts of a PUCCH among indicatable repetition counts of the PUCCH. The multiple repetitive transmission counts of a PUCCH configured as explicit information may include N. For example, the base station may configure, as explicit information, {2, N} among the PUCCH repetitive transmission counts of {1, 2, 4, 8, N}. An indicatable repetitive transmission count of a PUCCH may include at least one of {N/4, N/2, N, 2*N, 4*N}. The base station may configure {N/2, N} as PUCCH repetitive transmission counts. If N/4 is configured as explicit information, the terminal may repeat transmission of a PUCCH N/4 times (i.e., if N=4, repeat one time, and if N=8, repeat two times), N being pre-configured. Similarly, if N/2 is configured as explicit information, the terminal may repeat transmission of a PUCCH N/2 times (i.e., if N=2, repeat one time, if N=4, repeat two times, and if N=8, repeat four times), N being pre-configured. If 2*N is configured as explicit information, the terminal may repeat transmission of a PUCCH 2N times (i.e., if N=1, repeat two times, if N=2, repeat four times, and if N=4, repeat eight times). If 4*N is configured as explicit information, the terminal may repeat transmission of a PUCCH 4N times (i.e., if N=1, repeat four times, and if N=2, repeat eight times). If N/4 and N/2 is smaller than 1, a repetitive transmission count of a PUCCH may be 1. If 2*N and 4*N is greater than 8, a repetitive transmission count of a PUCCH may be 8.

In a conventional method, different PUCCH repetitive transmission counts may be configured for respective PUCCH formats. Even in a case where a resource for PUCCH transmission is newly configured for the terminal and the terminal performs transmission of a new PUCCH, if a previous PUCCH format is the same as a newly configured PUCCH format, the terminal may repeatedly transmit the newly configured PUCCH by a repetitive transmission count corresponding to the PUCCH format. For example, a PUCCH format transmitted in a resource having a PUCCH resource ID configured to be 0 may be configured to be PUCCH format 1 and have a repetitive transmission count of 8, and a PUCCH format transmitted in a resource having a PUCCH resource ID configured to be 1 may be configured to be PUCCH format 1 and have a repetitive transmission count of 2. Thereafter, if a PUCCH resource ID indicated by a PUCCH resource indicator (PRI) field of DCI included in a PDCCH of a PDSCH corresponding to a PUCCH is 0, the terminal may repeatedly transmit a PUCCH having PUCCH format 1 on eight slots, and if the PUCCH resource ID is 1, the terminal may repeatedly transmit a PUCCH having PUCCH format 1 on two slots. A PUCCH repetitive transmission count for each resource in which a PUCCH is transmitted may be one value of {1, 2, 4, 8}. In a case where a PUCCH repetitive transmission count is not configured in a resource in which a PUCCH is transmitted, the terminal may repeatedly transmit the PUCCH according to a repetitive transmission count configured according to a PUCCH format.

Hereinafter, a method of configuring frequency hopping by a base station in a case where a terminal is configured to be able to repeatedly transmit a PUCCH will be described.

Intra-Slot Frequency Hopping

A terminal may divide a PUCCH into two halves in the time domain, map the two halves as two hops in a slot in which the PUCCH is configured to be transmitted, and then transmit the two hops to a base station. The PUCCH may be or not be repeatedly transmitted. When the length (number) of symbols allocated in one slot to allow PUCCH transmission is referred to as the number of symbols, floor(number of symbols/2) symbols may be mapped to the first hop, and number of symbols−floor(number of symbols/2) symbols may be mapped to the second hop. The first hop may be transmitted in a first frequency band, and the second hop may be transmitted in a second frequency band. The first hop may be configured by as many PRBs as the number of PRBs configured by the base station, starting from the PRB corresponding to a starting PRB index configured by the base station. The second hop may be configured by as many PRBs as the number of PRBs configured by the base station, starting from the PRB corresponding to a PRB index configured by the base station, from which the second hop starts.

Inter-Slot Frequency Hopping

Slot indexes for repetitive transmission (repetition) may be sequentially indexed based on the first slot of PUCCH repetitive transmission with respect to a slot in which the first PUCCH is transmitted among repeatedly transmitted PUCCHs. The repetitive transmission index of the slot in which the first PUCCH is transmitted may be 0. Slot indexes for repetitive transmission may be sequentially indexed for slots after the slot in which the first PUCCH is transmitted. The slot index for repetitive transmission may be determined regardless of whether repetitive transmission of a PUCCH is possible on a corresponding slot. For example, in a case where a terminal is configured in slot X to repeat transmission of a PUCCH four times, the terminal may determine 0 as the index of slot X, 1 as the index of slot X+1, 2 as the index of slot X+2, and 3 as the index of slot X+3. The terminal may map a PUCCH to the first hop in a slot corresponding to a slot index for repetitive transmission which is an even number, based on the determined slot indexes for repetitive transmission. The terminal may map a PUCCH to the second hop in a slot corresponding to a slot index for repetitive transmission which is an odd number. The first hop may be transmitted in a first frequency band, and the second hop may be transmitted in a second frequency band. The first hop may be configured by as many PRBs as the number of PRBs configured by the base station, starting from the PRB corresponding to a starting PRB index configured by the base station. The second hop may be configured by as many PRBs as the number of PRBs configured by the base station, starting from the PRB corresponding to a PRB index configured by the base station, from which the second hop starts.

Frequency Hopping Method of PUCCH

A base station may configure, for a terminal, one of whether to perform intra-slot frequency hopping or whether to perform inter-slot frequency hopping.

The base station may configure, for each resource in which PUCCH transmission is configured, whether to perform intra-slot frequency hopping. For example, in a case where a resource having a PUCCH resource ID of 1 in a resource set having a PUCCH resource set ID of 0 is configured for the terminal, whether intra-slot frequency hopping is possible may be configured for the terminal. If the base station configures intra-slot frequency hopping to be possible, the terminal may transmit a PUCCH through intra-slot frequency hopping, and if the base station configures intra-slot frequency hopping to be impossible, the terminal may transmit a PUCCH without intra-slot frequency hopping.

The base station may configure, for each PUCCH format, whether to perform inter-slot frequency hopping. For example, the base station may configure, for a PUCCH having PUCCH format 1, whether inter-slot frequency hopping is possible. If the base station configures inter-slot frequency hopping to be possible, the terminal may transmit a PUCCH through inter-slot frequency hopping regardless of a resource in which a PUCCH is configured. If the base station configures inter-slot frequency hopping to be impossible, the terminal may transmit a PUCCH according to a resource in which the PUCCH is configured. That is, the terminal may transmit a PUCCH according to availability of intra-slot frequency hopping configured for each resource in which PUCCH transmission is configured.

If inter-slot frequency hopping being possible is configured for a particular PUCCH format, the terminal may expect that there is no configuration for intra-slot frequency hopping with respect to a resource in which a PUCCH having the particular PUCCH format is transmitted. That is, if the base station configures inter-slot frequency hopping according to a PUCCH format to be possible, the base station may not perform configuration for intra-slot frequency hopping according to a resource in which a PUCCH is transmitted.

The base station may configure intra-slot hopping being possible and a repetitive transmission count (N) greater than 1 for a PUCCH that has a particular PUCCH format and is initially repeatedly transmitted. Thereafter, a repetitive transmission count of 1 for a new PUCCH may be configured for the terminal. Intra-slot hopping is configured to be possible, and thus the terminal may not expect that inter-slot frequency hopping being possible is configured for the corresponding PUCCH. That is, in a case where inter-slot frequency hopping is configured for a PUCCH having a particular PUCCH format, a new PUCCH is not transmitted through intra-slot frequency hopping regardless of a repetitive transmission count of the new PUCCH. Therefore, a method of determining a frequency hopping method according to a repetitive transmission count of a new PUCCH is needed.

Figure 29:
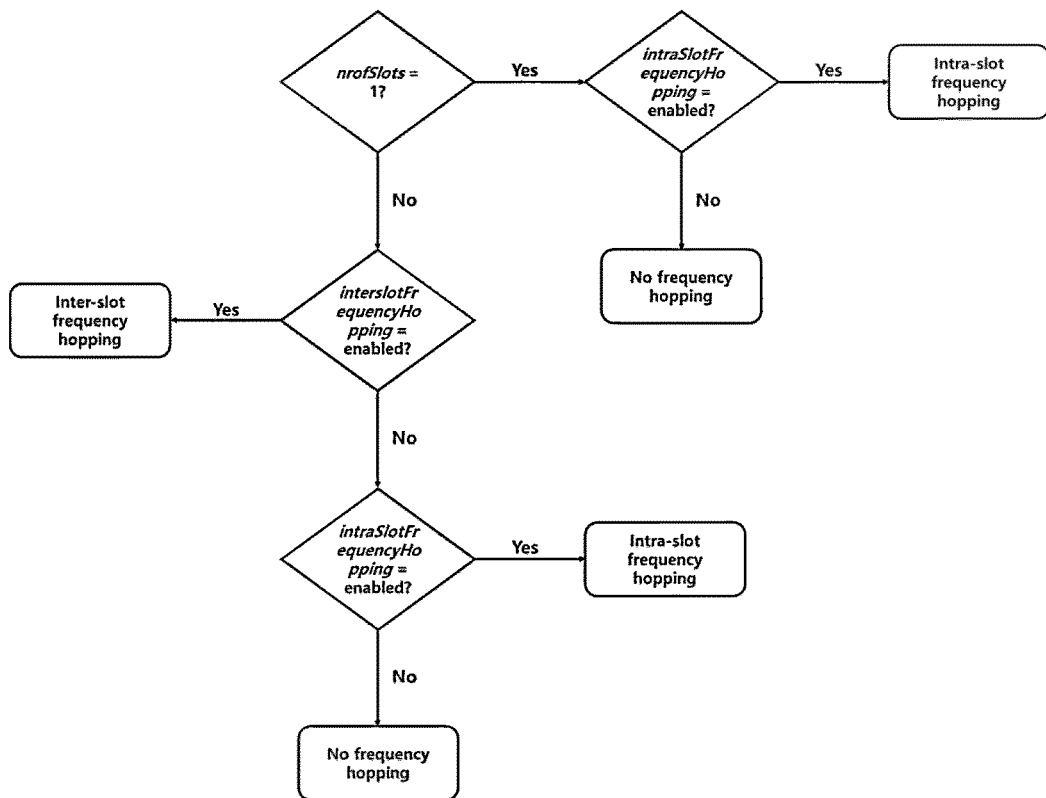
FIG. 29 illustrates a method of determining a frequency hopping method according to a repetitive transmission count of a PUCCH according to an embodiment of the present disclosure.

FIG. 29 illustrates a method of determining a frequency hopping method according to a repetitive transmission count of a PUCCH according to an embodiment of the present disclosure.

A terminal may determine a frequency hopping method by differently interpreting a higher layer field according to a repetitive transmission count of a new PUCCH. Specifically, a terminal may interpret an intra-slot frequency hopping value or an inter-slot frequency hopping value in a higher layer field according to whether a PUCCH repetitive transmission count is 1. Referring to FIG. 29, nrofSlots denotes a PUCCH repetitive transmission count configured by a base station, and intraSlotFrequencyHopping denotes whether performing intra-slot frequency hopping is possible. If intraSlotFrequencyHopping is configured to be enabled, intra-slot frequency hopping may be performed, and if same is not configured, intra-slot frequency hopping may not be performed. interslotFrequencyHopping indicates whether inter-slot frequency hopping is performed. If interslotFrequencyHopping is configured to be enabled, inter-slot frequency hopping may be performed, and if same is not configured, inter-slot frequency hopping may not be performed. If a repetitive transmission count of a new PUCCH is 1, the terminal may identify whether intra-slot frequency hopping is enabled regardless of whether inter-slot frequency hopping is configured in a higher layer. If inter-slot frequency hopping is configured to be enabled, the terminal may perform intra-slot frequency hopping for the new PUCCH and transmit same. If the repetitive transmission count of the new PUCCH is not 1, the terminal may first identify whether inter-slot frequency hopping is configured to be enabled in a higher layer. If inter-slot frequency hopping is configured to be enabled, the terminal may perform inter-slot frequency hopping for the new PUCCH and repeatedly transmit same. The PUCCH may be transmitted only by inter-slot frequency hopping regardless of whether intra-slot frequency hopping is configured. If inter-slot frequency hopping is not configured to be enabled, the terminal may identify whether intra-slot frequency hopping is configured to be enabled in a higher layer. If intra-slot frequency hopping is enabled, the terminal may perform intra-slot frequency hopping for the new PUCCH and repeatedly transmit same, and if intra-slot frequency hopping is not configured to be enabled, the terminal may repeatedly transmit the PUCCH without performing frequency hopping.

In other words, whether inter-slot frequency hopping is possible may be configured for a terminal for each PUCCH format. Whether intra-slot frequency hopping is possible may be configured for the terminal for each resource in which a PUCCH is configured to be transmitted. In addition, a repetitive transmission count of a PUCCH may be configured for the terminal. The terminal may determine whether to perform inter-slot frequency hopping, based on the repetitive transmission count and according to whether intra-slot frequency hopping is possible in a resource in which a PUCCH is configured to be transmitted. If the repetitive transmission count is 1, inter-slot frequency hopping may not be performed. If the repetitive transmission count is greater than 1 and inter-slot frequency hopping according to a PUCCH format is configured to be possible, the terminal may perform inter-slot frequency hopping regardless of whether intra-slot frequency hopping is configured. On the contrary, if the repetitive transmission count is greater than 1 and inter-slot frequency hopping according to a PUCCH format is configured to be impossible, the terminal may perform frequency hopping according to whether intra-slot frequency hopping is configured.

Frequency Hopping Method of PUSCH

Hereinafter, a frequency hopping method of a PUSCH will be described. The frequency hopping method of a PUSCH may be configured from a higher layer.

For example, a terminal may determine a frequency hopping method by differently interpreting a bit of a frequency hopping flag in DCI corresponding to a new PUSCH according to a repetitive transmission count of the new PUSCH. The DCI may be DCI of a PDCCH scheduling the PUSCH. Specifically, the terminal may differently interpret a frequency hopping flag having a 1-bit size according to whether the repetitive transmission count of the new PUSCH is 1 or not. i) If the repetitive transmission count of the new PUSCH configured for the terminal is 1 and the bit value of the frequency hopping flag is 0, the terminal may transmit the PUSCH without performing frequency hopping. ii) If the repetitive transmission count of the new PUSCH configured for the terminal is 1 and the bit value of the frequency hopping flag is 0, the terminal may perform intra-slot frequency hopping to transmit the PUSCH. iii) If the repetitive transmission count of the new PUSCH configured for the terminal is greater than 1 and the bit value of the frequency hopping flag is 0, the terminal may perform intra-slot frequency hopping to transmit the PUSCH. iv) If the repetitive transmission count of the new PUSCH configured for the terminal is greater than 1 and the bit value of the frequency hopping flag is 1, the terminal may perform inter-slot frequency hopping to repeatedly transmit the PUSCH. As another example, i) If the repetitive transmission count of the new PUSCH configured for the terminal is 1 and the bit value of the frequency hopping flag is 0, the terminal may transmit the PUSCH without performing frequency hopping. ii) If the repetitive transmission count of the new PUSCH configured for the terminal is 1 and the bit value of the frequency hopping flag is 0, the terminal may perform intra-slot frequency hopping to transmit the PUSCH. iii) If the repetitive transmission count of the new PUSCH configured for the terminal is greater than 1 and the bit value of the frequency hopping flag is 0, the terminal may repeatedly transmit the PUSCH without performing frequency hopping. iv) If the repetitive transmission count of the new PUSCH configured for the terminal is greater than 1 and the bit value of the frequency hopping flag is 1, the terminal may perform inter-slot frequency hopping to repeatedly transmit the PUSCH.

A repetitive transmission count of a new PUSCH and a frequency hopping method may be configured for the terminal through a pair, and the terminal may differently interpret a bit of a frequency hopping flag of a DCI corresponding to the new PUSCH to determine the repetitive transmission count of the new PUSCH and the frequency hopping method. The DCI corresponding to the new PUSCH may be DCI of a PDCCH scheduling the PUSCH. Specifically, a repetitive transmission count of a new PUSCH and a frequency hopping method may be configured in the form of a pair (i.e., the repetitive transmission count and the hopping method) for the terminal by a base station through DCI corresponding to the new PUSCH, and the terminal may transmit the new PUSCH. Here, the number of (repetitive transmission count, hopping method) pairs may be configured up to 2. The hopping method may be one of three cases of intra-slot frequency hopping, inter-slot frequency hopping, and not performing frequency hopping.

Frequency Hopping Method of Msg3 PUSCH

A new PUSCH described above may be a new Msg3 PUSCH scheduled by an uplink grant of a random access response. A repetitive transmission count of the new Msg3 PUSCH may be included in the uplink grant. Hereinafter, a method of frequency hopping for repetitive transmission of a new Msg3 PUSCH will be described.

A base station may configure a frequency hopping method for repetitive transmission of a new Msg3 PUSCH for frequency diversity gain. The frequency hopping method may be configured by a 1-bit value of a frequency hopping flag of an uplink grant of a random access response scheduling a new Msg3 PUSCH. In a case of a retransmission Msg3 PUSCH, a frequency hopping method may be configured by a 1-bit value of a frequency hopping flag of DCI that is DCI format 0_0 scrambled by a TC-RNTI, which schedules the retransmission Msg3 PUSCH. If the bit value of the frequency hopping flag is 0, the terminal may repeatedly transmit a new Msg3 PUSCH without performing frequency hopping, and if the bit value of the frequency hopping flag is 1, the terminal may perform intra-slot frequency hopping to repeatedly transmit the new Msg3 PUSCH. In a case where the terminal repeatedly transmits a Msg3 PUSCH, if inter-slot frequency hopping is possible, inter-slot frequency hopping may be more advantageous than intra-slot frequency hopping in terms of DMRS overhead. Hereinafter, a method in which a terminal performs inter-slot frequency hopping to repeatedly transmit a new Msg3 PUSCH will be described.

A terminal may determine a frequency hopping method by interpreting a bit of a frequency hopping flag according to a repetitive transmission count of a new Msg3 PUSCH. Specifically, the terminal may interpret a frequency hopping flag differently from the conventional way according to whether a repetitive transmission count of a new Msg3 PUSCH is 1 or not. For example, i) if the repetitive transmission count of the new Msg3 PUSCH configured for the terminal is 1 and the bit value of the frequency hopping flag is 0, the terminal may repeatedly transmit the new Msg3 PUSCH without performing frequency hopping. ii) If the repetitive transmission count of the new Msg3 PUSCH configured for the terminal is 1 and the bit value of the frequency hopping flag is 0, the terminal may perform intra-slot frequency hopping to transmit the new Msg3 PUSCH. iii) If the repetitive transmission count of the new Msg3 PUSCH configured for the terminal is greater than 1 and the bit value of the frequency hopping flag is 0, the terminal may perform intra-slot frequency hopping to repeatedly transmit the new Msg3 PUSCH. iv) If the repetitive transmission count of the new Msg3 PUSCH configured for the terminal is greater than 1 and the bit value of the frequency hopping flag is 1, the terminal may perform inter-slot frequency hopping to repeatedly transmit the new Msg3 PUSCH. As another example, i) if the repetitive transmission count of the new Msg3 PUSCH configured for the terminal is 1 and the bit value of the frequency hopping flag is 0, the terminal may transmit the new Msg3 PUSCH without performing frequency hopping. ii) If the repetitive transmission count of the new Msg3 PUSCH configured for the terminal is 1 and the bit value of the hopping flag is 1, the terminal may perform intra-slot frequency hopping to transmit the new Msg3 PUSCH. iii) if the repetitive transmission count of the new Msg3 PUSCH configured for the terminal is greater than 1 and the bit value of the frequency hopping flag is 0, the terminal may determine to repeatedly transmit the new Msg3 PUSCH without performing frequency hopping. iv) If the repetitive transmission count of the new Msg3 PUSCH configured for the terminal is greater than 1 and the bit value of the frequency hopping flag is 1, the terminal may perform inter-slot frequency hopping to repeatedly transmit the new Msg3 PUSCH.

A repetitive transmission count of a new Msg3 PUSCH and a frequency hopping method may be configured for the terminal through a pair, and the terminal may differently interpret a bit of a frequency hopping flag to determine the repetitive transmission count of the new Msg3 PUSCH and the frequency hopping method. Specifically, a repetitive transmission count of a new PUSCH and a frequency hopping method may be configured in the form of a pair (i.e., the repetitive transmission count and the hopping method) for the terminal by a base station through DCI corresponding to the new PUSCH, and the terminal may transmit the new Msg3 PUSCH. Specifically, the pair indicating a repetitive transmission count of a new PUSCH and a frequency hopping method may be determined by a frequency hopping flag of an uplink grant of a random access response or DCI that is DCI format 0_0, which schedules a Msg3 PUSCH. Here, the number of (repetitive transmission count, hopping method) pairs may be configured up to 2. The hopping method may be one of three cases of intra-slot frequency hopping, inter-slot frequency hopping, and non-frequency hopping.

Figure 30:
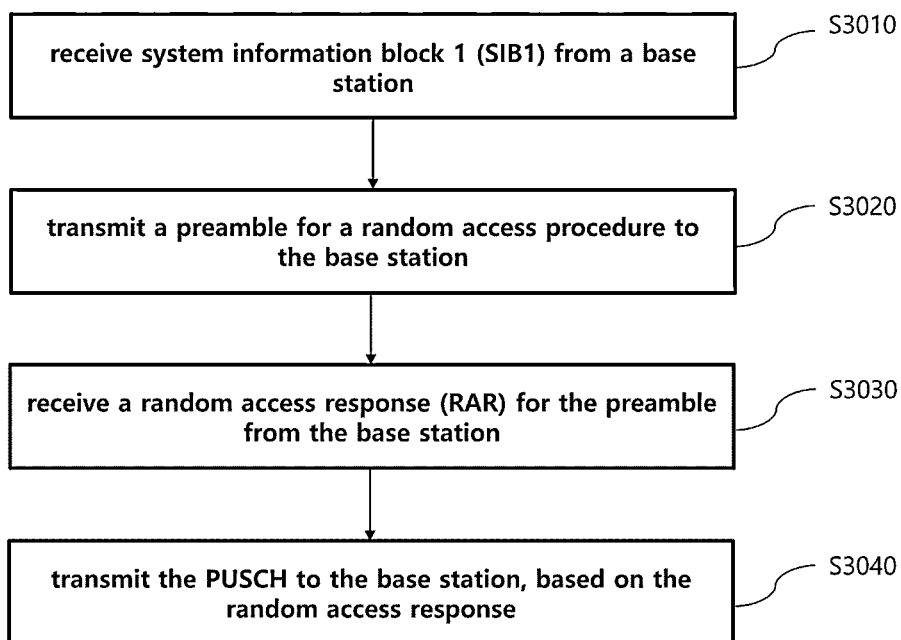
FIG. 30 is a flowchart illustrating a method of transmitting a Msg3 PUSCH by a terminal according to an embodiment of the present disclosure.

FIG. 30 is a flowchart illustrating a method of transmitting a Msg3 PUSCH by a terminal according to an embodiment of the present disclosure.

Hereinafter, a method of transmitting a Msg3 PUSCH by a terminal, described with reference to FIGS. 1 to 29, will be described with reference to FIG. 30.

A terminal may receive system information block 1 (SIB1) from a base station (operation S3010). The system information block 1 may be a different system information block as described above (e.g., SIBx, x=1, 2, 3 . . . ). The terminal may transmit a preamble for a random access procedure to the base station (operation S3020). The terminal may receive a random access response (RAR) for the preamble from the base station (operation S3030). The random access response may include information scheduling a physical uplink shared channel (PUSCH) that the terminal transmits to the base station. The terminal may transmit the PUSCH to the base station, based on the random access response (operation S3040). The SIB1 may include information on a repetitive transmission count candidate set including the values of one or more repetitive transmission counts for repetitive transmission of the PUSCH. The random access response may include information indicating one value among the values of the one or more repetitive transmission counts included in the repetitive transmission count candidate set. Transmission of the PUSCH may be repeated as many times as the one value. The random access response may correspond to a physical downlink shared channel (PDSCH) including an uplink (UL) grant. The information indicating the one value may be included in at least one of a time domain resource assignment (TDRA) field, a modulation coding scheme (MCS) field, and a transmission power control (TPC) field of the random access response. When the information indicating the one value is included in the MCS field, the one value may be indicated by one or more most significant bits (MSBs) among bits of the MCS field. When the information indicating the one value is included in the TPC field, the one value may be indicated by one or more least significant bits (LSBs) among bits of the TPC field. Each of the values of the one or more repetitive transmission counts may be a power of 2. Specifically, the values of the one or more repetitive transmission counts may be 1, 2, 4, and 8, respectively. The SIB1 may include at least one of information related to the preamble and a RACH occasion. In addition, the PUSCH may be transmitted in a resource determined based on at least one of the information related to the preamble and the RACH occasion.

After operation S3040, the terminal may receive, from the base station, downlink control information (DCI) including information for scheduling a retransmission PUSCH. The terminal may repeatedly transmit the retransmission PUSCH to the base station, based on the DCI. The information for scheduling the retransmission PUSCH may include information on a repetition count of the retransmission PUSCH. The information on the repetition count of the retransmission PUSCH may be included in a HARQ process number field of the DCI. The retransmission PUSCH may be identical to the PUSCH transmitted by the terminal in operation S3040. The DCI may be transmitted by the base station when the base station has failed to receive the PUSCH transmitted by the terminal. That is, if the base station has failed to successfully receive the PUSCH transmitted by the terminal in operation S3040, the base station may transmit the information for scheduling the retransmission PUSCH to the terminal.

The random access response may include a frequency hopping flag indicating whether the PUSCH performs frequency hopping. The PUSCH may be subject to intra-slot frequency hopping or inter-slot frequency hopping, based on the one value and the frequency hopping flag. In a case where the one value is 1, when a value of the frequency hopping flag indicates that the PUSCH performs frequency hopping, the PUSCH may perform intra-slot frequency hopping. When the value of the frequency hopping flag indicates that the PUSCH does not perform frequency hopping, the PUSCH may not perform frequency hopping. In a case where the one value is greater than 1, when a value of the frequency hopping flag indicates that the PUSCH performs frequency hopping, the PUSCH may perform inter-slot frequency hopping. When the value of the frequency hopping flag indicates that the PUSCH does not perform frequency hopping, the PUSCH may not perform frequency hopping. The PUSCH may be the retransmission PUSCH.

The random access response may further include information on a resource in which a first repetitive transmission of the PUSCH is performed. The information on the resource in which the first repetitive transmission of the PUSCH is performed may be a slot offset value between a resource in which the random access response is received and the resource in which the first repetitive transmission of the PUSCH is performed. The S1131 may further include information related to a time division duplex (TDD) configuration, and the information related to the TDD configuration may be information on a type of symbols configuring a slot. The type of the symbols may be one of a downlink symbol configured to be available for downlink transmission, an uplink symbol configured to be available for uplink transmission, and a flexible symbol not determined to be the downlink symbol or the uplink symbol. The PUSCH may be repeatedly transmitted in a unit of slots. The resource in which the first repetitive transmission of the PUSCH is performed may be a resource spaced as much as the slot offset value apart from the resource in which the random access response is received. The resource in which the first repetitive transmission of the PUSCH is performed may be a flexible slot, and repetitive transmission after the first repetitive transmission of the PUSCH may be performed on an uplink slot. The flexible slot may be configured by including at least one flexible symbol, and the entirety of the uplink slot may be configured by the uplink symbol. The PUSCH may be the retransmission PUSCH.

The terminal performing the method described with reference to FIG. 30 may be the terminal described with reference to FIG. 11. Specifically, the terminal may include a communication module configured to transmit or receive a radio signal, and a processor configured to control the communication module. In this case, the processor of the terminal may perform the method of transmitting the Msg 3 PUSCH, described in the present specification.

In addition, a base station receiving the Msg3 PUSCH transmitted by a terminal, described in the present specification, may include a communication module configured to transmit or receive a radio signal, and a processor configured to control the communication module. In this case, the base station may be the base station described with respect to FIG. 11. The processor of the base station may perform the method of receiving the Msg3 PUSCH transmitted by the UE, described in the present specification.

The method and system of the present disclosure are described in relation to specific embodiments, but configuration elements, a part of or the entirety of operations of the present disclosure may be implemented using a computer system having a general-purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A user equipment in a wireless communication system, the user equipment comprising:
a transceiver; and
a processor configured to control the transceiver,
wherein the processor is configured to:
receive a random access response (RAR) including an uplink (UL) grant,
transmit a physical uplink shared channel (PUSCH) based on the RAR,
wherein the RAR includes first information indicating whether the PUSCH is transmitted with frequency hopping and second information indicating a number of slots for repetition transmissions of the PUSCH, and
wherein when the PUSCH is transmitted with the frequency hopping, a frequency hopping mode of the PUSCH is determined based on the number of slots for repetition transmissions of the PUSCH.

2. The user equipment of claim 1,
wherein when the number of slots for repetition transmissions of the PUSCH is 1, the frequency hopping mode of the PUSCH is intra-slot frequency hopping,
wherein when the number of slots for repetition transmissions of the PUSCH is 2 or more, the frequency hopping mode of the PUSCH is inter-slot frequency hopping.

3. The user equipment of claim 1,
wherein the RAR is received via a physical downlink shared channel (PDSCH).

4. The user equipment of claim 1,
wherein the second information is included in a modulation coding scheme (MCS) field in the RAR.

5. The user equipment of claim 4,
wherein the number of slots for repetition transmissions of the PUSCH is indicated by one or more most significant bits (MSBs) of the MCS field.

6. The user equipment of claim 1,
wherein the processor is configured to:
receive a set including one or more values related to the repetition transmission of the PUSCH via system information block 1 (SIB1),
wherein the second information indicates one of the one or more values as the number of repetition transmissions of the PUSCH.

7. The user equipment of claim 6,
wherein the one or more values includes a power of 2.

8. The user equipment of claim 1,
wherein the PUSCH is repeatedly transmitted in a unit of slots.

9. The user equipment of claim 1,
wherein RAR further includes third information related to a slot offset value between a resource in which the RAR is received and a resource in which the first repetition transmission of the PUSCH is performed.

10. The user equipment of claim 1,
wherein the processor is configured to:
receive downlink control information (DCI) for scheduling a retransmission PUSCH,
transmit the retransmission PUSCH based on the DCI,
wherein the DCI includes a number of slots for repetition of the retransmission PUSCH.

11. The user equipment of claim 10,
wherein the DCI is scrambled by a TC-RNTI (Temporary Cell-Radio Network Temporary Identifier),
wherein a format of the DCI is DCI format 0_0.

12. A method used by a user equipment in a wires communication system, the method comprising:
receiving a random access response (RAR) including an uplink (UL) grant; and
transmitting a physical uplink shared channel (PUSCH) based on the RAR,
wherein the RAR includes first information indicating whether the PUSCH is transmitted with frequency hopping and second information indicating a number of slots for repetition transmissions of the PUSCH, and
wherein when the PUSCH is transmitted with the frequency hopping, a frequency hopping mode of the PUSCH is determined based on the number of slots for repetition transmissions of the PUSCH.

13. The method of claim 12,
wherein when the number of slots for repetition transmissions of the PUSCH is 1, the frequency hopping mode of the PUSCH is intra-slot frequency hopping,
wherein when the number of slots for repetition transmissions of the PUSCH is 2 or more, the frequency hopping mode of the PUSCH is inter-slot frequency hopping.

14. The method of claim 13, further comprising:
receiving a set including one or more values related to the repetition transmission of the PUSCH via system information block 1 (SIB1),
wherein the second information indicates one of the one or more values as the number of repetition transmissions of the PUSCH.

15. The method of claim 14,
wherein the one or more values includes a power of 2.

16. The method of claim 12,
wherein the RAR is received via a physical downlink shared channel (PDSCH).

17. The method of claim 12,
wherein the second information is included in a modulation coding scheme (MCS) field in the RAR.

18. The method of claim 17,
wherein the number of slots for repetition transmissions of the PUSCH is indicated by one or more most significant bits (MSBs) of the MCS field.

19. The method of claim 12,
wherein the PUSCH is repeatedly transmitted in a unit of slots.

20. The method of claim 12,
wherein RAR further includes third information related to a slot offset value between a resource in which the RAR is received and a resource in which the first repetition transmission of the PUSCH is performed.

21. The method of claim 12, further comprising:
receiving downlink control information (DCI) for scheduling a retransmission PUSCH; and
transmitting the retransmission PUSCH based on the DCI,
wherein the DCI includes a number of slots for repetition of the retransmission PUSCH.

22. The method of claim 21,
wherein the DCI is scrambled by a TC-RNTI (Temporary Cell-Radio Network Temporary Identifier),
wherein a format of the DCI is DCI format 0_0.

23. A base station in a wireless communication system, the base station comprising:
a transceiver; and
a processor configured to control the transceiver,
wherein the processor is configured to:
transmit a random access response (RAR) including an uplink (UL) grant,
receive a physical uplink shared channel (PUSCH) based on the RAR,
wherein the RAR includes first information indicating whether the PUSCH is transmitted with frequency hopping and second information indicating a number of slots for repetition transmissions of the PUSCH, and
wherein when the PUSCH is transmitted with the frequency hopping, a frequency hopping mode of the PUSCH is determined based on the number of slots for repetition transmissions of the PUSCH.

24. A method used by a base station in a wires communication system, the method comprising:
transmitting a random access response (RAR) including an uplink (UL) grant; and
receiving a physical uplink shared channel (PUSCH) based on the RAR,
wherein the RAR includes first information indicating whether the PUSCH is transmitted with frequency hopping and second information indicating a number of slots for repetition transmissions of the PUSCH, and
wherein when the PUSCH is transmitted with the frequency hopping, a frequency hopping mode of the PUSCH is determined based on the number of slots for repetition transmissions of the PUSCH.

* * * * *